(12) United States Patent
Chao et al.

(10) Patent No.: US 7,876,672 B2
(45) Date of Patent: Jan. 25, 2011

(54) DETERMINING REROUTING INFORMATION FOR SINGLE-NODE FAILURE RECOVERY IN AN INTERNET PROTOCOL NETWORK

(75) Inventors: Hung-Hsiang Jonathan Chao, Holmdel, NJ (US); Kang Xi, Harrison, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 746 days.

(21) Appl. No.: 11/786,416

(22) Filed: Apr. 10, 2007

(65) Prior Publication Data

US 2008/0232347 A1 Sep. 25, 2008

Related U.S. Application Data

(60) Provisional application No. 60/791,167, filed on Apr. 10, 2006.

(51) Int. Cl.
*G01R 31/08* (2006.01)
(52) U.S. Cl. .................. 370/218; 370/221; 370/225; 370/389
(58) Field of Classification Search ......... 370/217–222, 370/225–228
See application file for complete search history.

(56) References Cited

U.S. PATENT DOCUMENTS

| | | | | |
|---|---|---|---|---|
| 7,158,486 B2 * | 1/2007 | Rhodes | ................... | 370/256 |
| 7,319,700 B1 * | 1/2008 | Kompella | ................... | 370/400 |
| 2003/0021223 A1 * | 1/2003 | Kashyap | ................... | 370/217 |
| 2004/0004938 A1 * | 1/2004 | Buddhikot et al. | ........... | 370/238 |
| 2004/0221087 A1 * | 11/2004 | Benedetto et al. | ........... | 710/316 |
| 2004/0264364 A1 * | 12/2004 | Sato | ..................... | 370/217 |
| 2006/0004916 A1 * | 1/2006 | Caviglia et al. | ............. | 709/223 |
| 2006/0146733 A1 * | 7/2006 | Alicherry et al. | ............. | 370/255 |
| 2008/0049609 A1 | 2/2008 | Chao et al. | | |

* cited by examiner

*Primary Examiner*—Jayanti K. Patel
*Assistant Examiner*—Bo Hui A Zhu
(74) *Attorney, Agent, or Firm*—Straub & Pokotylo; John C. Pokotylo

(57) ABSTRACT

For a survivable portion of a network, a backup port for a first router of the survivable network, to reach a destination node in the event of a single node failure, may be determined by (a) accepting a routing path graph having the destination node, wherein the routing path graph includes one or more links terminated by one or more primary ports of the first router; and (b) for each router of at least a part of the routing path graph, (1) assuming that the current router is removed, defining (A) a first part of the routing path graph including the destination node, and (B) a second part of the routing path graph separated from the first part wherein the second part defines one or more sub-graphs, and (2) determining the backup port for the first router by examining at least one of the one or more sub-graphs to find a link to the first part of the routing path graph.

24 Claims, 45 Drawing Sheets

*(1st CYCLE)*

(3RD CYCLE)

(2ND CYCLE)

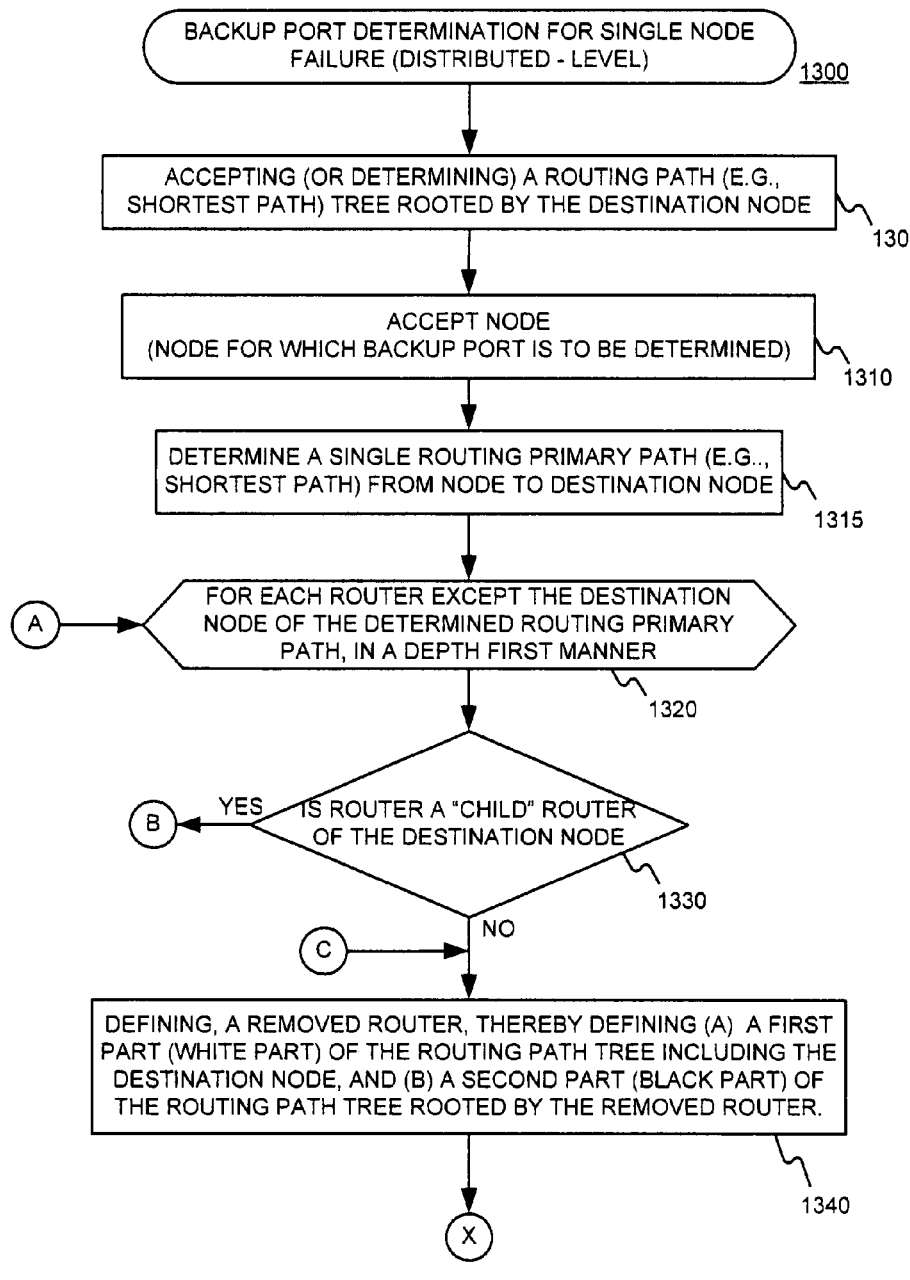
FIGURE 13A
FIGURE 13

DETERMINING REROUTING INFORMATION FOR SINGLE-NODE FAILURE RECOVERY IN AN INTERNET PROTOCOL NETWORK

§0. PRIORITY CLAIM

This application claims the benefit of U.S. Provisional Patent Application Ser. No. 60/791,167 (incorporated herein by reference and referred to as "the '167 provisional"), titled "Protected Packet Routing: Achieving Fast Failure Recovery in the IP Layer," filed on Apr. 10, 2006, and listing Kang Xi and Hung-Hsiang Jonathan Chao as inventors. The present invention in not limited to requirements of the particular embodiments described in the '167 provisional.

§1. BACKGROUND OF THE INVENTION

§1.1 Field of the Invention

The present invention concerns IP networks. In particular, the present invention concerns failure recovery using rerouting schemes that determine backup ports within an IP network.

§1.2 Background Information

The Internet has evolved to a global information platform that supports numerous applications ranging from online shopping to worldwide business-related and science-related activities. For such a critical infrastructure, survivability is a stringent requirement in that services interrupted by equipment failures must be recovered as quickly as possible. Typically, a recovery time of tens of milliseconds satisfies most requirements (e.g., SDH/SONET automatic protection switching ("APS") is completed within 50 ms). At the same time, it is desired that failure recovery schemes have low complexity and do not reserve redundant bandwidth.

Network failures can be caused by a variety of reasons such as fiber cut, interface malfunctioning, software bugs, misconfiguration and attacks. Despite continuous technological advances, failures have occurred even in well maintained networks.

An important issue of failure recovery is how to set up a new path to replace a damaged one. The main approaches used by today's IP networks are route recalculation and lower layer protection. Each is introduced below.

Routing protocols (such as open shortest path first ("OSPF") and intermediate system to intermediate system intra-domain routing ("IS-IS") are typically designed to perform failure advertising, route recalculation and routing table update to recover from failures. Although these mechanisms can deal with various types of failures, the time for the recovery process can easily reach seconds. Such delays can lead to long service disruptions, dropped packets, latency, etc., to an extent unacceptable for certain applications (such as stock trading systems, for example).

On the other hand, lower layer protection achieves fast recovery by establishing backup connections in advance (e.g., a time slot channel). These previously established backup connections are used to quickly replace damaged connections. In this case, the IP layer can be protected from failures without any modifications on the routing tables. However, this type of approach reserves redundant bandwidth (such as redundant links or channels on links, redundant ports, etc.) for the backup connections. More importantly, relying on lower layer protection means the IP layer is not independent in term of survivability. From this point of view, an original objective of packet switching—to design a highly survivable network where packet forwarding in each router is adaptive to the network status—is still not fully achieved.

The framework of IP fast rerouting ("IPFRR") is described in a recent draft of Internet Engineering Task Force ("IETF"). (See, e.g., M. Shand and S. Bryant, "IP fast reroute framework," *Internet-Draft*, October 2005. (Online) available at http://www.ietf.org/intemet-drafts/draftietf-rtgwg-ipfrr-framework-04.txt.) Basically, IPFRR lets a router maintain (the identity of) a backup port for each destination and use the backup port to forward packets when the primary port fails. Since the backup ports are determined in advance and do not occupy or otherwise reserve redundant bandwidth, IPFRR can achieve fast failure recovery with great cost-efficiency. IPFRR and the following presume that failure detection has already occurred (e.g., using a known or proprietary techniques).

§1.2.1 Previous Approaches to Ip Fast Rerouting, And Perceived Limitations of Such Approaches A simple scheme related to IPFRR is equal cost multi-paths ("ECMP"), where a number of paths with the same cost are calculated for each source/destination pair. (See, e.g., A. Iselt, A. Kirstdter, A. Pardigon, and T. Schwabe, "Resilient routing using ecmp and mpls," *IEEE High Performance Switching and Routing (HPSR)* (April 2004).) A failure on a particular path can be handled by sending packets along an alternate path. This approach has been implemented in practical networks. However, equal cost paths might not exist in certain situations (such as in a ring). Thus, it has been reported that ECMP cannot guarantee 100% failure recovery.

A scheme to find loop-free alternate paths is presented in the paper, A. Atlas, "Basic specification for IP fast-reroute: loopfree alternates," Internet-Draft, (February 2005)(Online) available at http://www3.ietf.org/proceedings/05mar/IDs/draft-ietf-rtgwg-ipfrrspec-base-03.txt. Consider the routing from S to D. If S has a neighbor X that satisfies $d(X,D) < d(X,S) + d(S,D)$, where $d(i,j)$ is the cost from i to j, it can send packets to X as an alternate path. The condition ensures that packets do not loop back to S. Similar to ECMP, this scheme does not guarantee 100% failure recovery since a node might not have a neighbor X that satisfies the foregoing condition.

The paper S. Bryant, M. Shand, and S. Previdi, "IP fast reroute using not-via addresses," *Internet-Draft*, (October 2005) (Online) available at http://www.ietf.org/inteet-drafts/draft-bryant-shand-ipfrnotvia-addresses-01.txt, proposes a scheme to set up a tunnel from node S to node Y that is multiple hops away. The alternate path to a destination D is from S to Y then to D. This guarantees 100% failure coverage. Unfortunately, the maintenance of many tunnels imposes extra costs, and fragmentation can occur when the encapsulated IP packet is longer than the maximum transmission unit ("MTU").

A scheme called failure insensitive routing ("FIR") for recovering from single-link failures is presented in the paper S. Lee, Y. Yu, S. Nelakuditi, Z. Zhang, and C.-N. Chuah, "Proactive vs reactive approaches to failure resilient routing," *IEEE INFOCOM* (March 2004). Given a primary path S→D, FIR identifies a number of key links such that removing any of these links forces the packets go back to S. Therefore, the failure of any key links can be inferred by S if a deflected packet occurs. To provide an alternate path, FIR removes the key links and runs shortest path routing from S to D. FIR is extended to cover single-node failures in the paper Z. Zhong, S. Nelakuditi, Y. Yu, S. Lee, J. Wang, and C.-N. Chuah, "Failure inferencing based fast rerouting for handling transient link and node failures," *IEEE Global Internet* (March 2005). The scheme is also applicable to networks using ECMP. Unfortunately, it does not consider the general case of multi-path routing where the paths may not have equal cost. In addition, determining extra shortest paths can be computationally expensive.

An algorithm called multiple routing configuration ("MRC") is presented in the paper A. Kvalbein et al., "Fast IP network recovery using multiple routing configurations," *IEEE INFOCOM* (April 2006). Under MRC, each router maintains multiple routing tables (configurations). After a failure is detected, the routers search for a configuration that can bypass the failure. After that, the index of the selected configuration is inserted into packet headers to notify each router which routing table to use. MRC achieves 100% failure coverage. Unfortunately MRC has to maintain multiple routing tables and has to add an extra index to packet headers.

The paper X. Yang and D. Wetherall, "Source selectable path diversity via routing deflections," *ACM Sigcomm*, (2006), discusses how to find multiple paths between source/destination pairs using routing deflection, and derives three conditions that achieve generic path diversity. Although the scheme is not designed for a specific application, it is shown to be promising for failure recovery. Unfortunately, directly using the scheme cannot guarantee 100% failure coverage.

In view of the foregoing, it would be useful to facilitate fast failure recovery in IP networks, preferably without introducing high complexity and/or high resource usage.

§2. SUMMARY OF THE INVENTION

For a survivable portion of a network, embodiments consistent with the present invention may determine a backup port for a first router of the survivable network, to reach a destination node in the event of a single node failure. Such embodiments might do so by (a) accepting a routing path graph having the destination node, wherein the routing path graph includes one or more links terminated by one or more primary ports of the first router; and (b) for each router of at least a part of the routing path graph, (1) assuming that the current router is removed, defining (A) a first part of the routing path graph including the destination node, and (B) a second part of the routing path graph separated from the first part wherein the second part defines one or more sub-graphs, and (2) determining the backup port for the first router by examining at least one of the one or more sub-graphs to find a link to the first part of the routing path graph.

Such embodiments may be employed in multi-path and non-multi-path environments.

Distributed and non-distributed embodiments are provided.

§3. BRIEF DESCRIPTION OF THE DRAWINGS

FIG. 1A illustrates the topology of a simple example IP network in which node 1 is the destination node. FIG. 1B illustrates the IP network of FIG. 1A and depicts primary ports and backup ports for each node (other than destination node 1). FIG. 1C illustrates the IP network of FIG. 1B in a scenario where node 2 and node 4 switch to their backup ports in response to a link failure.

Figure 9B:
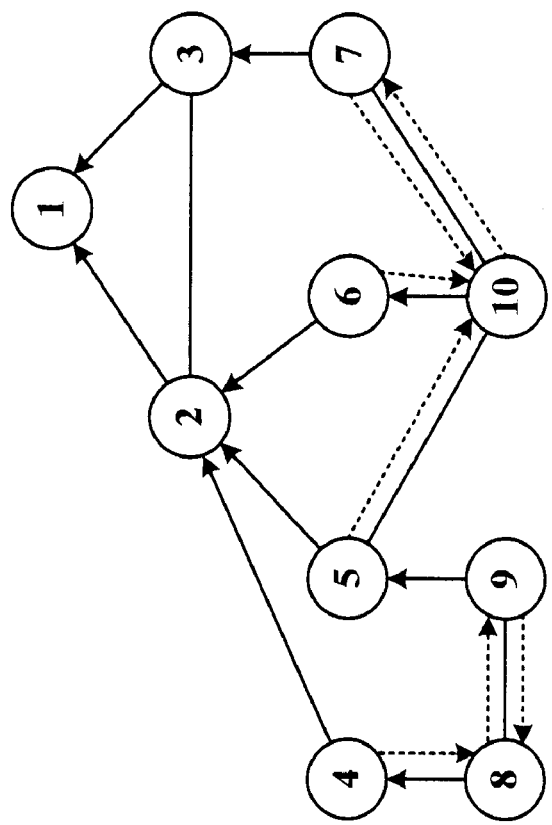
Figure 9A:
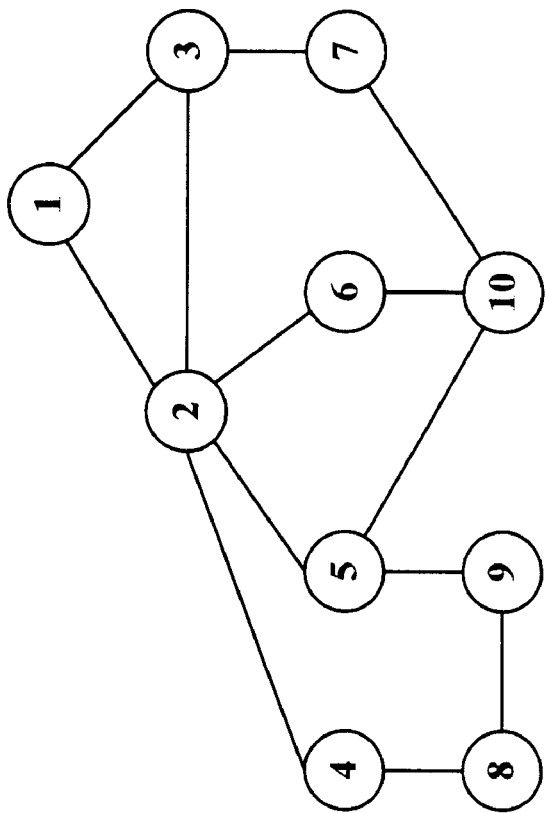
Figure 9C:
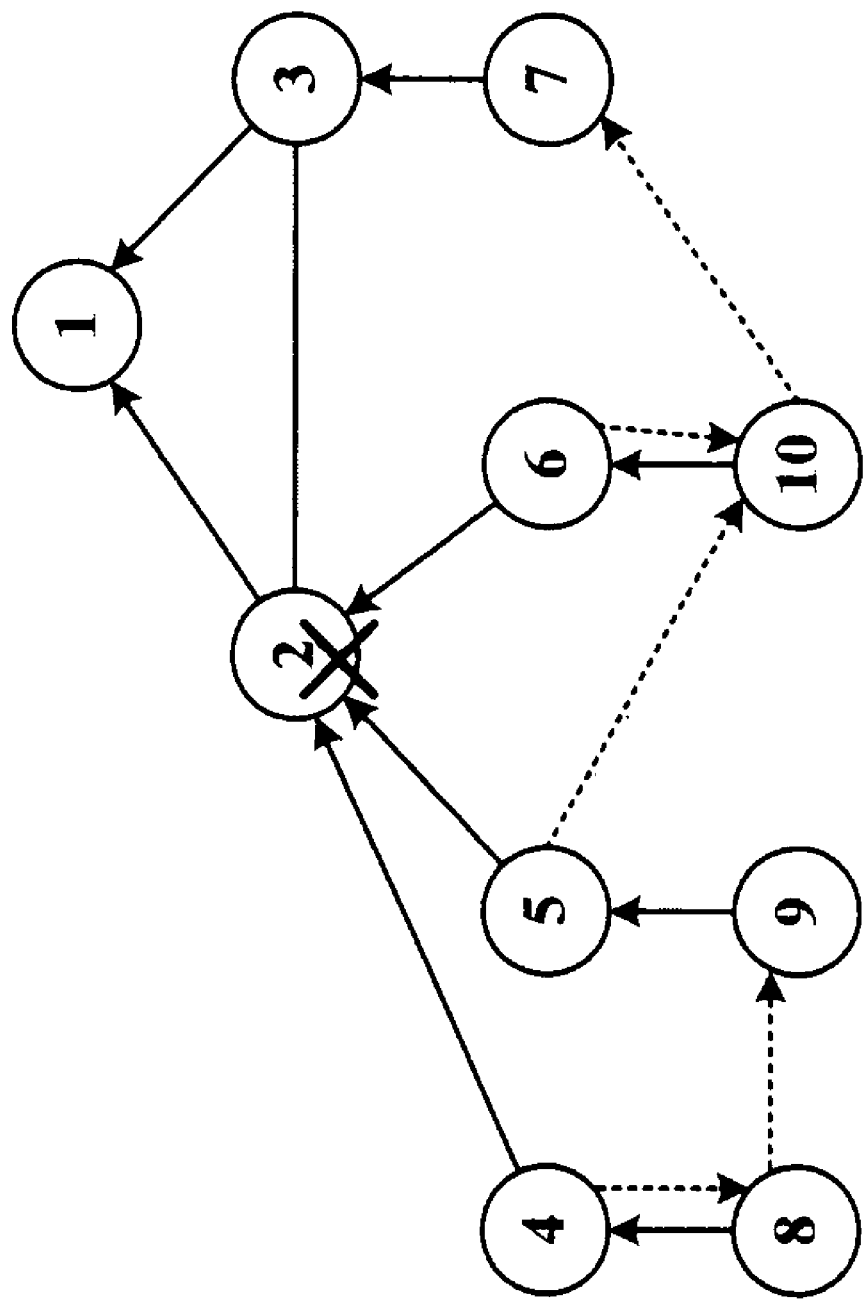

FIG. 9A illustrates the topology of a survivable IP network with node 1 as the destination node. FIG. 9B illustrates the primary ports and backup ports for each node, which were determined in a manner consistent with the present invention, for the IP network of FIG. 9A. FIG. 9C illustrates the use of backup ports in a scenario where node 2 fails (and nodes 4, 5, 6, 8, and node 10 switch to their backup ports) in a manner consistent with the present invention.

Figure 10:
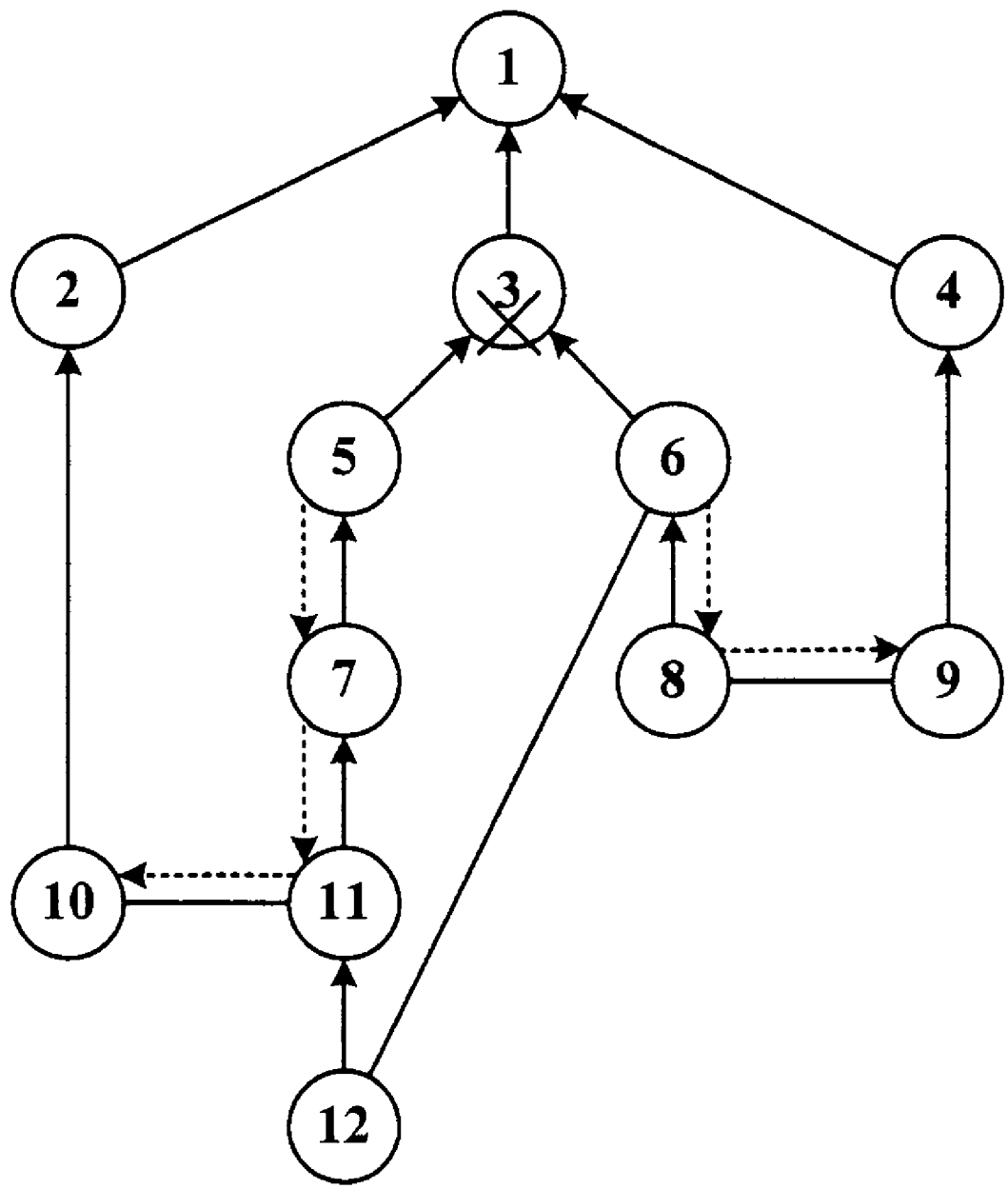

FIG. 10 illustrates an exemplary IP network, where switchover to backup ports at nodes 5, 6, 7, 8 and 11, determined in a manner consistent with the present invention, occurs upon the failure of node 3.

FIGS. 11A-11D illustrate the determination of backup ports for a plurality of nodes having primary ports in a survivable IP network topology in which node 1 is the single destination node, in a manner consistent with the present invention.

FIG. 12, which consists of FIGS. 12A, 12B, 12C, 12D, and 12E, is a flow diagram of an exemplary method for determining backup ports of various nodes of an IP network for use in single-node failure recovery, in a manner consistent with the present invention.

FIG. 13, which consists of FIGS. 13A, 13B, 13C, 13D, 13E, and 13F is a flow diagram of an exemplary method for determining backup ports in a distributed manner, per node, for use in single-node failure recovery, in a manner consistent with the present invention.

Figure 14:
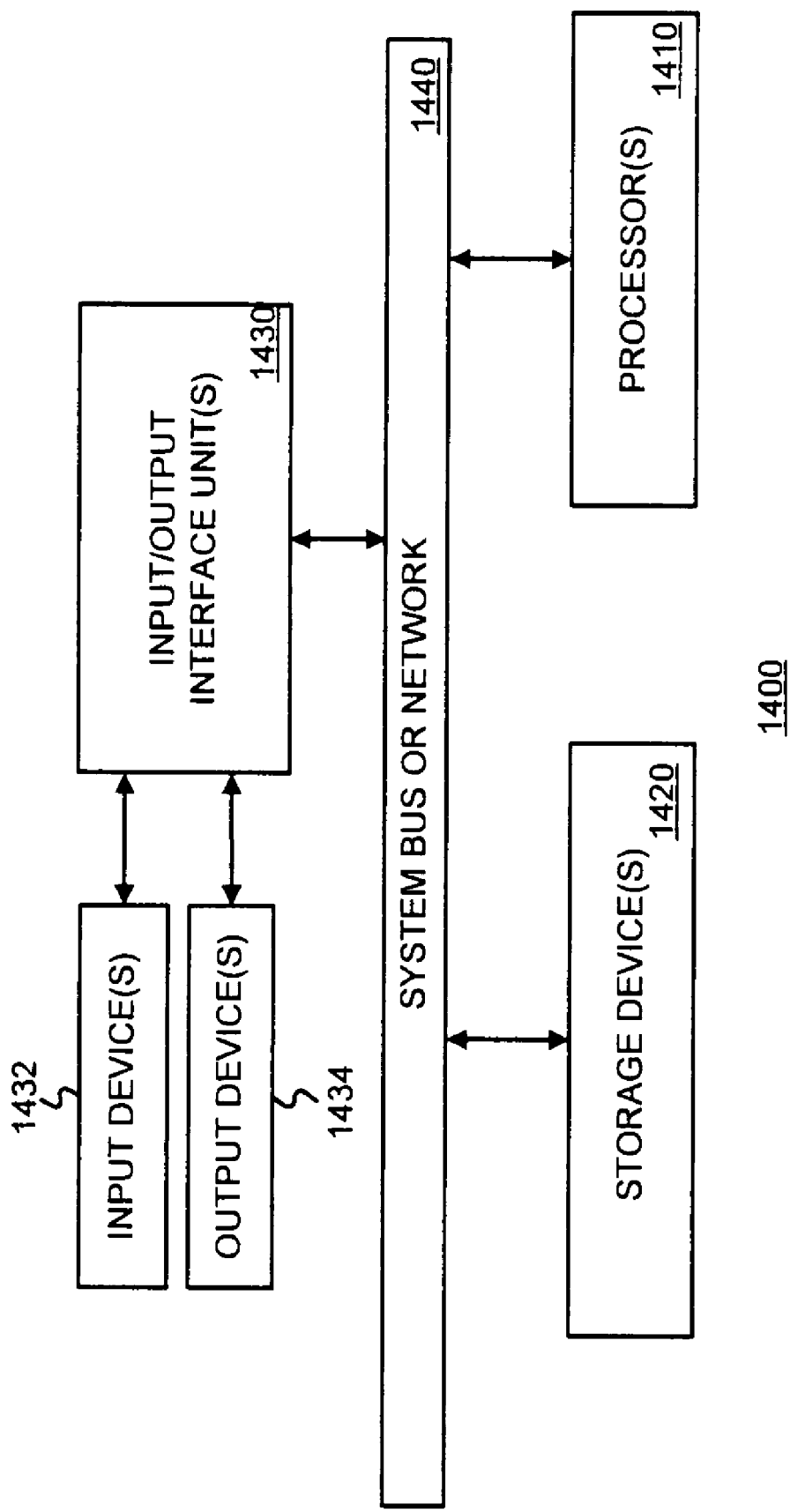

FIG. 14 is a block diagram of an exemplary apparatus that may perform various operations, and store various information generated and/or used by such operations, in a manner consistent with the present invention.

Figure 15A:
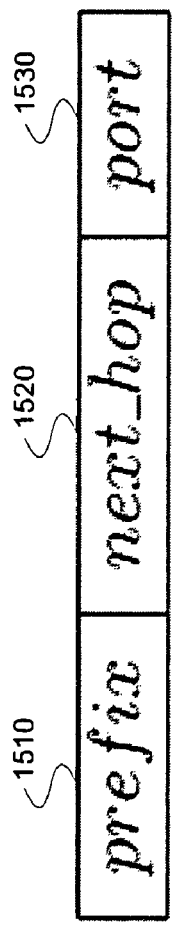
Figure 15B:
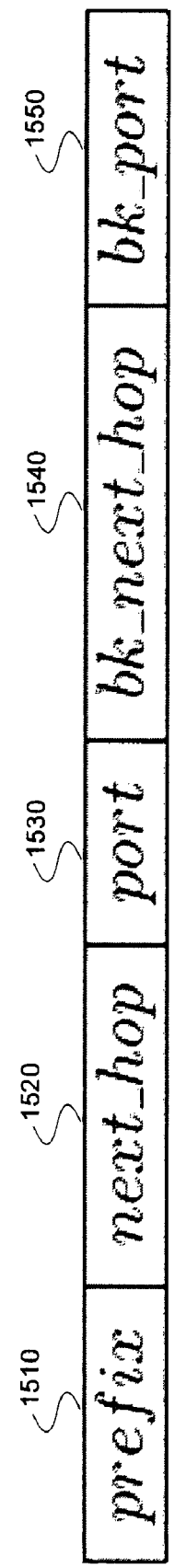

FIG. 15A illustrates a data structure of an exemplary traditional routing table, while FIG. 15B illustrates a data structure of an exemplary extended routing table supporting IPFRR, which is consistent with the present invention.

Figure 16B:
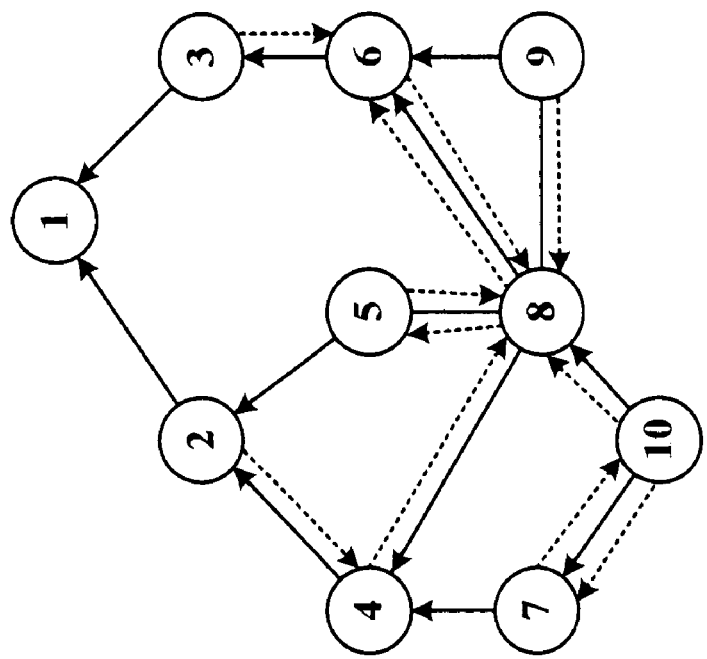
Figure 16A:
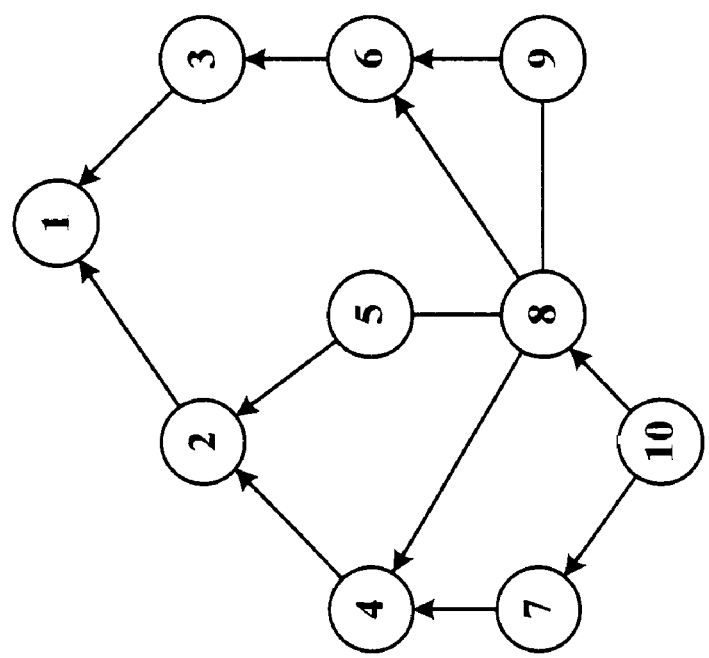
Figure 16C:
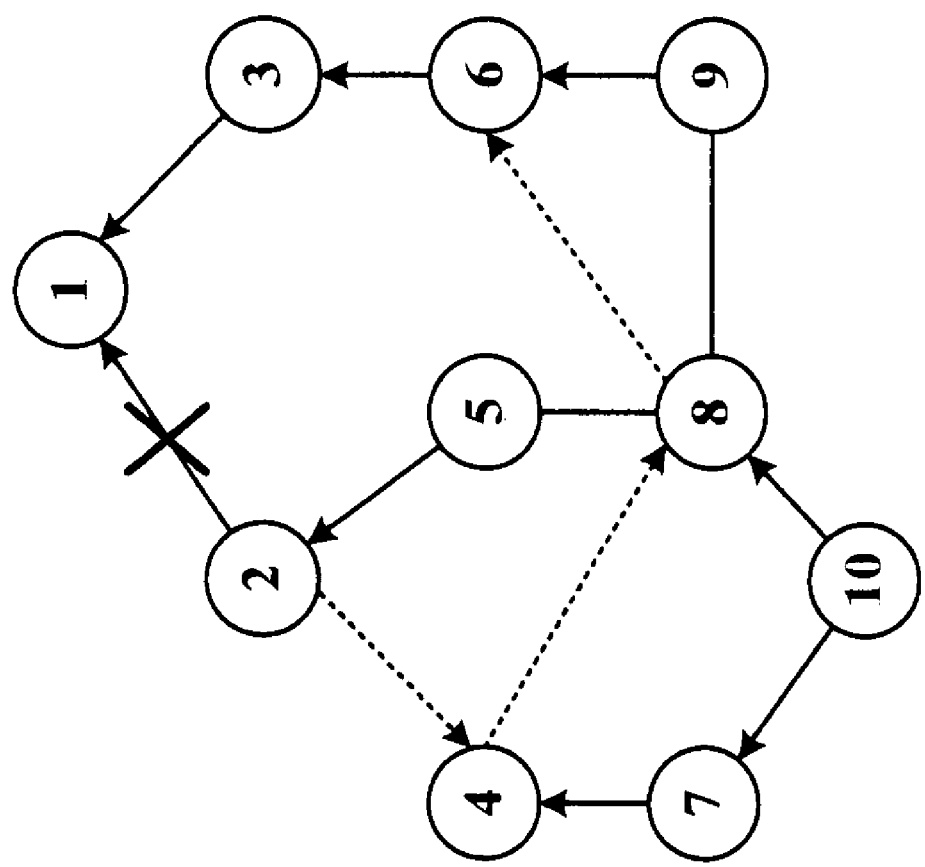
Figure 16D:
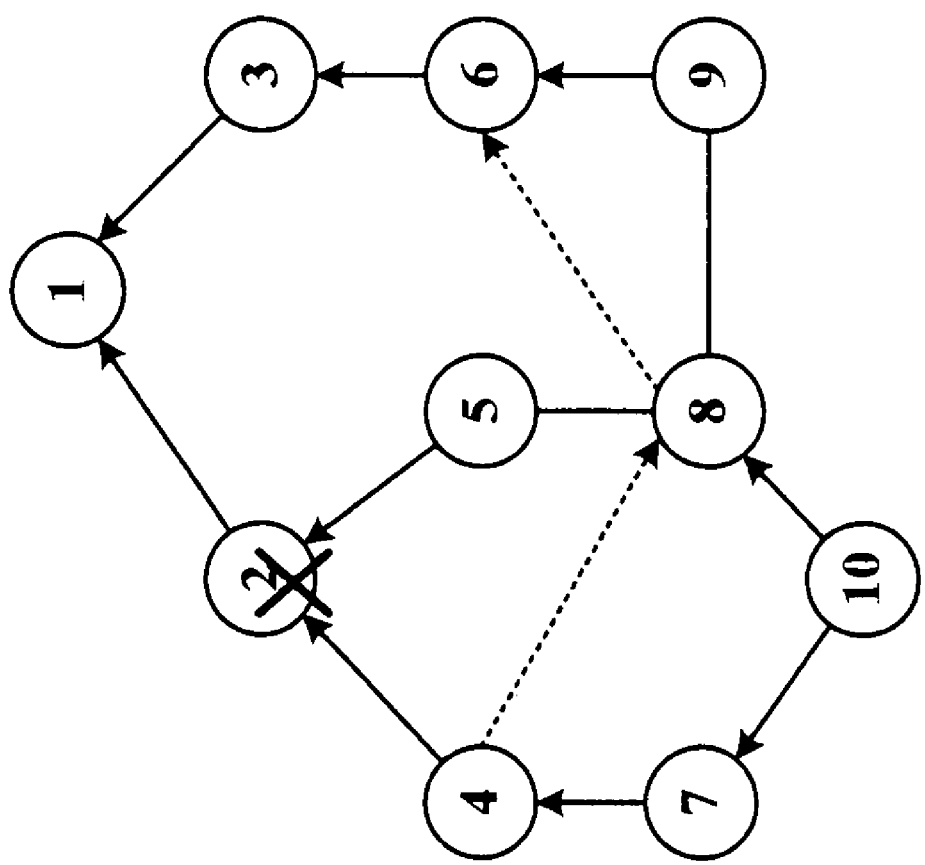

FIG. 16A illustrates the topology of a survivable IP network with multi-path routing, and with node 1 as the destination node. FIG. 16B illustrates the primary ports and backup ports for each node, which were determined in a manner consistent with the present invention, for the IP network of FIG. 16A. FIG. 16C illustrates the IP network of FIG. 16B in a scenario where node 2, node 4 and node 8 switch to their backup ports in response to a link failure. FIG. 16D illustrates the use of backup ports in a scenario where node 2 fails (and nodes 4 and 10 switch to their backup ports) in a manner consistent with the present invention.

Figure 17B:
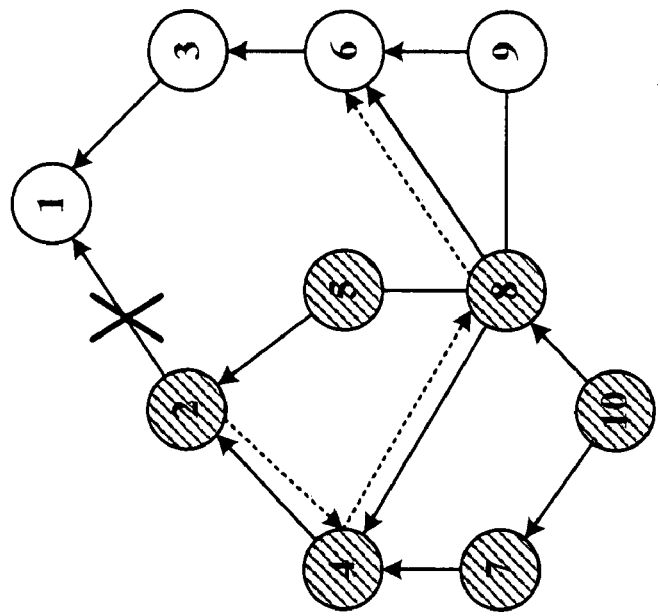
Figure 17A:
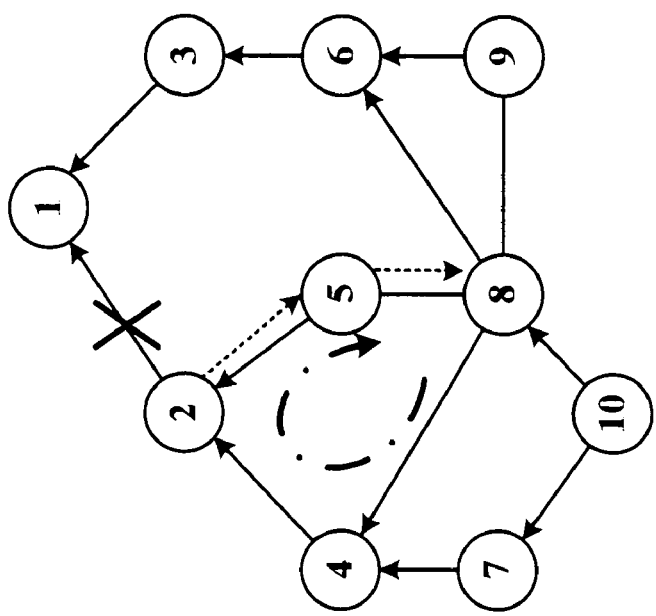
Figure 17C:
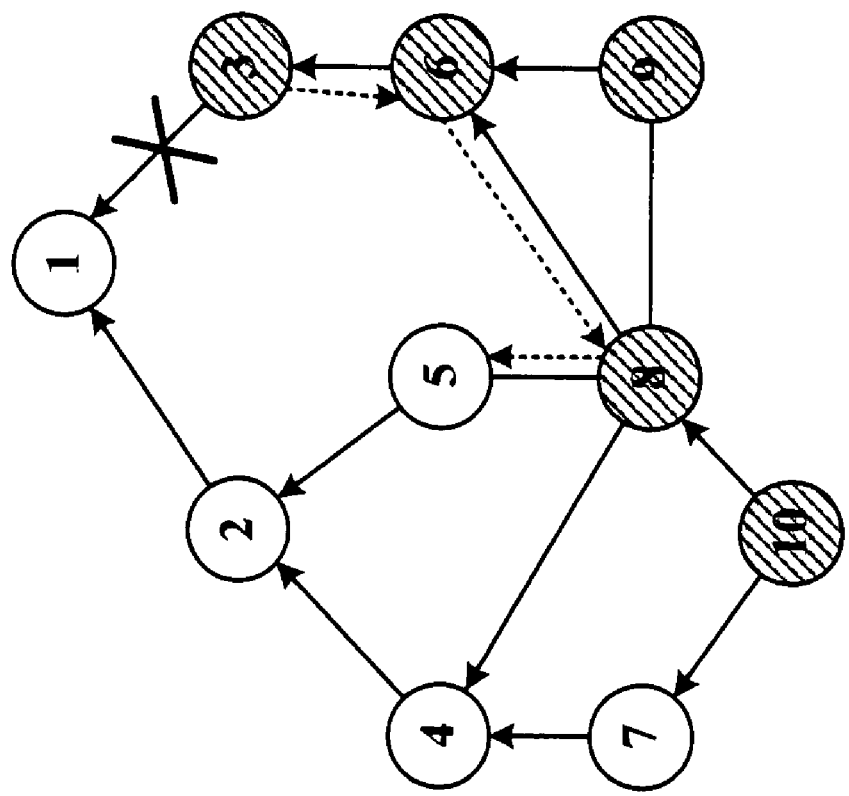

FIGS. 17A-17C illustrate how to determine backup ports in a graph network while avoiding packets being "trapped" in loop, in a manner consistent with the present invention.

Figure 18:
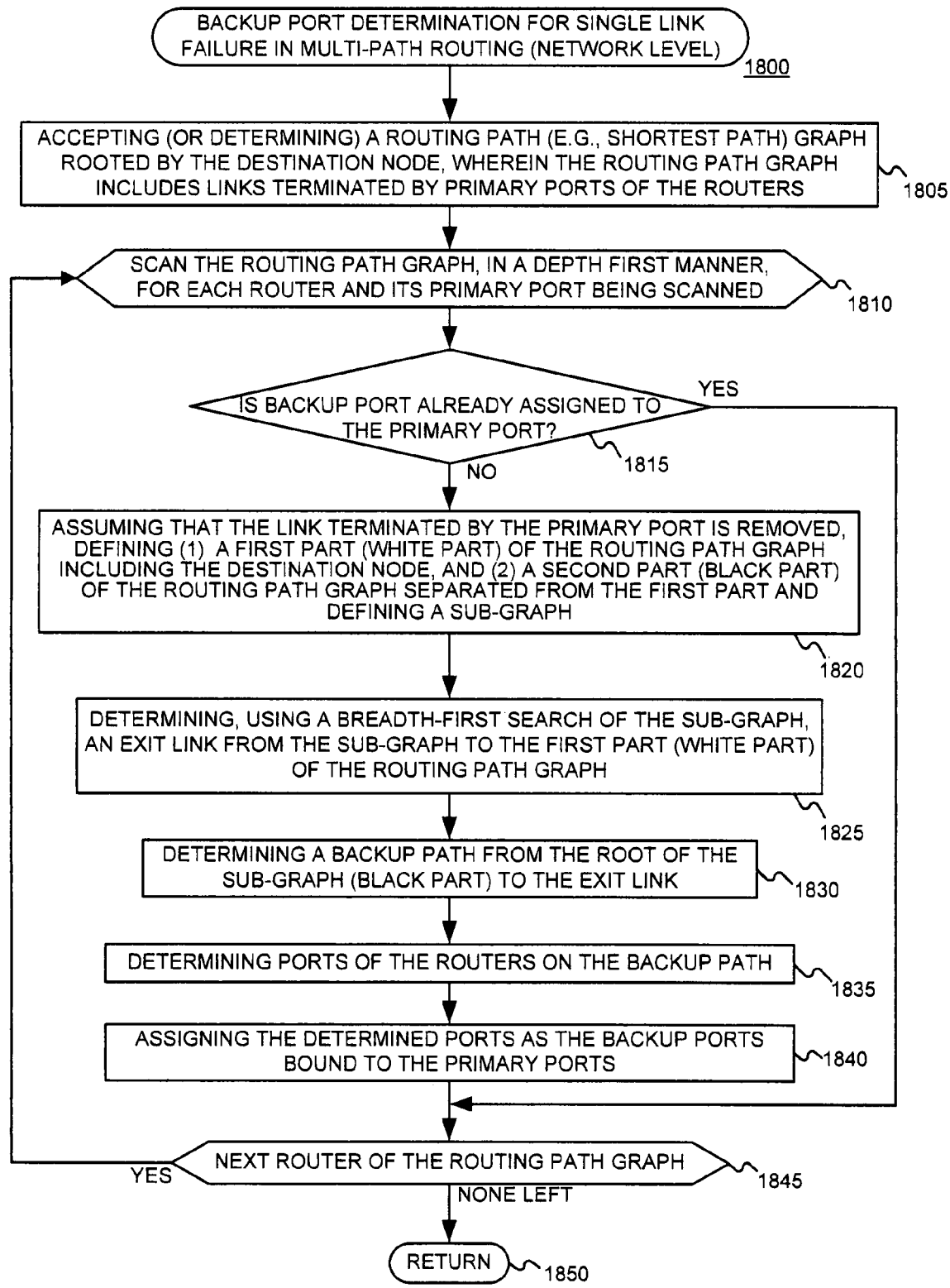

FIG. 18 is a flow diagram of an exemplary method 1800 for determining backup ports for a number of nodes in a multi-path routing IP network for use in recovering from a single link failure, in a manner consistent with the present invention.

FIGS. 19A-19E illustrate a multi-path routed IP network topology with a plurality of nodes having primary ports and the determination of their backup ports in a manner consistent with the present invention.

FIG. 20, which consists of FIGS. 20A, 20B, 20C, 20D, and 20E, is a flow diagram of an exemplary method 2000, for determining backup ports of routers in a survivable multi-path routing IP network for use in recovering from single-node failures, in a manner consistent with the present invention.

FIGS. 21A-21E illustrate an IP network topology with a plurality of nodes having primary ports, and the determination of their backup ports in a manner consistent with the present invention, where node 1 is the destination node.

§4. DETAILED DESCRIPTION

The present invention may involve novel methods, apparatus, message formats, and/or data structures to facilitate fast failure recovery by determining backup ports for nodes within an IP network. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§4.1 Single-Link Failure

§4.1.1 Example of Single Link Failure

The operation of IPFRR in case of a link failure in a simple IP network with nodes having primary ports and backup ports, is described. FIG. 1A illustrates the topology of an IP network in which node 1 is the destination node. For simplicity, node 1 is considered as the single destination within the network. FIG. 1B depicts the primary ports and the backup ports for each node in the IP network of FIG. 1A. The primary ports are illustrated using solid arrows and the backup ports are illustrated using dashed arrows. Each IP router (node) maintains a primary forwarding port for the destination node 1 (or a prefix). These primary ports may be determined, for instance, by constructing a shortest path tree using Dijkstra's algorithm and subsequently determining a primary tree accordingly. For instance, according to FIG. 1B a packet going from node 4 to node 1 would follow the route {4→2→1}. When a failure occurs, some of the primary ports could point to the damaged link and/or node and become unusable. IPFRR proactively calculates backup ports that can be used to replace primary ports temporarily until the subsequent route recalculation is completed. In essence, each IP router (node) has a backup port such that (1) in a case of no failure, all the routers use primary ports for packet forwarding and (2) in a case of failure, a subset (or in some cases, the entire set) of routers switch to the backup ports for failure recovery. FIG. 1B shows the primary and backup ports of the IP network taken into consideration with node 1 as the single destination node.

Figure 1C:
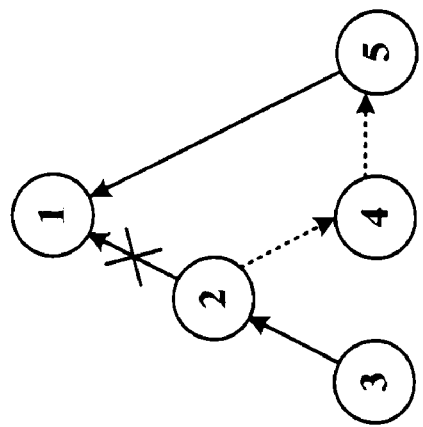
Figure 1B:
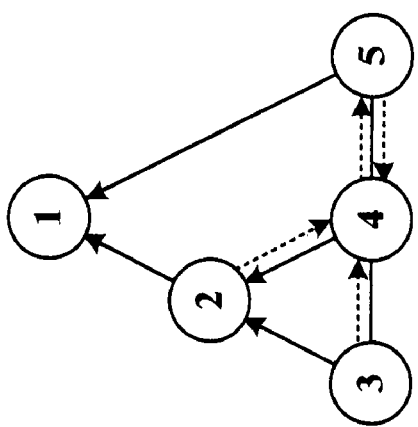
Figure 1A:
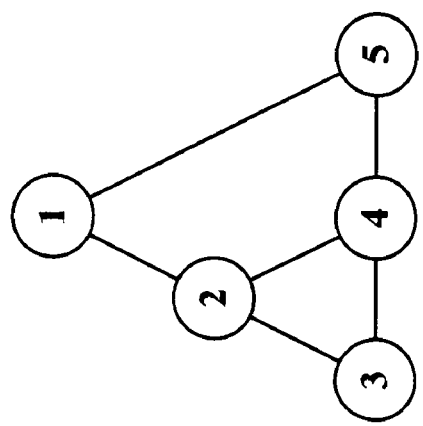

Referring now to FIG. 1C, assume that a failure has occurred on the link between node 1 and node 2 and that node 3 is forwarding packets to be sent to node 1 which is the destination node of the network. In such a scenario, node 2 would be aware of the failure of the link and would not be able to forward packets through its primary port to node 1. Therefore, node 2 switches to its backup port for failure recovery (and subsequent nodes switch to their backup ports as necessary) in order to forward the packets sent by node 3 to node 1. FIG. 1C illustrates the network topology in such a scenario where node 2 and node 4 switch to their backup ports. As a result the packets sent by node 3 to be forwarded to node 1 will follow the route {3→2→4→5→1}.

Figure 2:
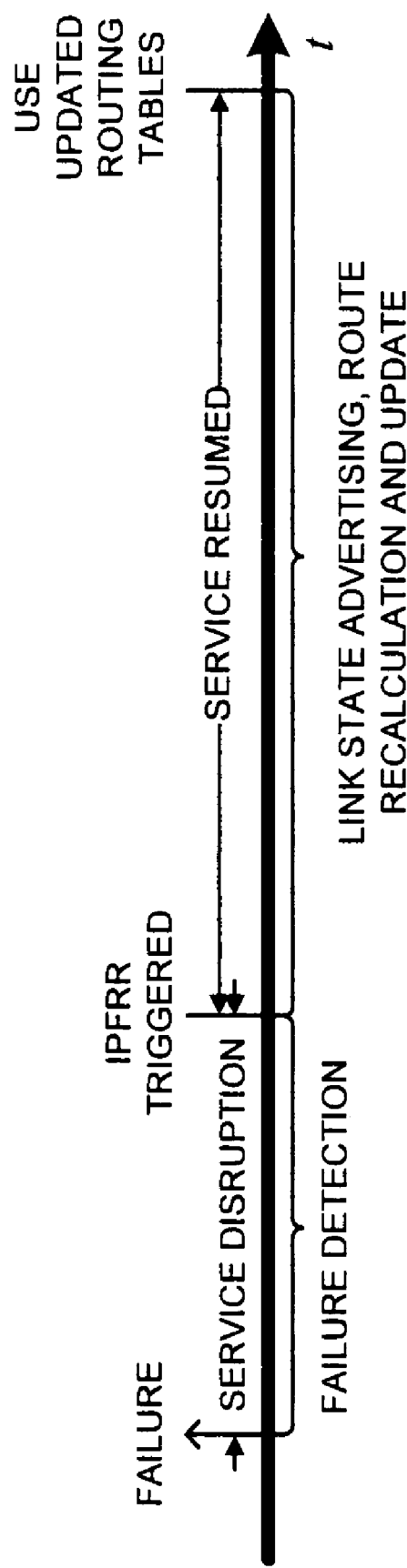
FIG. 2 is a time diagram illustrating a failure and the subsequent failure recovery of an IPFRR scheme consistent with the present invention.

FIG. 2 illustrates a time diagram showing that IPFRR resumes disrupted services immediately after a failure is detected while route recalculation can be performed in parallel. From the above example, it can be appreciated that there are huge benefits achieved by using an IPFRR scheme. In particular, some of the benefits include (i) a link failure may immediately activate backup ports with no route recalculation on the fly, (ii) backup ports are pre-calculated so there is a low requirement for calculation complexity, (iii) survivability of the network is integrated in the IP layer. Some key issues of IPFRR include (1) determining backup ports, (2) performing failure recovery, and (3) distributed implementation. Each is introduced below.

Figure 3:
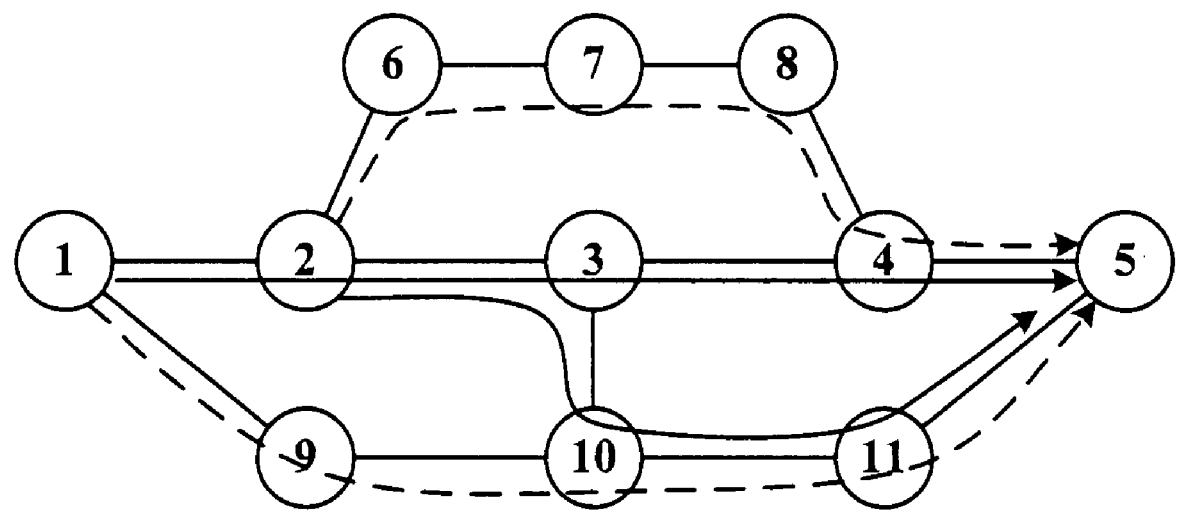
FIG. 3 illustrates traditional link-disjoint primary and backup paths for connection-oriented networks.

Determining backup ports is non-trivial because inconsistency between backup ports may create routing loops. For example, FIG. 1, pointing the backup port of node 4 to node 3 would create a loop. Traditional link-disjoint paths for connection-oriented networks (such as the backup tunnels in MPLS fast reroute) cannot be applied to IPFRR. For example, FIG. 3 shows link-disjoint primary/backup paths for {1→5} and {2→4}. In this case, node 3 forwards packets through different paths based on their flow ID, which is not feasible in IP networks that perform destination-based connectionless routing.

Determining how to perform failure recovery helps routers determine when to use primary/backup ports. In particular, it is desired to make the decision without waiting for failure advertisement to shorten service disruption.

The implementation of IPFRR requires modifying existing routers. Therefore, the complexity and the compatibility to existing routing protocols should be considered. A distributed implementation can be used to avoid excessive signaling among routers.

These issues are addressed by various exemplary embodiments consistent with the present invention.

§4.1.2 Use of Backup Ports for Failure Recovery

One of the key points of IPFRR is how to perform failure recovery. From the aforementioned example, when a failure occurs, only a subset of routers needs to switch to their backup ports. Therefore, a router may need to determine when to forward packets to its backup port and when to use the primary port. While this can be determined based on the location of the failure, failure advertising introduces additional recovery delay. Therefore, the IPFRR scheme may use a different approach that does not require explicit failure notification. Specifically, a packet forwarding policy might be used to determine which port—primary or backup—to use based on (1) destination address and (2) incoming port. The key steps of an exemplary packet forwarding policy consistent with the present invention include:

(1) if a failure is detected on the primary port, the backup port is chosen for packet forwarding.
(2) if a packet comes in from the primary port, it implies a failure on the primary forwarding path. Therefore, the backup port is used to forward this packet, and
(3) otherwise, the primary port is used.

Figure 4:
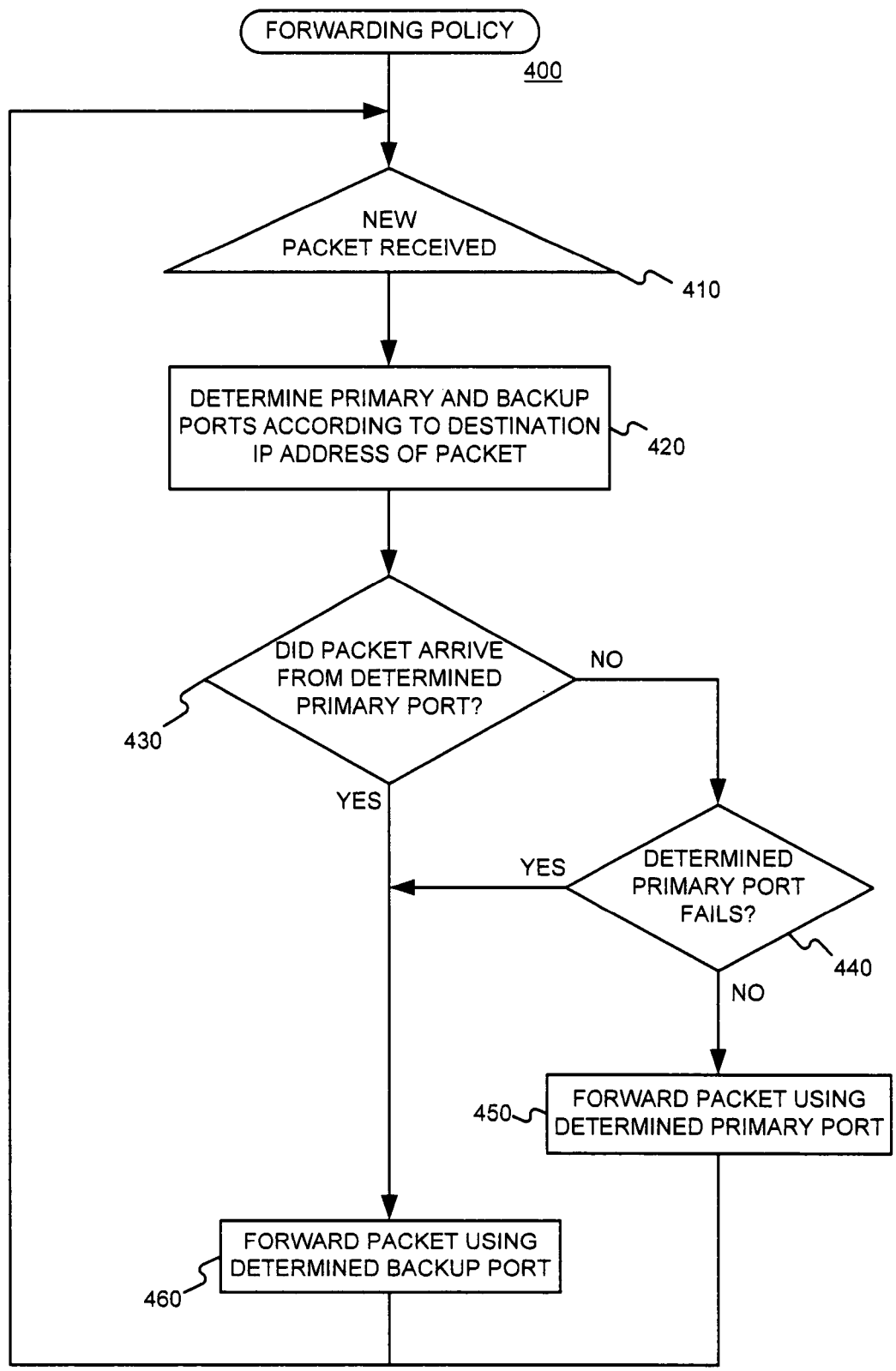
FIG. 4 is a flow diagram of an exemplary method for implementing a forwarding policy for IPFRR on routers of an IP network, in a manner consistent with the present invention.

FIG. 4 is a flow diagram of an exemplary method 400, consistent with the present invention, for implementing the forwarding policy for IPFRR in routers of the IP network. In particular, when a new packet arrives at an IP router the method 400 may determine the primary forwarding port (and perhaps the backup port) of the router according to the destination IP address of the received packet. (Blocks 410 and 420) Next the method 400 may examine whether the packet arrived from the determined primary forwarding port. (Block 430) If the packet arrived from the determined primary forwarding port, then the method 400 may forward the packet using the determined backup port (Block 460) before the method 400 branches back to event block 410. If the packet did not arrive from the determined primary forwarding port, then the method 400 may determine whether the primary forwarding port fails. (Block 440) If the determined primary forwarding port does not fail and is functioning correctly, then the method 400 may forward the packet using the determined primary forwarding port (Block 450) before the method 400 returns to event block 410. On the other hand, if the determined primary forwarding port fails, then the method 400 may forward the packet using the determined backup port. (Block 460).

Referring back to block 420 the primary port (and backup port) might be determined using a longest match of the packet's IP destination address found in the forwarding table.

Referring back to block 430, the method 400 might examine whether the received packet arrives from a determined primary forwarding port in order to avoid packets from being "trapped" in loops between routers. For instance, considering the previous example of FIGS. 1B and 1C, when node 3 forwards a packet to node 2, node 2 may determine its primary forwarding port and backup port. Since the primary link of node 2 failed, it may forward the packet to node 4 through its backup port. Node 4 receives the new packet and determines that the packet has been received through its primary forwarding port. Hence, node 4 will not send the packet back to node 2 but may forward the packet to node 5 through its backup port. If node 4 would have sent the packet back to node 2, the packet would be "trapped" in a loop between node 2 and node 4. Hence, the packet sent by node 3 follows the path $\{3 \rightarrow 2 \rightarrow 4 \rightarrow 5 \rightarrow 1\}$ to reach its destination—namely node 1.

§4.1.3 Determination of Backup Ports for Single-Link Failure

This section provides a detailed explanation of how to determine backup ports for single link failures in an IP network. However, certain assumptions are made. First the topology is assumed to be a "Survivable Topology". A network topology is "survivable" to a category of failures if it remains as a connected graph after the failed links and/or nodes are removed. It is always assumed that the network topology is survivable since it is impractical to achieve failure recovery otherwise. Without loss of generality, node 1 is selected as the destination in the following description unless another node is explicitly specified as the destination. It is further assumed that each link is bidirectional, but the costs along the two directions could be different. No restrictions on the primary paths are introduced, which can be assigned in any manner, including determined using either shortest or non-shortest path algorithms.

In normal operation, the primary paths to node 1 form a spanning tree of the topology. When a failure occurs, a subset of the nodes switch to their backup ports for fast rerouting, and the set of forwarding paths are changed accordingly. The rerouting is correct if and only if the new set of forwarding paths still form a spanning tree with node 1 as the root. Based on this observation, the problem of IPFRR (with node 1 as the destination) can be formulated as the following integer linear programming (ILP) problem. The notations are defined in Table 1.

TABLE 1

(V, E): A network with node set V and link set E
$e_{i,j}$: Binary, $e_{i,j} = 1$ means a link exists from i to j
N: The number of nodes in the network: $N = |V|$
$p_n$: The primary port of node n, the value of $p_n$ is the index of the node the port points to
$b_n$: The backup port of node n, the value of $b_n$ is the index of the node the port points to
$a_n^{x,y}$: Binary $a_n^{x,y} = 0/1$ means node n selects its primary/backup port when link x – y fails
$p_n^{x,y}$: $p_n^{x,y} = p_n(1 - a_n^{x,y}) + b_n a_n^{x,y}$ is the forwarding port used by node n when link x – y fails
$t^{x,y}_{i,j}(n)$: Binary, $t^{x,y}_{i,j}(n) = 1$ means the route from node n to node 1 takes link i → j when link x – y fails The goal of at least some embodiments consistent with the present invention is to minimize the change in the network. Thus, the goal might be to have the fewest routers switch to the backup ports.

Given:

A network (V,E) and the primary port of each node $p_n$ (n= 2, . . . , N).

Minimize:

$$\sum_{x,y \in V} \sum_{n \in V} a_n^{x,y} \quad (1)$$

Subject to:

$$\sum_{m \in V} t^{x,y}_{i,m}(n) - \sum_{l \in V} t^{x,y}_{l,i}(n) = \begin{cases} 1 \rightarrow \text{if } i = n \\ -1 \rightarrow \text{if } i = 1 \\ 0 \rightarrow \text{otherwise} \end{cases} \quad (2)$$

-continued $$f_{i,p_i^{x,y_i}}^{x,y}(n) = \sum_{j \in V} t_{i,j}^{x,y}(n) \quad (3)$$

$$t_{i,j}^{x,y}(1) = 0 \quad (4)$$

$$e_{i,p_i^{x,y_i}} = 1 \quad (5)$$

$$p_x^{x,y} \neq y, \ p_y^{x,y} \neq x \quad (6)$$

$$a_n^{x,y} \leq e_{x,y} \quad (7)$$

$$t_{i,j}^{x,y}(n), a_n^{x,y}, \in \{0, 1\} \quad (8)$$

$$b_n \in V \quad (9)$$

variables in (2)-(9): $\forall x, y, i, j, n \in V; n \neq 1$

In (1), $$\sum_{x,y \in V} \sum_{n \in V} a_n^{x,y}$$

is the total number of backup ports being used when link x-y fails. Therefore, the objective function minimizes the overall change of the forwarding paths under all possible link failures. Constraint (2) guarantees a continuous forwarding path from each node to node 1. Constraint (3) ensures that node i forwards all packets through the same port: $p_{i}^{x,y}$. Together with (2), this guarantees that each path is loop-free. Constraint (4) means node 1 does not generate traffic to itself. Constraints (5) and (6) guarantee that the forwarding port of each node points to the next node through a healthy link. Constraint (7) excludes those (x,y) pairs from the set of failures if they do not represent physical links in the topology.

The ILP provides a generic description of the problem, and has good flexibility in that it can be modified to achieve different optimization objectives with various constraints. Solving the ILP yields two set of variables—ports and configurations. Ports define the backup port of each node: $b_n$. Configurations define the port selection of node n when link x-y fails: $a_n^{x,y}$.

A low-complexity process is presented to find the solution of this ILP. The process is based on sequential search in the primary tree, which will be called ESCAP_LINK. It contains the following acts:

1) Initialize: Set the backup port of each node to null, i.e., $b_n$=0, (n=2, ..., N).
2) Explore the primary tree T(1) using depth-first search. For each node n, (n=2, ..., N), assume its primary port $p_n$ fails (i.e., link n→$p_n$ fails) and do the following:
   a) If $b_n \neq 0$, the backup port of node n is already found, go back to act 2 to process the next node; otherwise, continue to the next act.
   b) The failure disconnects a sub-tree T(n) from the primary tree, where n is the root of the sub-tree. Dye the nodes in T(n) black and all the other nodes in the topology white. The forwarding path from each white node is not affected by the failure.
   c) In T(n), use breadth-first search to find the first node i that has a direct link to a white node j, set its backup port $b_i$=j. This port i→j is called an "exit" of sub-tree T(n).
   d) If i≠j, find the path from n to i in T(n). Suppose the path is n→$m_1$→$m_2$ ... →$m_L$→i. Set the corresponding backup ports as $b_n$=$m_1$, $b_{m_1}$=$m_2$, ..., $b_{m_L}$=i. Go back to act 2.

The ESCAP_LINK process minimizes the number of switchovers in (1) if the primary tree is obtained using minimum hop routing. As proof, when the primary port of node k fails, the exit of T(k) is found using breadth first search. Therefore, the hop count from node k to the exit is minimized (since the primary tree is based on minimum hop routing). This minimizes the number of switch-overs because choosing any other exit requires more nodes to use backup ports. Since the ESCAP_LINK algorithm minimizes the number of switch-overs under any possible failure, it achieves the optimality in equation (1).

The ESCAP_LINK process has low computation complexity. Although it contains two nested searches in the tree, the CPU cycles consumed by each act are very limited. In act 2a, a node is immediately skipped if its backup port is already found. In act 2c, the process only checks if a node has a white neighbor, and thus requires very little computation. In act 2d, the path from n to i is exactly the reverse of the primary path from i to n, which does not require complicated route calculation.

If the ESCAP_LINK process is implemented in a distributed manner, each router only runs a part of the algorithm. For node n, it finds its backup port $b_n$ and stops immediately. Denote the primary path from node n to node 1 as n→$y_L$→$y_{L-1}$→ ... →$y_1$→1, the computation is simplified by repeating acts 2a to 2d from $y_1$, ... $y_L$,n.

§4.1.3.1 General Method

Figure 5:
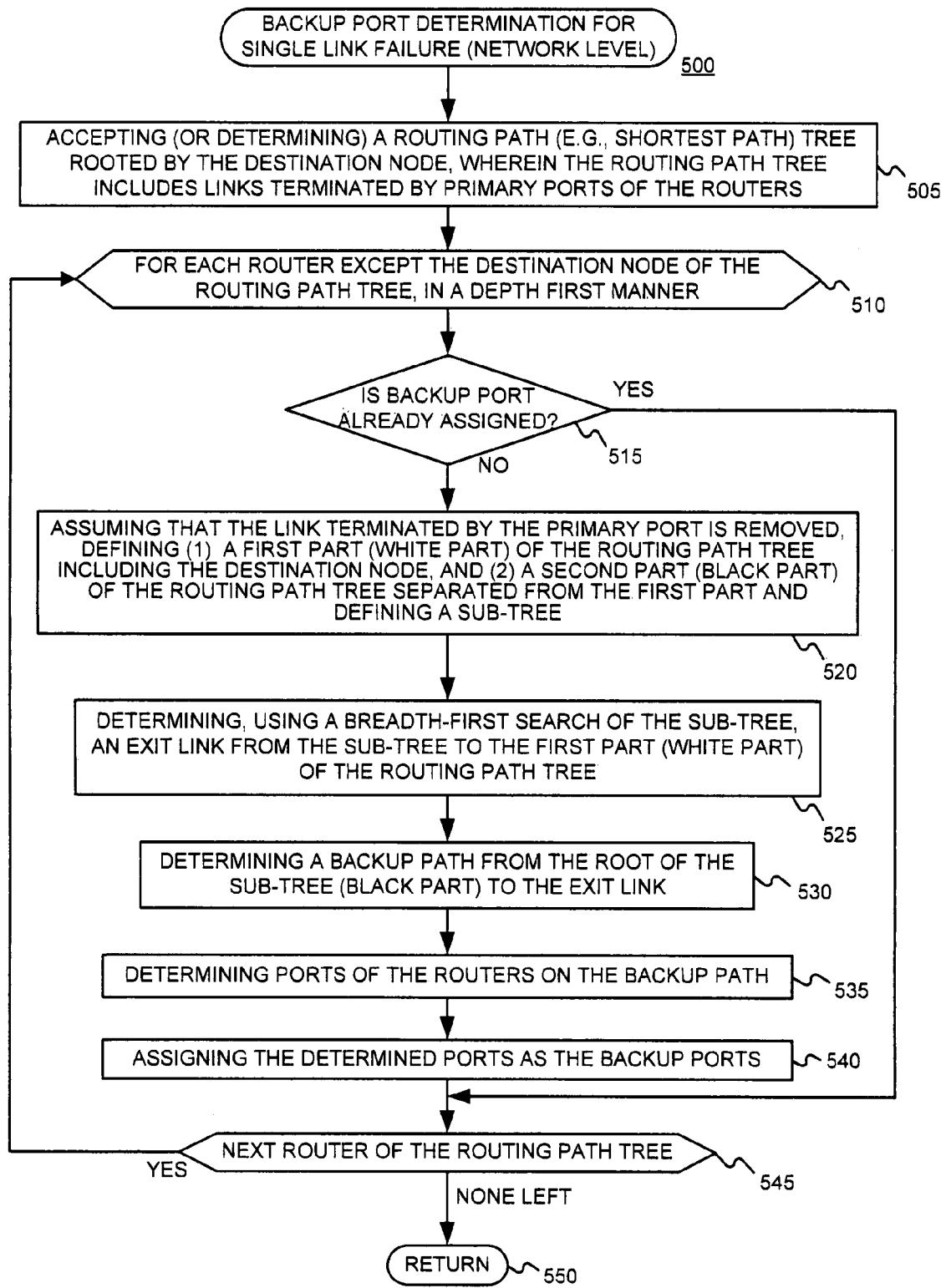
FIG. 5 is a flow diagram of an exemplary method for determining backup ports of various nodes of an IP network (to be used for single link failure recovery), in a manner consistent with the present invention.

FIG. 5 is a flow diagram of an exemplary method 500 for determining backup ports for a number of nodes in an IP network for use in recovering from a single link failure, in a manner consistent with the present invention. This method 500 might be run at one location and the results might be signaled to the appropriate nodes. As shown, the method 500 may accept (or determine) a routing path (e.g., shortest path) tree rooted by the destination node, wherein the routing path tree includes links terminated by primary ports of the routers. (Block 505). As indicated by loop 510-545, a number of acts may be performed for each router except the destination node (router) of the routing path tree, in a depth first manner. Specifically, the method 500 may first determine if the router already has a port assigned as a backup port. (Block 515) If it is determined that the router already has a backup port assigned to it, the method 500 may simply proceed to examine the next router of the routing path tree. (Blocks 515 and 545) On the contrary, if it is determined that the router does not have a backup port the, method 500 may proceed to determine a backup port for the router as shown in blocks 520-540. Specifically, the method 500 may do so as follows. Assuming that the link terminated by the primary port is removed, the method 500 may define (1) a first part of the routing path tree including the destination node (referred to as "the white part") and (2) a second part of the routing path tree separated from the first part and defining a sub-tree (referred to as "the black part"). (Block 520) Subsequently, the method 500 may determine, using a breadth-first search of the sub-tree, an exit link from the sub-tree (the black part) to the first part of the routing path tree (the white part). (Block 525) After finding an exit link from the sub-tree (the black part) to the first part of the routing path tree (the white part), the method 500 may determine (e.g., using Dijkstra's algorithm) a backup path from the root of the sub-tree (the black part) to the exit link. (Block 530) Next, the method 500 may determine ports of the routers on the backup path (Block 535) and assign the determined ports as the backup ports (Block 540). The method 500 may then move on to the next router in the routing path tree and repeat the above steps in determining backup ports. (Block 545) When the loop 510-545 has been run for each router of the routing path tree, the method 500 is left. (Node 550)

The method 500 may be repeated for each destination prefix or node.

§4.1.3.2 Distributed Method

The aforementioned process can be run distributively, on each router of the routing path tree if each router has knowledge of the overall topology, such as routers using link-state routing protocols, such as OSPF. For simplicity, how a router might perform backup port determinations is described, and the details of mapping such information to each specific prefix are omitted. Without loss of generality, assume router 1 is the destination and consider the calculations in router k. With link-state routing, each router can obtain the overall topology of the autonomous system (AS) and thus calculate the primary tree to router 1. Denote the primary path from router k to 1 as k→$m_L$→...→$m_1$→1. Only the failures along this path may trigger router k to use its backup port. Therefore, router k finds its backup port by searching along its primary path. In act (2) of the ESCAP_LINK process described in §4.1.3 above, the process explores the whole primary tree. In the distributed implementation in router k, the only change is to replace this act with the following. For a single-link failure backup port, from $m_1$ to $m_L$ to k, sequentially pick a router and assume a failure on its primary port, run the subsequent acts of ESCAP_LINK until the backup port of router k is found. As a result of the above-described distributed process, by scanning a subset of the topology, the efficiency of the calculation is further improved.

Figure 6A:
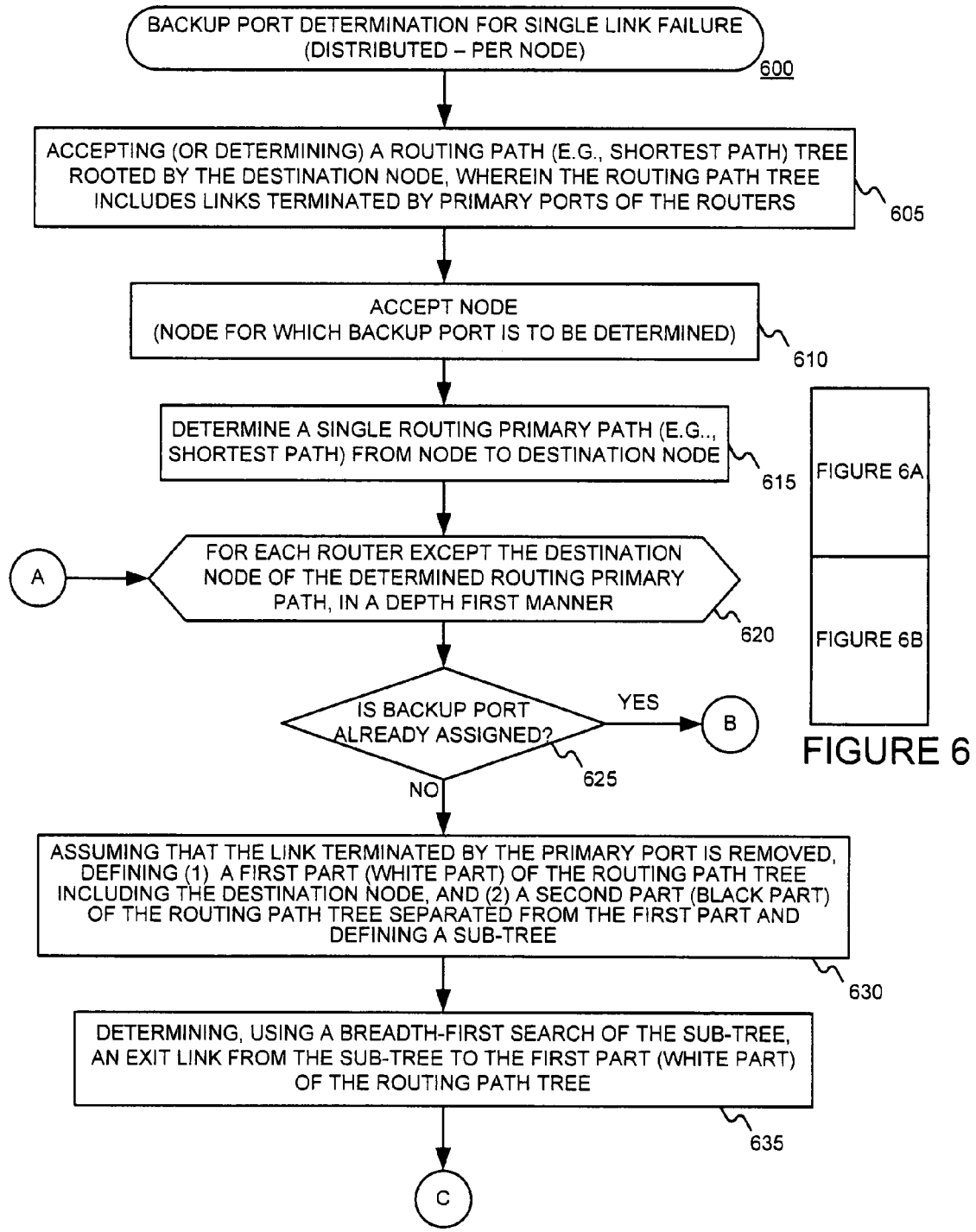
FIG. 6 is a flow diagram of an exemplary method for determining backup ports in a distributed manner (per node of the IP network) (to be used for single link failure recovery), in a manner consistent with the present invention.
Figure 6B:
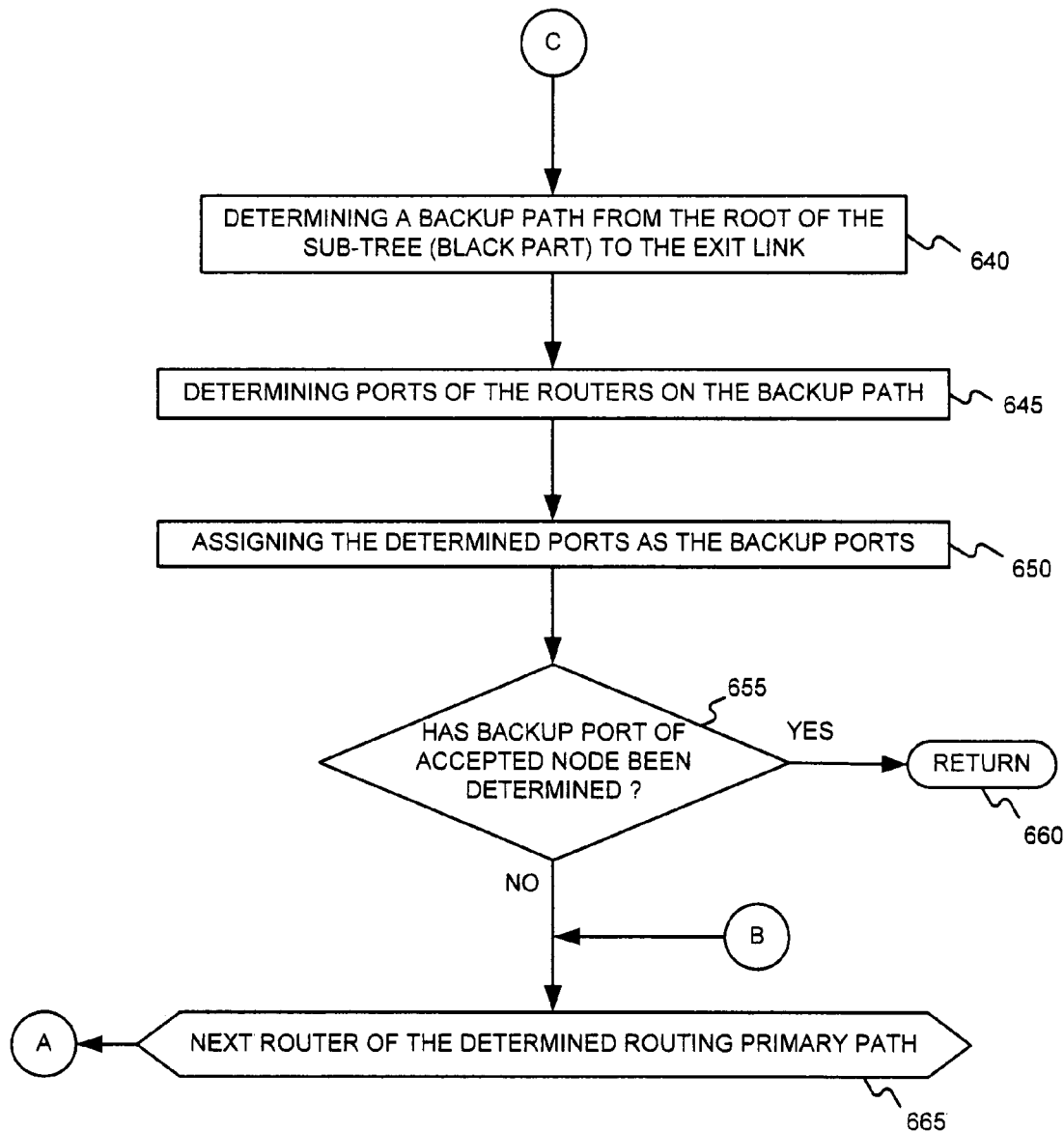

FIG. 6 is a flow diagram of an exemplary method 600 for determining backup ports in a distributed manner (per node of the network) for recovering from a single link failure in an IP network, in a manner consistent with the present invention. In particular, the method 600 may accept (or determine) a routing path (e.g., shortest path) tree rooted by the destination node, wherein the routing path tree includes links terminated primary ports of the routers. (Block 605) Further, the method 600 may accept a node/router (node for which backup port is to be determined) and determine a single routing primary path (e.g., shortest path) from the accepted node to the destination node. (Blocks 610 and 615) As indicated by loop 620-665, a number of acts may be performed for each router except the destination node (router) of the determined routing primary path tree, in a depth first manner. Specifically, the method 600 may first determine if the router already has a port assigned as a backup port. (Block 625) If it is determined that the router already has a backup port assigned to it, the method 600 may simply proceed to examine the next router of the determined routing primary path tree. (Blocks 625 and 665) On the contrary, if it is determined that the router does not have a backup port the, method 600 may proceed to determine a backup port for the accepted node/router as shown in blocks 630-665. Specifically, assuming that the link terminated by the primary port is removed, the method 600 may define (1) a first part of the routing path tree including the destination node (referred to as "the white part"), and (2) a second part of the routing path tree separated from the first part and defining a sub-tree (referred to as "the black part"). (Block 630) Subsequently, using a breadth-first search of the sub-tree, the method 600 may determine an exit link from the sub-tree (the black part) to the first part of the routing path tree (the white part). (Block 635) After finding an exit link from the sub-tree (the black part) to the first part of the routing path tree (the white part), the method 600 may determine (e.g., using Dijkstra's algorithm) a backup path from the root of the sub-tree (the black part) to the exit link. (Block 640) Next, the method 600 may determine ports of the routers on the backup path (Block 645) and assign the determined ports as the backup ports (Block 650). Subsequently, the method 600 may check whether the backup port of the accepted node/router has been determined by effect of the above steps. (Block 665) If the backup port of the accepted node/router has not been determined, the method 600 may then move on to the next router in the determined routing primary path and repeat the above steps in determining backup ports. (Block 665) When the loop 620-665 has been broken by decision block 665, meaning that the backup port for the accepted node/router has been determined, the method 600 is left. (Node 660)

The method 600 may be run by each router of the routing path tree.

The method 600 may be repeated for each destination prefix or node.

§4.1.4 Illustrative Example of Operations of Exemplary Process

FIGS. 7A-7E illustrate an IP network topology with a plurality of nodes having primary ports and the determination of their backup ports in a manner consistent with the present invention. Node 1 is the destination node.

Figure 7A:
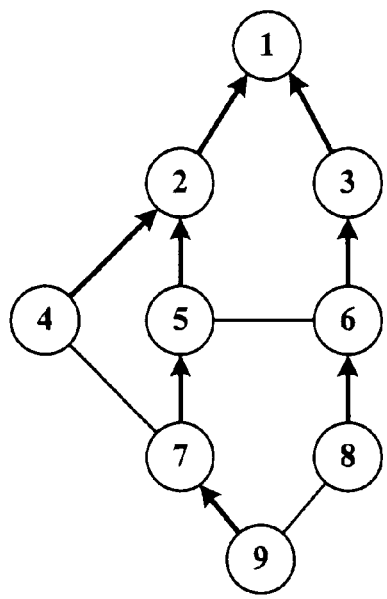
FIGS. 7A-7E illustrate the determination of backup ports for nodes in an IP network topology in which the nodes have primary ports for single destination node 1, using a method consistent with the present invention.
Figure 7B:
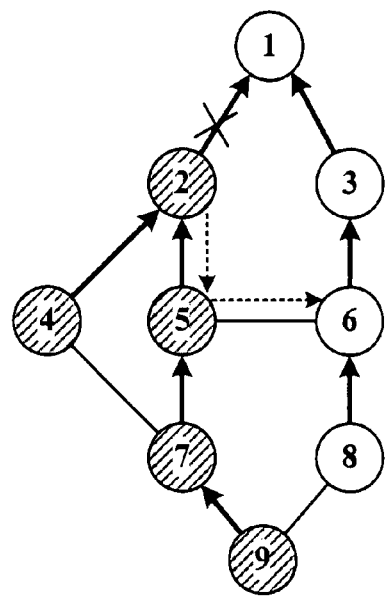

FIG. 7A illustrates the IP network topology with a plurality of nodes having primary ports depicted as termination the thicker, arrowed links, where node 1 is the single destination. In order to determine the backup ports for each router (node), the ESCAP_LINK process may be employed which will sequentially determine backup ports for each router (except node 1) in the network. The acts involved in determining the backup ports may be summarized by following the flowchart of FIG. 5 or the detailed acts of the ESCAP_LINK process described in §4.1.3. For instance, by following the ESCAP_LINK process, FIG. 7B illustrates the assumed failure (removal) of the link between node 2 and node 1 which creates a sub-tree T(2) illustrated by the black (hatched) nodes. Using a breadth-first search of the sub-tree T(2), an exit to a white colored node 5→6 is found and the rerouting path is 2→5→6. Thus, the backup port for node 2 and node 5 which is illustrated by dashed arrows going from node 2 to node 5 and from node 5 to node 6 respectively is determined.

Continuing the depth-first processing, an assumed failure (removal) of the link between node 5 and node 2 creates sub-tree T(5) (not illustrated). However, determining the backup port of node 5 can be skipped since they have already been determined by the failure between node 2 and node 1.

Figure 7C:
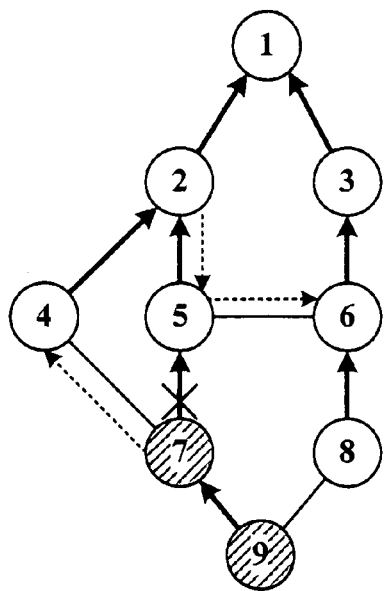

Continuing the depth-first processing, an assumed failure (removal) of the link between node 7 and node 5 illustrated by FIG. 7C, creates a sub-tree T(7) illustrated by the black (hatched) nodes. Following the same procedures as above yields a backup port for node 7, illustrated by a dashed arrow going from node 7 to node 4.

Figure 7D:
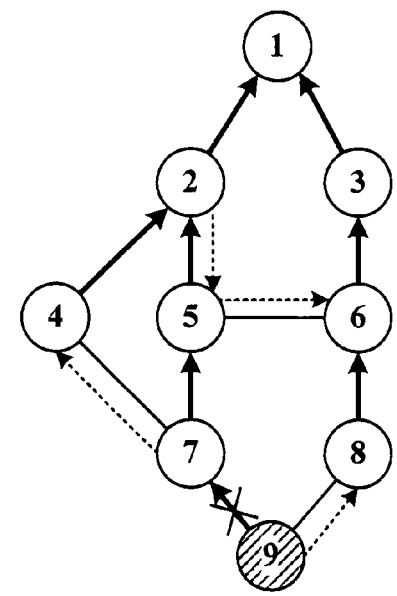
Figure 7E:
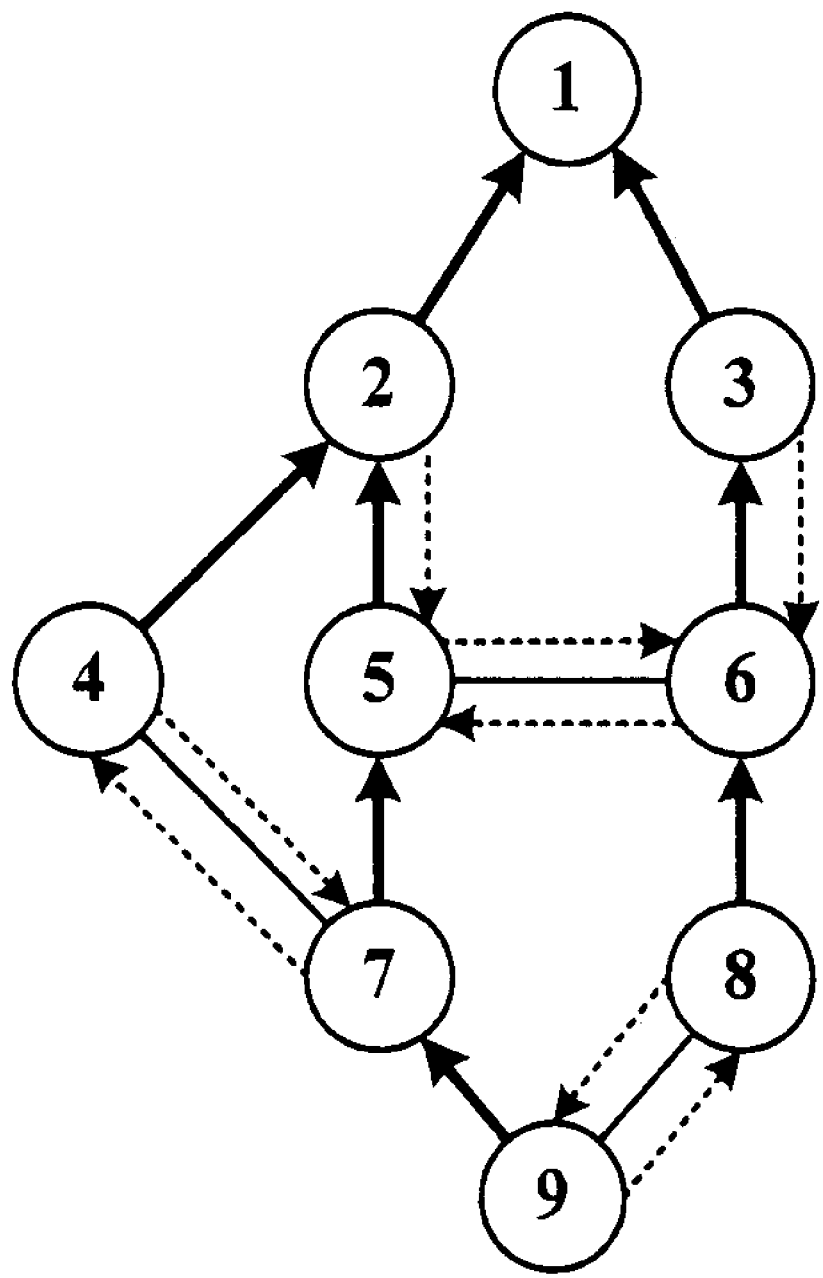

Continuing the depth-first processing, an assumed failure (removal) of the link between node 9 and node 7 yields a backup port for node 9 as illustrated in FIG. 7D. Proceeding in a similar manner for each node in the network (except node 1 which is the destination node) all determined backup ports are illustrated in FIG. 7E.

When determining the backup ports of the network of FIG. 7A in a distributed manner, the ESCAP_LINK process does not need to search for backup ports for every node but only a subset. For example, node 9 in FIG. 7A only needs to sequentially check failures for links from node 2-node 1, node 5-node 2, node 7-node 5 and node 9-node 7. Therefore, complexity reduction is achieved by distributing the determination among the various nodes of the routed tree.

§4.2 Single-Node Failure

§4.2.1 Example of Single-Node Failure

Figure 8B:
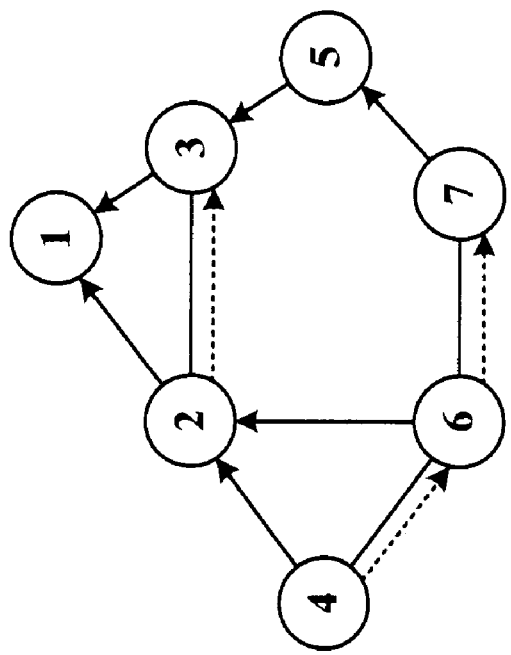
FIGS. 8A and 8B illustrate the difference in backup port determination between a single-link failure (link 2→1) and a single node failure (node 2), in a manner consistent with the present invention.
Figure 8A:
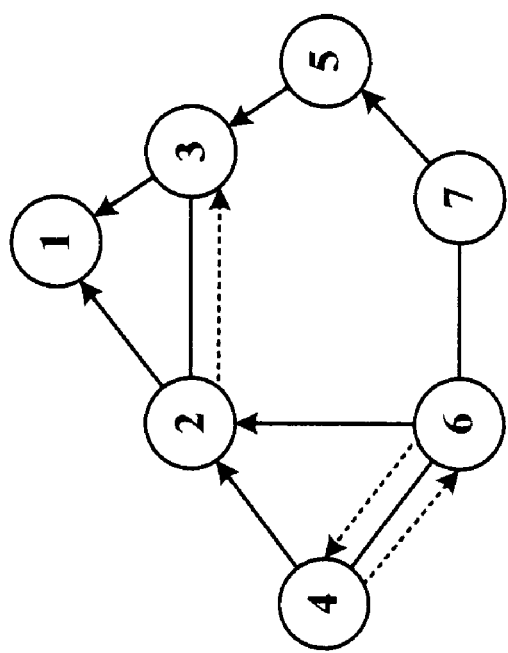

Single-node failures are different from single-link failures in that the failure of a node effectively disables all the links directly connected to it. Consequently, several sub-trees could be detached from the primary tree. Therefore, techniques for recovering from single-link failures can not be used to handle this situation. For example, in FIG. 8A, the backup ports of nodes 2, 4, and 6 (dashed arrows) are able to handle any single link failure on the links from node 2-node 1, node 4-node 2, or node 6-node 2. However, this configuration cannot recover from the failure of node 2. In contrast, FIG. 8B provides a solution to handle the failure of node 2. Assuming that the network topology is survivable to any single-node failures, an exemplary method described below to find backup ports for IPFRR that provide 100% coverage of single-node failures.

FIG. 9A illustrates the topology of a survivable IP network, with node 1 as the destination node. For simplicity node 1 is considered as the single destination within the network. FIG. 9B illustrates the topology of the IP network of FIG. 9A (with node 1 as the destination node) and depicts the primary ports, as well as the backup ports, for each node. The primary ports are illustrated using solid, arrowed lines and the backup ports are illustrated using dashed, arrowed lines. Each IP router (node) maintains a primary forwarding port for a destination (prefix). These primary ports may be determined, for instance, by constructing a shortest path tree using Dijkstra's algorithm and subsequently determining a primary tree accordingly. For instance, according to FIG. 9B, a packet going from node 8 to node 1 would follow the route {8→4→2→1}.

When a failure occurs, some of the primary ports could use or point to the damaged link or node and become unusable. At least some embodiments consistent with the present invention proactively calculate backup ports that can be used to replace primary ports temporarily, in the event of a node failure, until the subsequent route recalculation is completed. When configured, each IP router (node) has a backup port such that (1) in a case of no failure, all the routers use primary ports for packet forwarding and (2) in a case of (node) failure, a subset of routers switch to the backup ports for failure recovery. FIG. 9B shows the primary and backup ports of the IP network with node 1 as the single destination node.

Referring to FIG. 9C, assume that a failure has occurred on node 2, and that node 8 is forwarding packets to be sent to destination node 1. In such a scenario, the "children" nodes of node 2 (i.e., node 4, node 5 and node 6) would be aware of the failure of the node 2 and would not be able to forward packets through their primary ports to node 2. For instance, node 4 would not be able to send packets received by node 8 to node 1 since node 2 has failed. Therefore, node 4 switches to its backup port for failure recovery and subsequent nodes switch to their backup ports in order to forward the packets sent by node 8 to node 1. FIG. 9C illustrates the network topology if node 2 fails. As shown, nodes 4, 5, 6, 8 and 10 switch to their backup ports. As a result the packets sent by node 8 to be forwarded to node 1 will follow the route {8→4→ (failure discovered) 8→9→5→10→6→10 (failure discovered)→7→3→1}.

§4.2.2 Use of Backup Ports for Failure Recovery

As mentioned in the discussion of single-link failures in §4.1 above, one of the key properties of IPFRR is how it performs failure recovery. From the aforementioned example, when a failure occurs, only a subset of routers needs to switch to their backup ports. Therefore, a router should determine (or be informed of) when to forward packets to a destination node using its backup port and when to use the primary port. An exemplary packet forwarding policy consistent with the present invention might determine which port to use based on two factors—destination address and incoming port. The exemplary packet forwarding policy in case of a single-node failure is the same as in a case of a single-node failure. (Recall, e.g., method 400 of FIG. 4.) For instance a packet sent to node 1 by node 8 in FIG. 9C would follow the following route according to the packet forwarding policy illustrated in FIG. 4: {8→4→8→9→5→10→6→10→7→3→1}. Alternatively, nodes 8 and 10 can learn to avoid repeatedly sending packets to nodes 4 and 6 for each packet of a stream.

§4.2.3 Determination of Backup Ports for Single-Node Failure

The following describes how to determine backup ports for single-node failures in a survivable IP network. The assumptions in §4.1.3 are also assumed here.

A set of notations similar to those in Table 1 paragraph §4.1.3 are used, except that the superscript x, y (for the failure of link x-y) is replaced with k, which stands for the failure of node k (k≠1). The formulation of an exemplary single-node failure recovery consistent with the present invention is similar to that of the single-link failure scenario, as given below.

Given:

A network (V,E) and the primary port of each node $p_n$, (n=2, ..., N).

Minimize:

$$\sum_{k \in V, k \neq 1} \sum_{n \in V, n \neq k} d_n^k \qquad (10)$$

Subject to:

$$\sum_{m \in V} t_{i,m}^k(n) - \sum_{l \in V} t_{l,i}^k(n) = \begin{cases} 1 \to \text{if\_i} = n \\ -1 \to \text{if\_i} = 1 \\ 0 \to \text{otherwise} \end{cases} \qquad (11)$$

$$t_{i,p_i^k(n)}^k(n) = \sum_{j \in V} t_{i,j}^k(n) \qquad (12)$$

$$t_{i,j}^k(1) = 0, t_{i,j}^k(k) = 0 \qquad (13)$$

$$e_{i,p^{ki}} \neq 1 \qquad (14)$$

$$p_i^k \neq k \qquad (15)$$

-continued $$t_{i,j}^k(n), a_n^k, \in \{0, 1\} \quad (16)$$

$$b_n \in V \quad (17)$$

variables in (11)-(17): ∀k, i, j, n∈V; k≠1; n≠1

The objective function of the formulation (10) still minimizes the total number of switch-overs under all possible node failures, and the constraints (11)-(17) are similar to some of those (2)-(9), respectively, set forth in the single-link failure scenario. Constraint (13) means the root node and any failed node do not generate traffic. Constraints (14) and (15) guarantee that forwarding ports are always connected to healthy links.

An efficient sequential search process to find the backup ports to recover from single node failures is now described. This exemplary process is also based on sequential search, which is called ESCAP_NODE. Without loss of generality it is assumed a network with primary paths forming a spanning tree and select node 1 as the root and destination. The sub-tree routed at node n is denoted as T(n) and the ESCAP_NODE process performs the following acts to find the backup port of each node.

(1) Initialize: Set the backup port of each node to null, i.e., $b_n$=0, (n=2, . . . , N).

(2) Explore the primary tree T(1) using depth-first search. For each node n (n=2, . . . , N), do the following:

a) If node n is a child of the root node and $b_n$=0, assume the link between it and the root fails, dye all the nodes in sub-tree T(n) black and the other nodes in the topology white, and go to the next act ((2), a), i)); otherwise go to act ((2), b)). the goal here is to find a link connecting the black sub-tree to a white node, and may call such a link an exit.

i) Scan T(n) using breadth-first search to find the first node j that has a white neighbor w, set $b_j$=w, which is an exit.

ii) Following the links in T(n), find the path from n to j, which is the recovery path. Set the backup ports of the nodes on the recovery path based on the direction of the path.

iii) Dye all the nodes in T(n) white, go to act ((2), b))

b) Assume node n fails, dye all the nodes in sub-tree T(n) black and the other nodes in the topology white. If node n has $m_n$ children, denote the child nodes as $c_1, \ldots, c_{m_n}$ c) For each child i (i=$c_1, \ldots, c_{m_n}$), if its backup port $b_i$≠0, dye all the nodes in T(i) white.

d) Node n and all the black nodes form a tree, denote it as T*(n). Repeat the following steps to update T*(n) until it is reduced to contain only one node: node n, and then go back to act (2).

i) In T*(n), use breadth-first search to find the first node j that has a white neighbor w, set $b_j$=w, which is an exit.

ii) Search the children of node n: $\{c_1, \ldots, c_{m_n}\}$ to find the node r whose sub-tree contains the exit node, i.e., j∈T(r).

iii) Following the links in T(r), find the path from r to j, which is the recovery path. Set the backup ports of the nodes on the recovery path based on the direction of the path.

iv) Dye all the nodes in T(r) white, and go back to act ((2), d)).

The foregoing exemplary ESCAP_NODE process guarantees 100% recovery of node failures. This can be explained as follows. Considering any sub-tree that is created by the failure of its parent node, since the topology is survivable, there must be at least one link that connects this sub-tree to a node from which the destination node can be reached. Therefore, each search in act 2(d)(i) always ends up with an exit being found. This guarantees the failure recovery.

However, the foregoing process does not always minimize the number of nodes that require switch-over (from a primary port to a backup port). When a node failure creates multiple "black" sub-trees, they may have to traverse one another to reach a "white" node for the recovery. In this case, there could be several combinations to form the recovery paths. The foregoing process uses sequential search, and therefore does not explore all the combinations. Consequently, optimality is not guaranteed since the order in which multiple "black" sub-trees are processed could affect the backup port determination. Naturally, all combinations could be tried, and the results compared, in order to obtain the best solution. However, this comes at the cost of additional computational complexity.

FIG. 10 illustrates an example, where the result of the foregoing process requires switch-overs at node 5, 6, 7, 8 and 11 to recover from the failure of node 3. Note that pointing the backup port of node 6 to node 12 could have avoided the switch-over at node 8.

Compared to ESCAP_LINK, the ESCAP_NODE process has higher complexity as it may need to perform more than one breadth-first search for each node failure. The number of searches is determined by the number of children of the failed node. Nevertheless, the ESCAP_NODE process does not consume a lot of CPU cycles and memory since there are no complex computations in each act, and the search of a sub-tree will typically explore only a part of the topology.

Although a depth-first search is used in act (2), the process might use a breadth-first search instead. This is because the backup port of a node could be affected only by its parent or indirect parent (other ancestor). Therefore, the only requirement for the sequence of search is to find the backup ports from the top to the bottom of a primary tree. This rule also applies to the ESCAP_LINK process.

The backup ports found using the ESCAP_NODE process also guarantees 100% recovery of single-link failures. This is because a link failure is a subset of the failure of the node that it is directly connected to. Further, after the Initialization act (1), the process checks for link failures at nodes directly connected to the root node (destination node 1) and determines their backup ports. In essence, the ESCAP_NODE process runs the ESCAP_LINK process for the nodes directly connected to the destination node in case of link failures. For example, referring to FIG. 9B, this would set 2→3 and 3→2 as the backup ports of nodes 2 and 3, respectively.

§4.2.3.1 General Method

FIG. 12, which consists of FIGS. 12A, 12B, 12C, 12D, and 12E, is a flow diagram of an exemplary method 1200, for determining backup ports of routers in a survivable IP network for use in recovering from single-node failures, in a manner consistent with the present invention. The method 1200 might be performed at a single location, with resulting backup ports being distributed to appropriate routers. In particular, the method 1200 may accept (or determine) a routing path (e.g., shortest path) tree rooted by the destination node. (Block 1210) As indicated by loop 1220-1290, a number of acts may be performed for each router (node) except the destination node of the routing path tree. Specifically, the method 1200 may first determine if the router is a "child" router of the destination node. (Block 1230) If it is determined that the router is not a "child" router of the destination node, the method 1200 may simply proceed to determine backup ports of routers. (Blocks 1240-1286) On the contrary, if it is determined that the router is a "child" router of the destination node, the method 1200 may further examine whether the backup port of the "child" router is already assigned. (Block 1231) If a backup port of the "child" router has already been assigned, the method 1200 may simply proceed to determine backup ports of routers as shown in blocks 1240-1286. On the contrary, if a backup port of the "child" router hasn't been assigned, the method 1200 may determine a backup port for the "child" router as shown in blocks 1232-1236. Specifically, assuming that the link terminated by the primary port is removed, the method 1200 may define (1) a first part (WHITE PART) of the routing path tree including the destination node, and (2) a second part (BLACK PART) of the routing path tree separated from the first part and defining a sub-tree. (Block 1232) Subsequently, using a breadth-first search of the sub-tree, the method 1200 may determine an exit link from the sub-tree (the black part) to the first part of the routing path tree (the white part). (Block 1233) After finding an exit link from the sub-tree (the black part) to the first part of the routing path tree (the white part), the method 1200 may determine (e.g., using Dijkstra's algorithm) a backup path from the root of the sub-tree (the black part) to the exit link. (Block 1234) Next, the method 1200 may determine ports of the routers on the backup path (Block 1235) and assign the determined ports as the backup ports (Block 1236) before retuning back to the steps in the process to determine backup ports of routers. (Blocks 1240-1286) Specifically, the method 1200 may define a removed router, thereby defining (A) a first part of the routing path tree including the destination node (referred to as "the white part"), and (B) a second part of the routing path tree rooted by the removed router (referred to as "the black part"). (Block 1240) Subsequently, as indicated by loop 1250-1280, for each adjacent downstream router of the removed router in the routing path tree (i.e., for each child node of the removed node), the method 1200 may define a further sub-tree rooted by the adjacent downstream router. (Block 1260) Next, the method 1200 may determine whether a backup port of the adjacent downstream router has been already assigned. (Block 1270) If the backup port of the adjacent downstream router has not been assigned, then the method 1200 may simply search for the next adjacent downstream router of the removed router. (Block 1280) On the contrary, if the backup port of the adjacent downstream router has already been assigned, the method 1200 may proceed to redefine the first part (white part) of the routing path tree to include the sub-tree determined to be routed by a node with an assigned backup port, and redefine the second part (black part) of the routing path tree to exclude the sub-tree determined to be routed by a node with an assigned backup port (Block 1271). Thereafter, the method 1200 checks for the next adjacent downstream router of the removed router. (Block 1280) If no other adjacent downstream routers of the removed router are left unexamined by loop 1250-1280, the method 1200 may go on to check if there are any of the one or more sub-trees (defined by the previous acts above) not included in the first part (white part) of the routing path tree. (Blocks 1280 and 1281) If there are no sub-trees excluded from the first part (white part), the method 1200 may advance to the act of checking for a next router of the routing path tree. (Block 1290) On the contrary, if one or more sub-trees not included in the first part (white part) do exist, then the method 1200 may advance to the following acts in the process defined by loop 1281-1286. Specifically, using a breadth first search of the second part (black part) of the routing tree, excluding the removed router, the method 1200 may find a first router with a link to the first part (white part) of the routing tree and define the first router as an exit node. (Block 1282) The method 1200 may then determine which of the one or more sub-trees rooted by the one or more adjacent downstream routers of the removed router, includes the exit node. (Block 1283) A recovery path from the root of the sub-tree determined to include the exit node, to the exit node, is determined. (Block 1284) The method 1200 may then set, based on the determined recovery path, backup ports of routers in the sub-tree determined to include the exit node. (Block 1285) Subsequently, the method 1200 may "redefine" the first part (white part) of the routing path tree to include the sub-tree determined to include the exit node, and "redefine" the second part (black part) of the routing path tree to exclude the sub-tree determined to include the exit node. (Block 1286) Next, the method 1200 may branch back, via node F, to 1281 wherein if there are any of the one or more sub-trees not included in the first tree, the method 1200 may continue the acts of blocks 1281-1286. Otherwise the method 1200 may continue on to the next router of the routing path tree if any. (Blocks 1281 and 1290) Once all routers of the routing tree have been processed, the method 1200 may be left. (1290 and Node 1291)

The method 1200 may be repeated for each destination prefix or node.

§4.2.3.2 Distributed Method

FIG. 13, which consists of FIGS. 13A, 13B, 13C, 13D, 13E, 13F is a flow diagram of an exemplary method 1300 for determining backup ports in a distributed manner (per node of the network) for use in recovering from single-node failure in a survivable IP network, in a manner consistent with the present invention. In particular, the method 1300 may accept (or determine) a routing path (e.g., shortest path) tree rooted by the destination node. (Block 1305) Further, the method 1300 may accept a node/router (node for which backup port is to be determined) and determine a single routing primary path (e.g., shortest path) from the accepted node to the destination node. (Blocks 1310 and 1315) As indicated by loop 1320-1390, a number of acts may be performed for each router (node) except the destination node of the determined routing primary path tree. Specifically, the method 1300 may first determine if the router is a "child" router of the destination node. (Block 1330) If it is determined that the router is not a "child" router of the destination node, the method 1300 may simply determine backup ports of routers. (Blocks 1340-1386) On the contrary, if it is determined that the router is a "child" router of the destination node, the method 1300 may further examine whether the backup port of the "child" router is already assigned. (Block 1331) If a backup port of the "child" router has already been assigned, the method 1300 may simply proceed to the acts for determining backup ports of routers. (Blocks 1340-1386). On the contrary, if a backup port of the "child" router hasn't been assigned, the method 1300 may proceed to determine a backup port for the "child" router as shown in blocks 1332-1336. Specifically, assuming that the link terminated by the primary port is removed, the method 1300 may define (1) a first part (white part) of the routing path tree including the destination node, and (2) a second part (black part) of the routing path tree separated from the first part and defining a sub-tree. (Block 1332) Subsequently, using a breadth-first search of the sub-tree, the method 1300 may determine an exit link from the sub-tree (the black part) to the first part of the routing path tree (the white part). (Block 1333) After finding an exit link from the sub-tree (the black part) to the first part of the routing path tree (the white part), the method 1300 may determine (e.g., using Dijkstra's algorithm) a backup path from the root of the sub-tree (the black part) to the exit link. (Block 1334) Next, the method 1300 may determine ports of the routers on the backup path (Block 1335) and assign the determined ports as the backup ports (Block 1336) before retuning back to the acts performed to determine backup ports of routers. (Blocks 1340-1386) Specifically, the method 1300 may define a removed router, thereby defining (A) a first part of the routing path tree including the destination node (referred to as "the white part"), and (B) a second part of the routing path tree rooted by the removed router (referred to as "the black part"). (Block 1340) Subsequently, as indicated by loop 1350-1380, for each adjacent downstream router of the removed router in the routing path tree (i.e., for each child node of the removed node), the method 1300 may define a further sub-tree rooted by the adjacent downstream router. (Block 1360) Next, the method 1300 may determine whether a backup port of the adjacent downstream router has been already assigned. (Block 1370) If the backup port of the adjacent downstream router has not been assigned, then the method 1300 may simply search for the next adjacent downstream router of the removed router. (Block 1380) On the contrary, if the backup port of the adjacent downstream router has already been assigned, the method 1300 may proceed to redefine the first part (white part) of the routing path tree to include the sub-tree determined to be routed by a node with an assigned backup port, and redefine the second part (black part) of the routing path tree to exclude the sub-tree determined to be routed by a node with an assigned backup port (Block 1371). Thereafter, the method 1300 checks for the next adjacent downstream router of the removed router. (Block 1380) If no other adjacent downstream routers of the removed router are left unexamined by loop 1350-1380, the method 1300 may go on to check if there are any of the one or more sub-trees (defined by the previous steps above) not included in the first part (white part) of the routing path tree. (Blocks 1380 and 1381) If there are no sub-trees excluded from the first part (white part), the method 1300 may advance to the act of checking for a next router of the determined routing primary path tree. (Block 1390) On the contrary, if one or more sub-trees not included in the first part (white part) do exist, then the method 1300 may advance to the following acts in the process defined by loop 1381-1386 as follows: using a breadth first search of the second part (black part) of the routing tree, excluding the removed router, the method 1300 may find a first router with a link to the first part (white part) of the routing tree and define the first router as an exit node. (Block 1382) The method 1300 may then determine which of the one or more sub-trees rooted by the one or more adjacent downstream routers of the removed router, includes the exit node. (Block 1383) A recovery path from the root of the sub-tree determined to include the exit node, to the exit node, is determined. (Block 1384) The method 1300 may then set, based on the determined recovery path, backup ports of routers in the sub-tree determined to include the exit node. (Block 1385) Subsequently, the method 1300 may "redefine" the first part (white part) of the routing path tree to include the sub-tree determined to include the exit node, and "redefine" the second part (black part) of the routing path tree to exclude the sub-tree determined to include the exit node. (Block 1386) Next, the method 1300 may branch back, via node F, to 1381 wherein if there are any of the one or more sub-trees not included in the first tree, the method 1300 may continue the acts of blocks 1381-1386. Otherwise, the method 1300 may continue on to the next router of the routing path tree if any. (Blocks 1381 and 1390) Once all routers of the routing tree have been processed, the method 1300 may be left. (1390 and Node 1391)

The method 1300 may be run by each router of the routing path tree. The method 1300 may be repeated for each destination prefix or node.

§4.2.4 Illustrative Example of Operations of The Exemplary Method

Figure 11B:
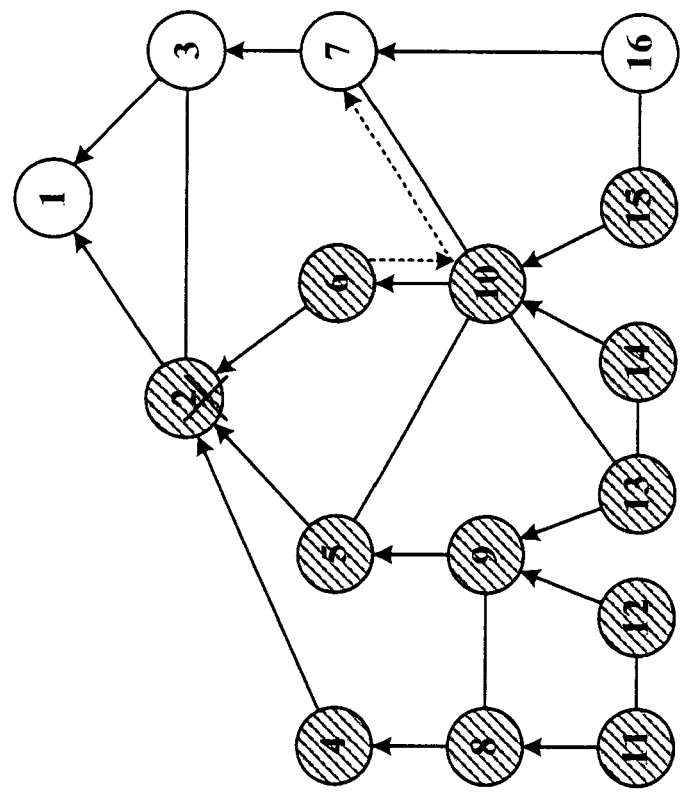
Figure 11A:
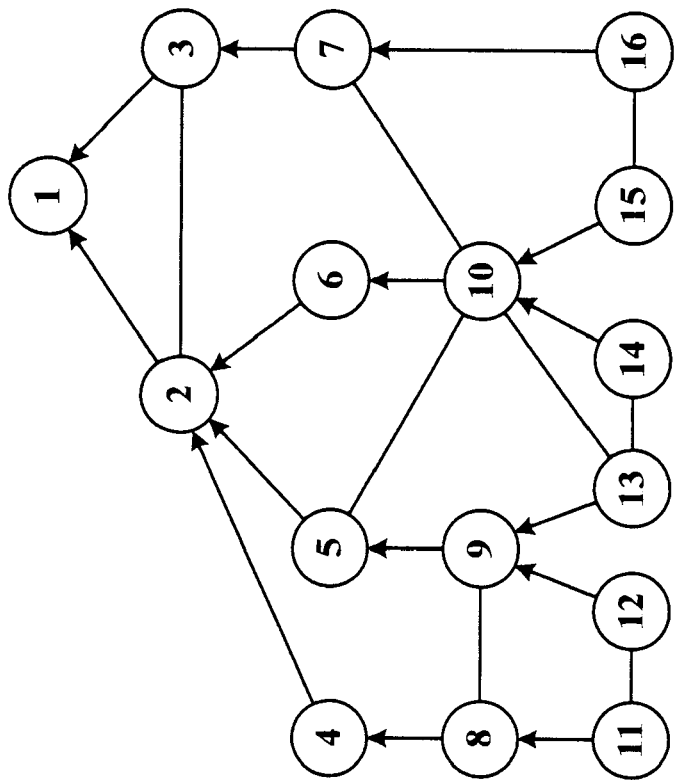
Figure 11D:
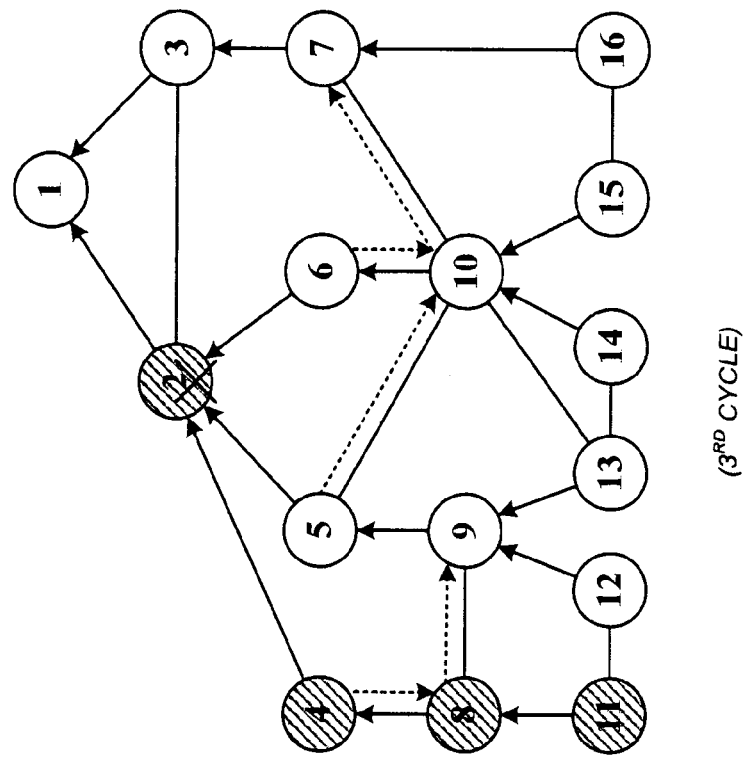
Figure 11C:
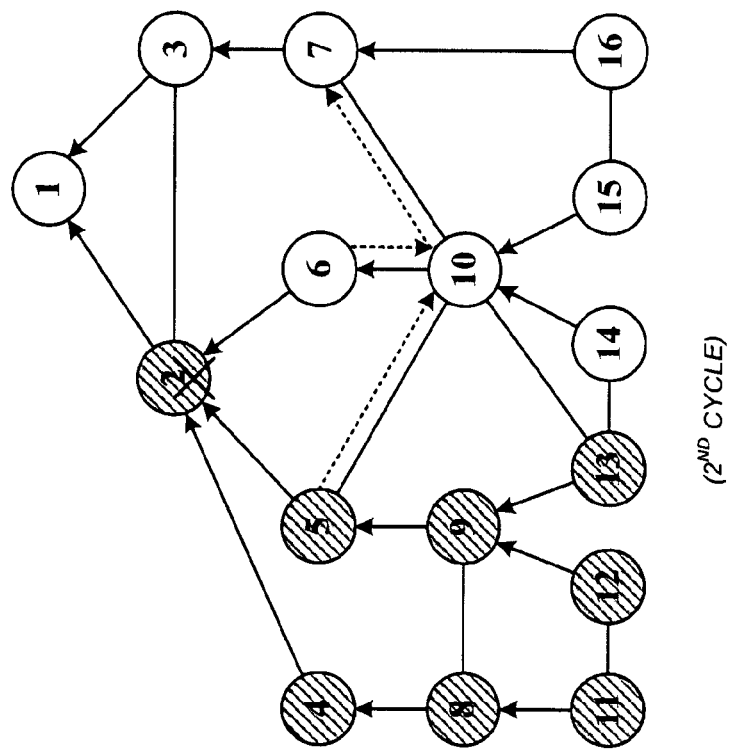
Figure 12A:
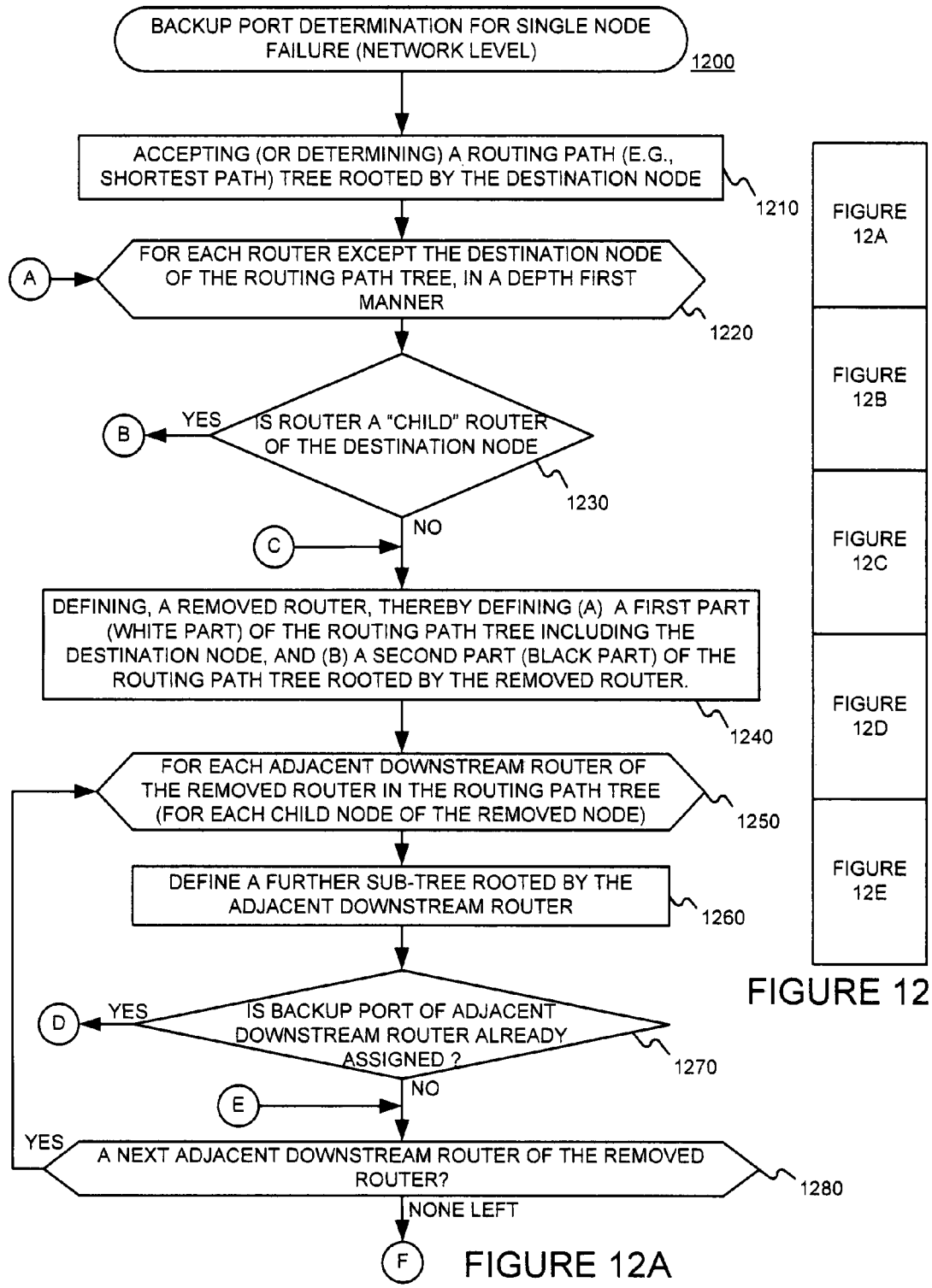
Figure 12B:
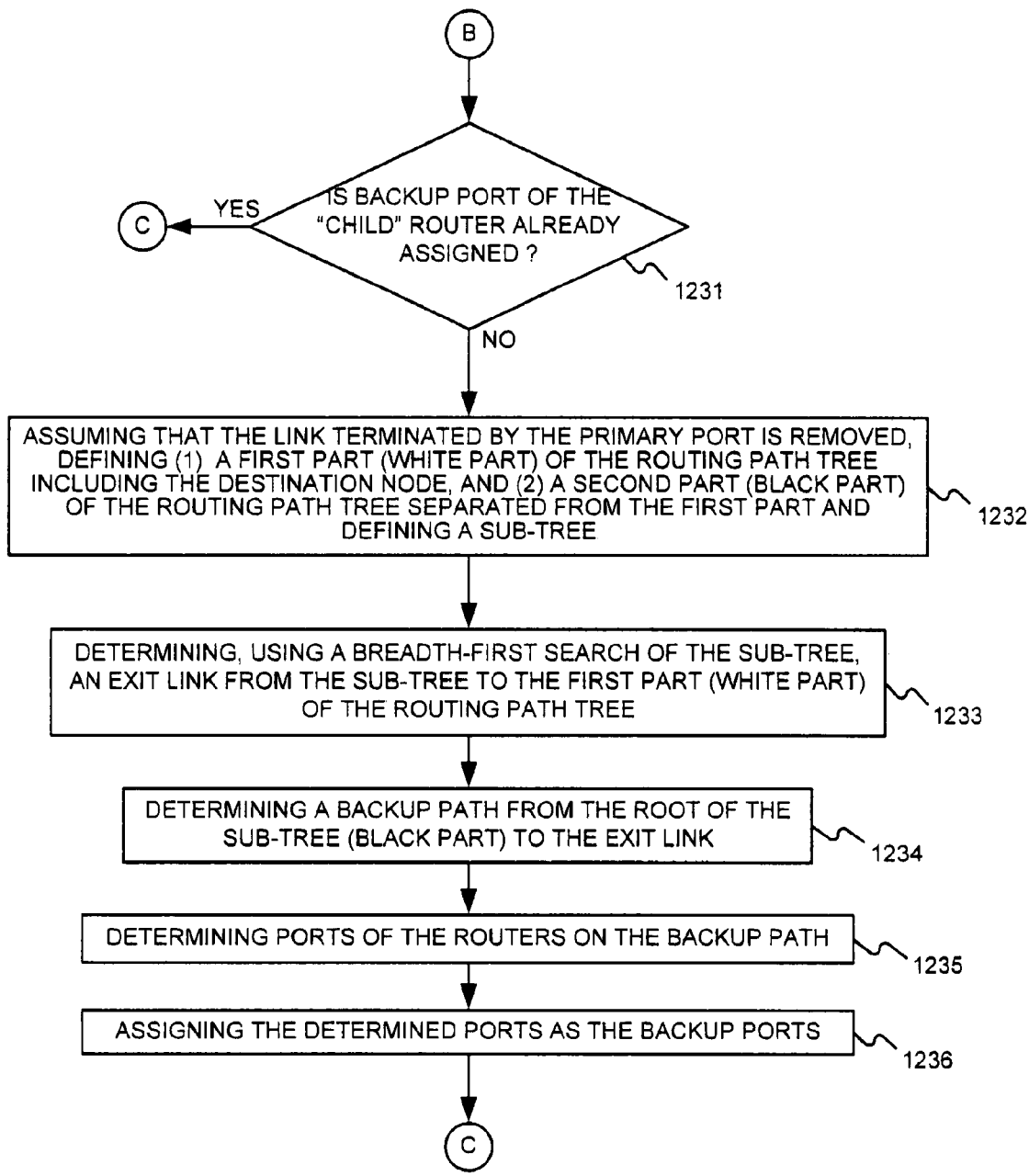
Figure 12C:
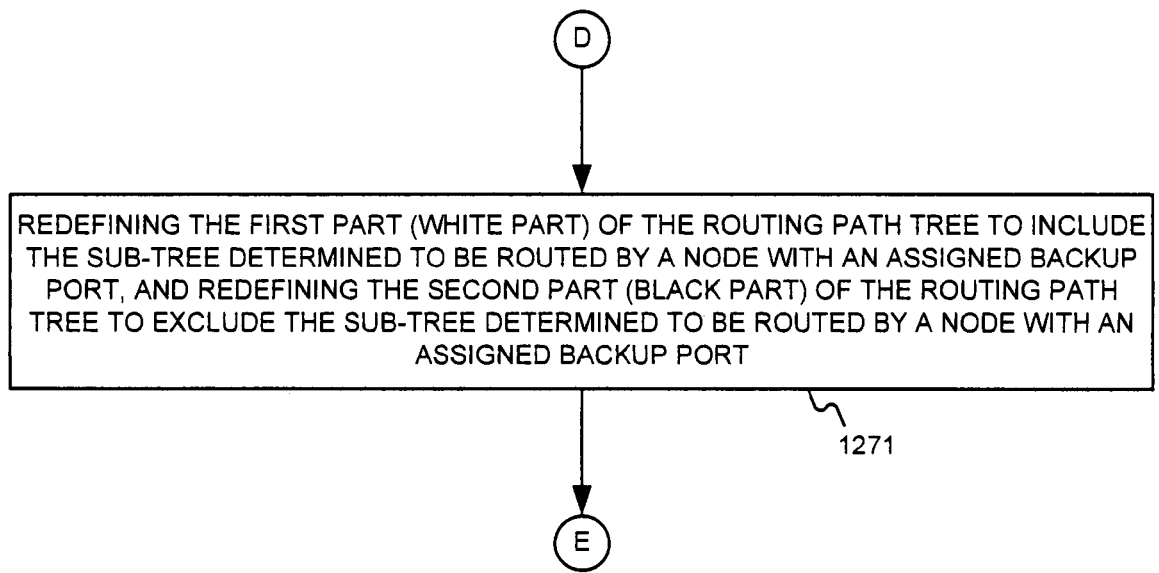
Figure 12D:
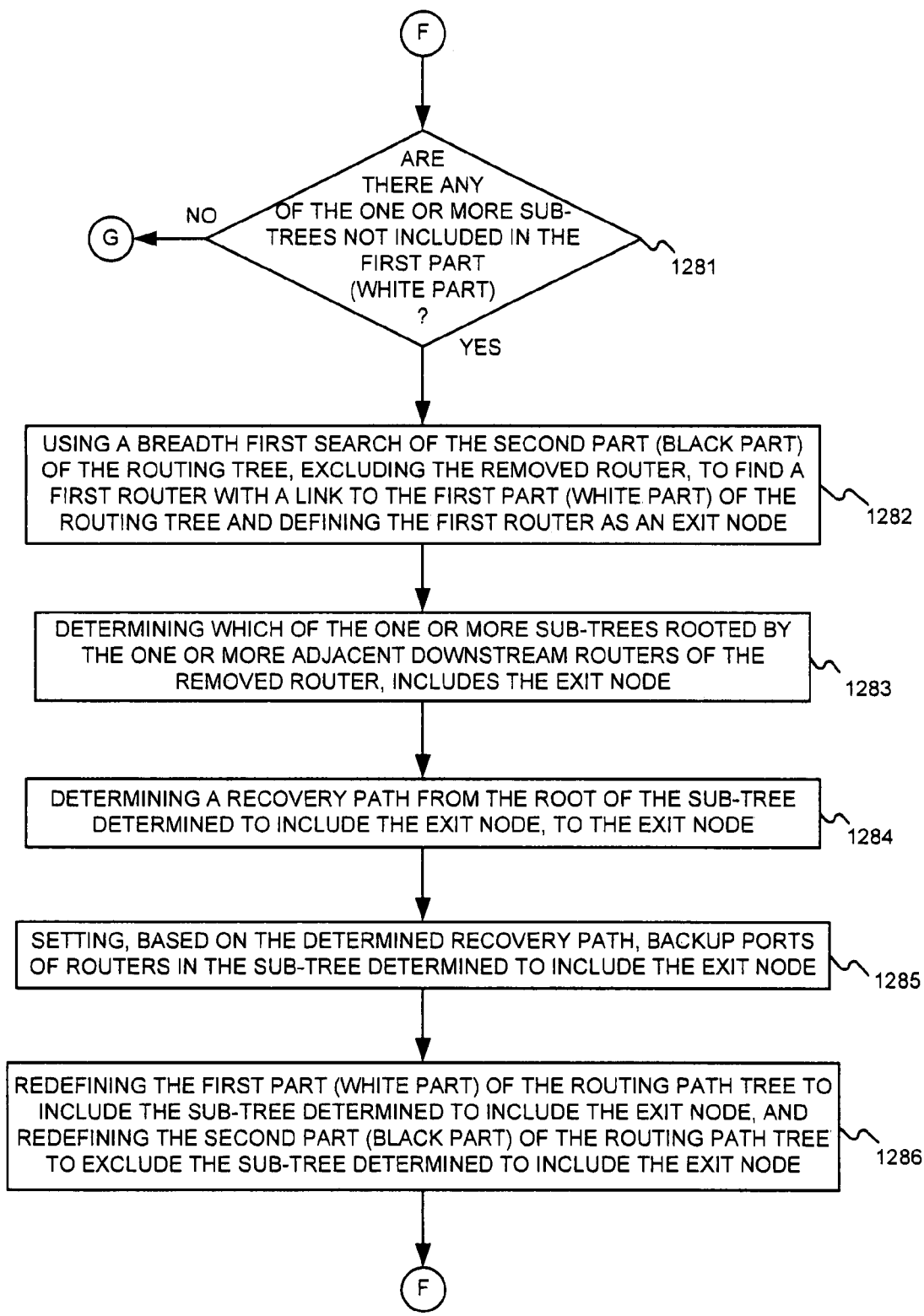
Figure 12E:
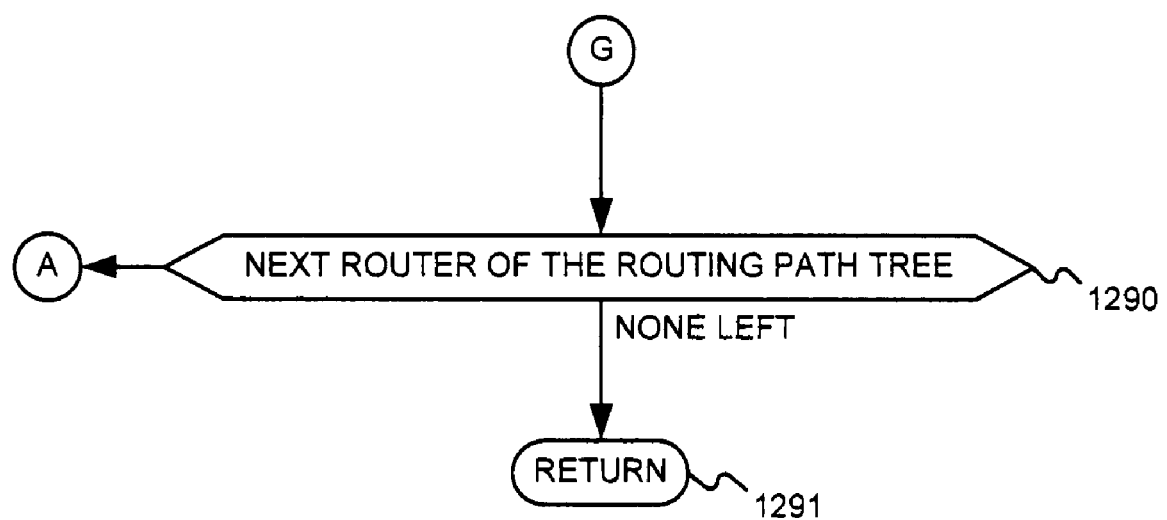
Figure 13B:
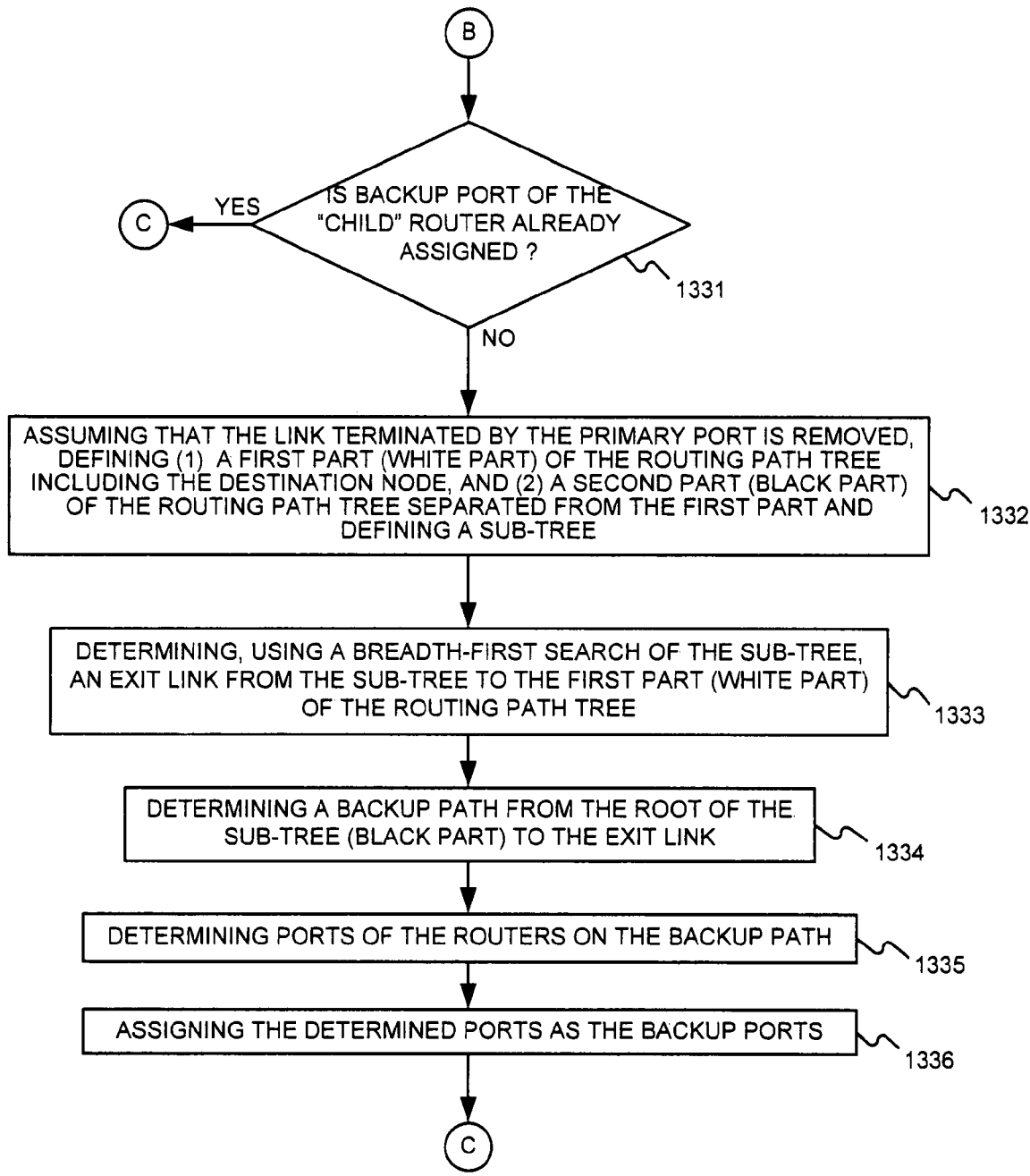
Figure 13C:
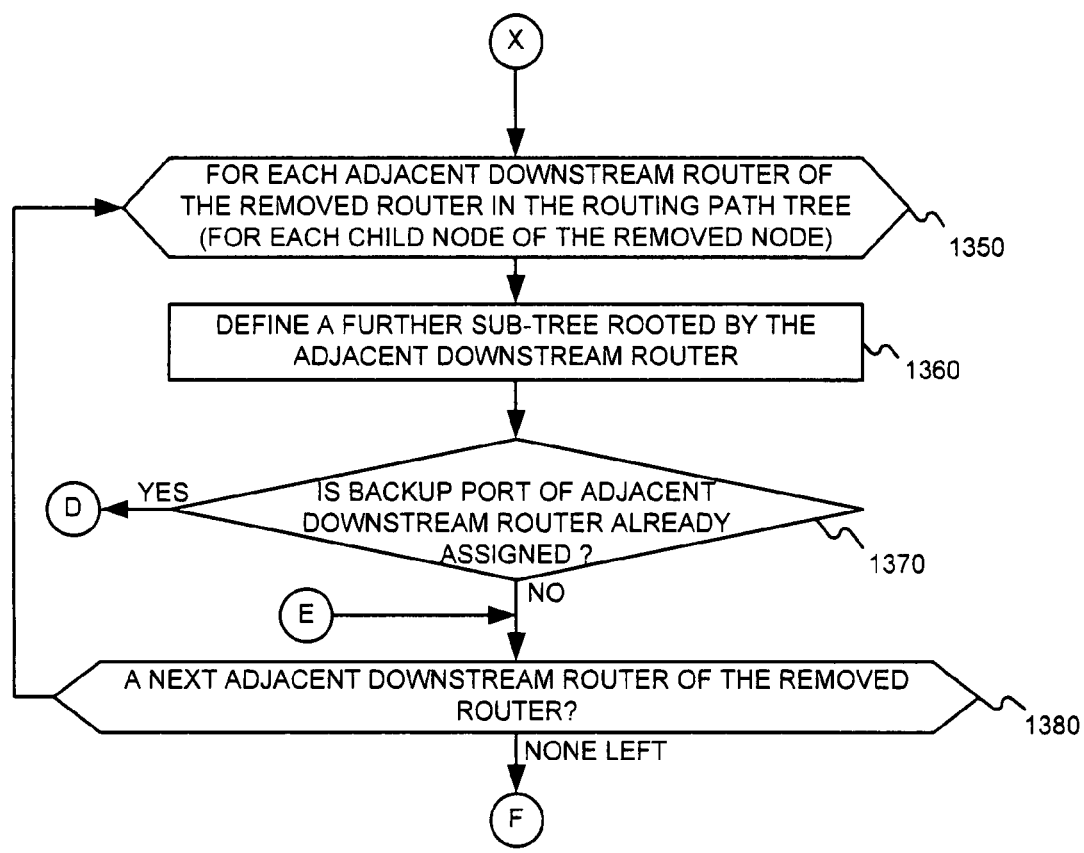
Figure 13D:
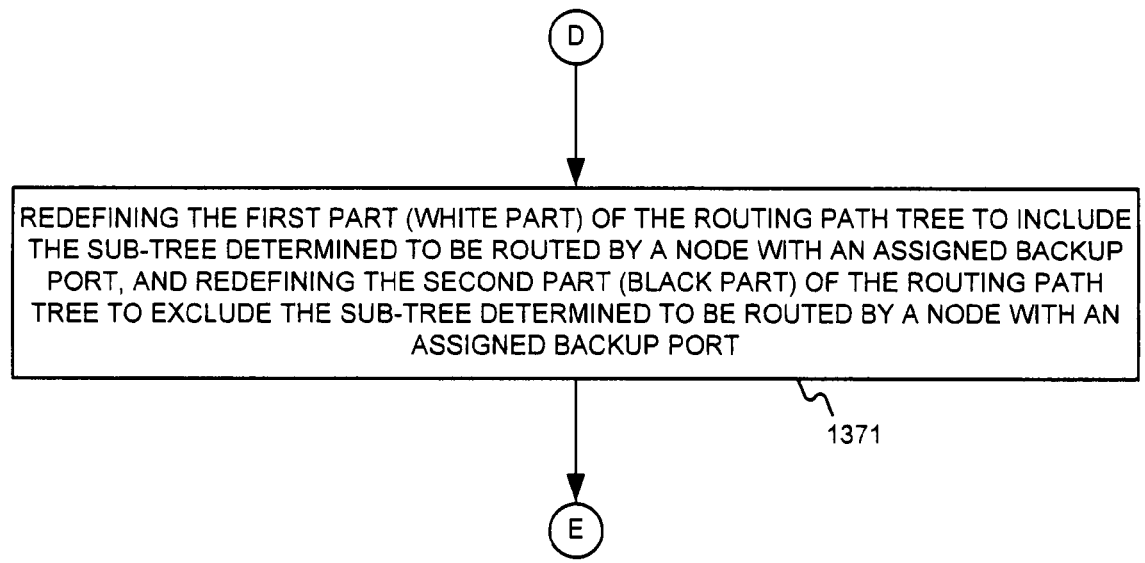
Figure 13E:
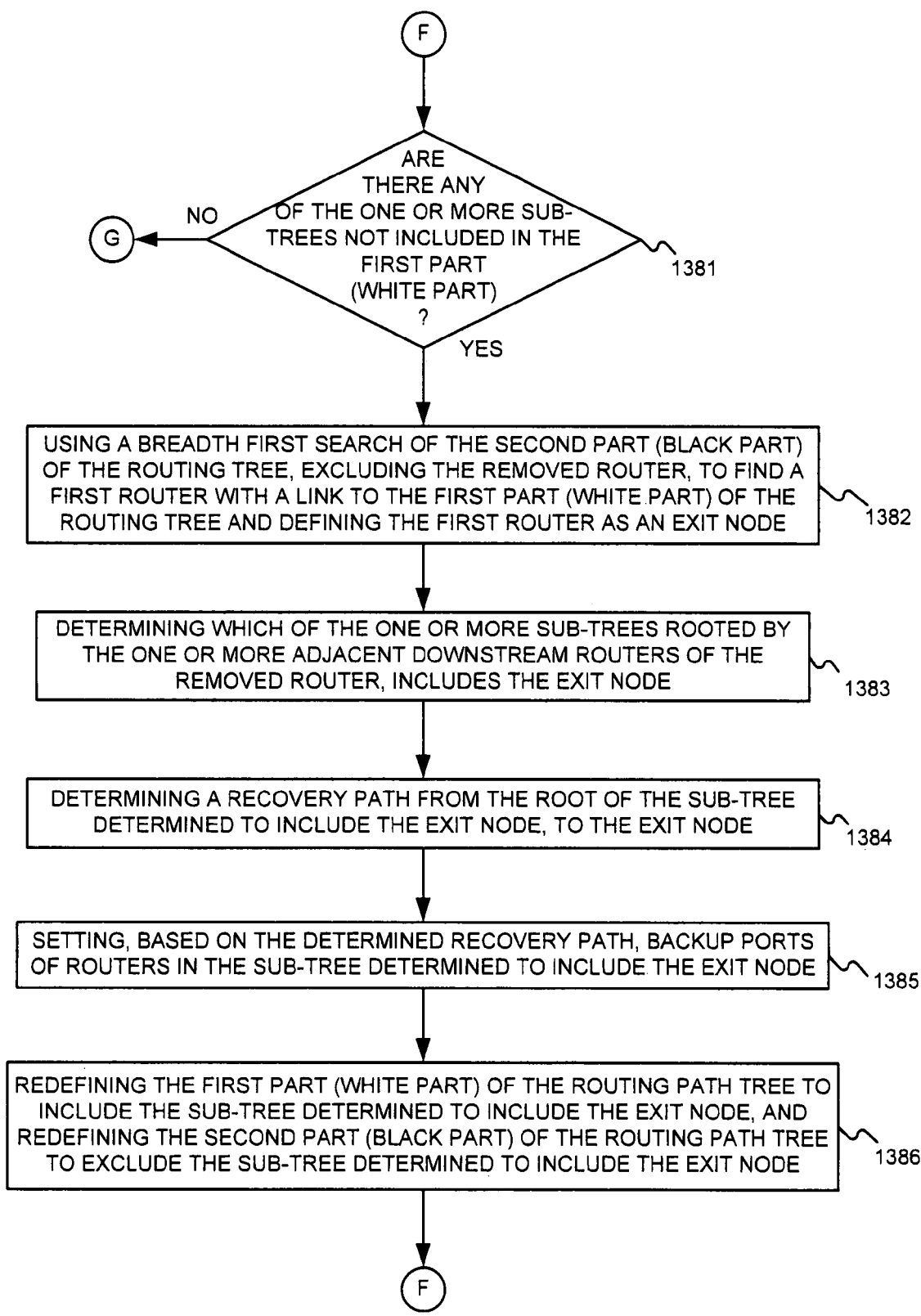
Figure 13F:
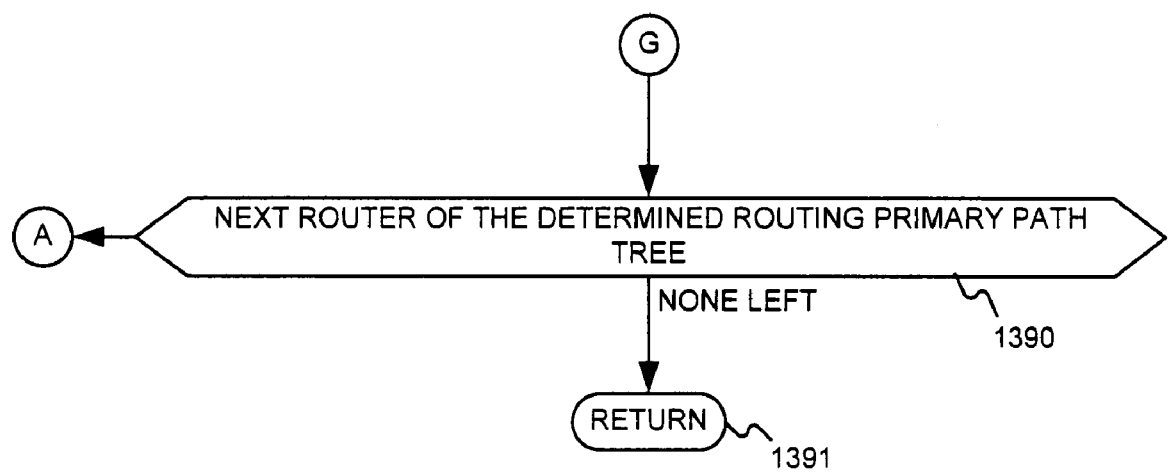

FIGS. 11A-11D illustrate an IP network topology with a plurality of nodes having primary ports, and the determination of their backup ports in a manner consistent with the present invention, where node 1 is the destination node. FIG. 11A illustrates the IP network topology with a plurality of nodes having primary ports, in which node 1 is the single destination. In order to determine the backup ports for each router (node) the ESCAP_NODE process may be employed which will sequentially determine backup ports for each router (except node 1 and the failed node) in the network. The acts involved in determining the backup ports may be summarized by the method 1200 of FIG. 12 or the detailed ESCAP_NODE process acts described in §4.2.3 above. For instance, using ESCAP_NODE process, FIG. 11B illustrates the failure (removal) of node 2 which creates a sub-tree T(2) illustrated by the "black" (hatched) nodes. Using a breadth-first search of the sub-tree T(2), an exit to a white colored node is determined; namely the link between "black" node 10 to "white" node 7. Therefore, in the first cycle, a backup port for each of node 6 and node 10 are determined, and nodes 6, 10, 14 and 15 are dyed "white" as shown in FIG. 11C. That is, prior to the second cycle, as illustrated in FIG. 11C, the "black" sub-tree T(2) is updated by excluding T(6) from T(2).

Performing breadth-first search in the updated sub-tree T(2) gives the link from node 5 to node 10 as the exit. Therefore, in the second cycle, a backup port for node 5 is determined and nodes 5, 9, 12 and 13 are dyed "white" as shown in FIG. 11D. That is, prior to the third cycle, as illustrated in FIG. 11D, the black sub-tree T(2) is updated and shrinks down to include by excluding node 2 and T(5).

Proceeding in the same manner as above, the link between node 8 and node 9 is determined as the exit. Therefore, in the third cycle, a backup port for each of node 4 and node 8 is determined, and nodes 4, 8, and 11 are dyed "white".

At this point, there are no more "black" nodes, the backup ports of node 4, 5 and 6 have been found, and the failure of node 2 can be recovered from. When determining the backup ports of the network of FIG. 11A in a distributed manner, the ESCAP_NODE process does not need to search for backup ports for every node but only a subset. In FIG. 11A, node 10 sequentially considers the failure of node 2 and of node 6 to find its backup ports. After the first round (failure of node 2), node 10 finds its backup port. Consequently the distributed process (for node 10) can be terminated. By scanning a subset of the topology, the efficiency of the calculation is further improved.

§4.3 Single-Link Failure for Multi-Path Case

§4.3.1 Example of Single-Link Failure for Multi-Path Case

The operation of IPFRR in case of a link failure in a simple IP network with multi-path routing and nodes having primary ports and backup ports is described.

FIG. 16A illustrates the topology of a survivable IP network with multi-path routing, and with node 1 as the destination node. For simplicity node 1 is considered as the single destination within the network. FIG. 16B illustrates the topology of the IP network of FIG. 16A (with node 1 as the destination node) and depicts the primary ports, as well as the backup ports, for each node. The primary ports are illustrated using solid, arrowed lines and the backup ports are illustrated using dashed, arrowed lines. Each IP router (node) maintains one or more primary forwarding ports for a destination (prefix). These primary ports may be determined, or may have been determined, using various known or proprietary techniques. For instance, according to FIG. 16B, a packet going from node 8 to node 1 may follow the route {8→4→2→1} or may follow the route {8→6→3→1} since node 8 has two primary forwarding ports. In multi-path routing, when a packet arrives at a node with more than one forwarding primary port, one of the ports is selected as its output by certain algorithms, such as hashing certain fields of the packet header.

When a failure occurs, some of the primary ports could use or point to the damaged link or node and become unusable. At least some embodiments consistent with the present invention proactively calculate backup ports that can be used to replace primary ports temporarily, in the event of a node failure, until the subsequent route recalculation is completed. When configured, each IP router (node) has backup port(s) bound to primary forwarding port(s) such that (1) in a case of no failure, all the routers use primary ports for packet forwarding and (2) in a case of (link) failure, a subset of routers switch to the backup ports for failure recovery. FIG. 16B shows the primary and backup ports of the IP network with node 1 as the single destination node.

Referring now to FIG. 16C, assume that a failure has occurred on the link between node 1 and node 2 and that node 5 is forwarding packets to be sent to node 1 which is the destination node of the network. In such a scenario, node 2 would be aware of the failure of the link and would not be able to forward packets through its primary port to node 1. Therefore, node 2 switches to its backup port for failure recovery (and subsequent nodes switch to their backup ports as necessary) in order to forward the packets sent by node 5 to node 1. FIG. 16C illustrates the network topology in such a scenario where node 2, node 4 and node 8 switch to their backup ports. As a result the packets sent by node 5 to be forwarded to node 1 will follow the route {5→2→4→8→6→3→1}.

§4.3.2 Use of Backup Ports for Failure Recovery

As mentioned in the discussion of single-link failures in §4.1 above, one of the key properties of IPFRR is how it performs failure recovery. From the aforementioned example, when a failure occurs, only a subset of routers needs to switch to their backup ports. Therefore, a router should determine (or be informed of) when to forward packets to a destination node using its backup port(s) and when to use the primary port(s). An exemplary packet forwarding policy consistent with the present invention might determine which port to use based on two factors—destination address and incoming port. The exemplary packet forwarding policy in case of a single-link failure in a multi-path routing (graph) IP network is the same as in a case of a single link/node failure in a tree topology IP network as discussed in the previous paragraphs. (Recall, e.g., method 400 of FIG. 4.) For instance a packet sent to node 1 by node 5 in FIG. 16C would follow the following route according to the packet forwarding policy illustrated in FIG. 4: {5→2→4→8→6→3→1}.

§4.3.3 Determination of Backup Ports for Single-Link Failure in Multi-Path Case

The following describes how to determine backup ports for single-link failures in a survivable multi-path routing (graph) IP network. The assumptions in §4.1.3 are also assumed here. When a router uses multi-path routing, it maintains multiple output ports for a single destination. When a packer arrives, one of the ports is selected as its output by certain algorithms, such as hashing certain fields of the packet header. Multi-path routing makes IPFRR more complicated because packets destined to the same destination may take different paths. As shown in FIG. 17A, node 8 maintains two primary forwarding paths through node 4 and node 6, respectively. If link 2-1 fails, packets may arrive at node 8 through 2→5→8 by use of backup ports as illustrated using dashed arrowed lines. If node 8 forwards some of the packets through node 4, a permanent loop is formed along the path {2→5→8→4→2} as illustrated using dot and dash arrowed line. The cause of this problem is that node 8 is not able to tell from the deflected packets if a forwarding path is damaged or not (compare failure 2-1 with 5-2 (not illustrated); both send packets to node 8 through node 5, but the latter does not cause a loop). In the following paragraphs it can be shown that with minor modifications the ESCAP_LINK algorithm can find alternate paths that easily handle multi-path routing including ECMP. In general, a new definition of the terms needs to be applied for the ESCAP_LINK algorithm, and for routers having multiple primary ports, a backup port is to be found for each of them.

The new set of definitions is as follows:

Definition 1: Child and Parent: If node A maintains a path with node B as the next hop, define A as a child of B and B as a parent of A. In multi-path routing, a node may have multiple parents.

Definition 2: Sub-Graph G(n): Defined as the directed graph consisting of node n and all the nodes/links with paths traversing node n. For example, G(6) in FIGS. 17A-17C consists of node 6, 8, 9, 10 and the solid arrows.

Definition 3: Breadth-First Search: Given a node n, explore all its children before going to its grandchildren. For example, a breadth-first explore of G(2) in FIGS. 17A-17C yields 2-4-5-7-8-10-10, where node 10 is hit twice.

Definition 4: Depth-First Search: Given a node n, explore as far as possible along each branch before backtracking. For example, a depth-first explore of G(2) in FIGS. 17A-17C yields 2-4-7-10-8-10-5, where node 10 is also hit twice because it has two parents.

In order to determine the backup ports of a graph network as illustrated for example in FIGS. 17A-17C, a process the same as the ESCAP_LINK process is used (as described in §4.1.3) but with the following modification:

T(n) is replaced with G(n); child, parent, breadth-first search and depth-first search are based on the above definitions.

When a node has multiple primary ports, a backup port is found for each of them.

When marking a backup port, it is bound to the primary port that overlaps with the recovery path. In FIG. 17B, when link 2-1 fails, a backup port 8→6 is found. This backup port is bound to primary port 8→4 because 8→4 overlaps with the recovery path. On the other hand, FIG.

17C shows that considering failure 3-1 finds backup port 8→5, which is bound to forwarding port 8→6.

§4.3.3.1 General Method

FIG. 18 is a flow diagram of an exemplary method 1800 for determining backup ports for a number of nodes in a multi-path routing IP network for use in recovering from a single link failure, in a manner consistent with the present invention. This method 1800 might be run at one location and the results might be signaled to the appropriate nodes. As shown, the method 1800 may accept (or determine) a routing path (e.g., shortest path) graph rooted by the destination node, wherein the routing path graph includes links terminated by primary ports of the routers. (Block 1805). As indicated by loop 1810-1845, a number of acts may be performed after the routing path graph for each router and its primary port(s), except the destination node (router) of the routing path graph, in a depth-first manner. Specifically, the method 1800 may first determine if the router already has a port assigned as a backup port. (Block 1815) If it is determined that the router already has a backup port assigned to it, the method 1800 may simply proceed to examine the next router of the routing path graph. (Blocks 1815 and 1845) On the contrary, if it is determined that the router does not have a backup port, the method 1800 may proceed to determine a backup port for the router. (Blocks 1820-1840) Specifically, assuming that the link terminated by the primary port is removed, the method 1800 may define (1) a first part of the routing path graph including the destination node (referred to as "the white part") and (2) a second part of the routing path graph separated from the first part and defining a sub-graph (referred to as "the black part"). (Block 1820) Subsequently, the method 1800 may determine, using a breadth-first search of the sub-graph, an exit link from the sub-graph (the black part) to the first part of the routing path graph (the white part). (Block 1825) After finding an exit link from the sub-graph (the black part) to the first part of the routing path graph (the white part), the method 1800 may determine (e.g., using Dijkstra's algorithm) a backup path from the root of the sub-graph (the black part) to the exit link. (Block 1830) Next, the method 1800 may determine ports of the routers on the backup path (Block 1835) and assign the determined ports as the backup ports bound to the primary ports (Block 1840). The method 1800 may then move on to the next router in the routing path graph and repeat the above acts in determining backup ports. (Block 1845) When the loop 1810-1845 has been run for each router and its primary port(s) of the routing path graph, the method 1800 is left. (Node 1850)

The method 1800 may be repeated for each destination prefix or node.

§4.3.3.2 Distributed Method

The aforementioned process can be run distributively, on each router of the routing path tree if each router has knowledge of the overall topology, such as routers using link-state routing protocols, such as OSPF. The flow diagram of FIG. 17 is the same as the flow diagram of FIG. 5 given the appropriate definitions and modification applied to it as discussed in §4.2.3. Therefore, a detailed flow diagram of the distributed method is omitted since it would be the same as the flow diagram of FIG. 6 given the appropriate definitions and modification applied to it as discussed in §4.2.3.

§4.3.4 Illustrative Example of Operations of Exemplary Process

FIGS. 19A-19E illustrate a multi-path routed IP network topology with a plurality of nodes having primary ports and the determination of their backup ports in a manner consistent with the present invention. Node 1 is the destination node.

Figure 19B:
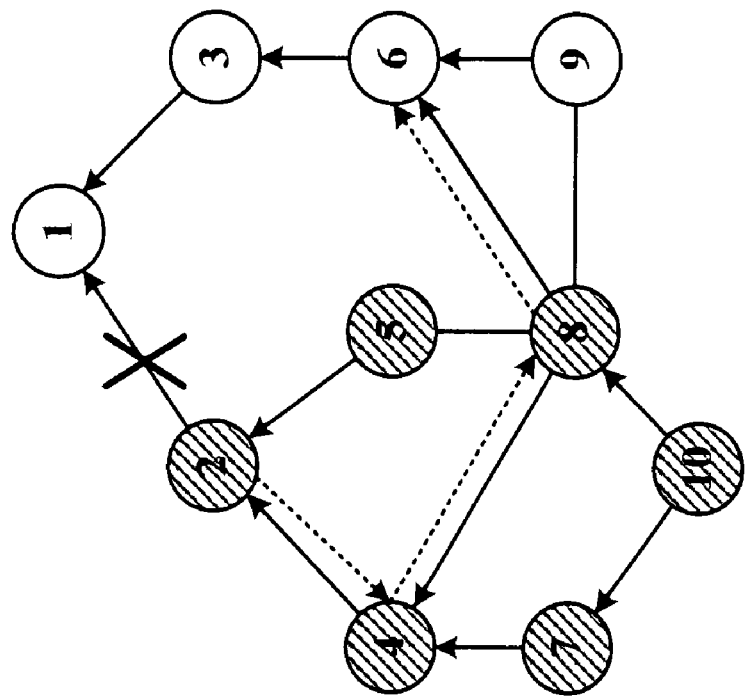
Figure 19A:
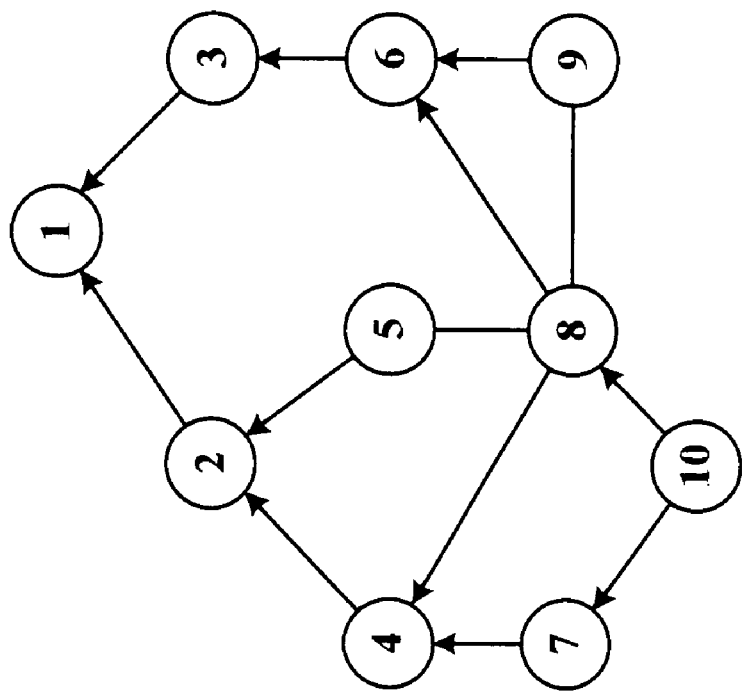

FIG. 19A illustrates the multi-path routed IP network topology with a plurality of nodes having primary ports depicted as the, arrowed links, where node 1 is the single destination. In order to determine the backup ports for each router (node), the ESCAP_LINK (multi-path) process may be employed which will sequentially determine backup ports for each router (except node 1) in the network. The acts involved in determining the backup ports may be summarized by following the flowchart of FIG. 17 or the detailed acts of the ESCAP_LINK (multi-path) process described in §4.3.3. For instance, by following the ESCAP_LINK (multi-path) process, FIG. 19B illustrates the assumed failure (removal) of the link between node 2 and node 1 which creates a sub-graph G(2) illustrated by the black (hatched) nodes. Using a breadth-first search of the sub-graph G(2), an exit to a white colored node 8→6 is found and the rerouting path is 2→4→8→6. Thus, the backup port for node 2, node 4, and node 8 which is illustrated by dashed arrows going from node 2 to node 4, from node 4 to node 8, and from node 8 to node 6 respectively is determined.

Continuing the depth-first processing, an assumed failure (removal) of the link between node 2 and node 4 creates sub-graph G(4) (not illustrated). However, determining the backup port of node 4 can be skipped since they have already been determined by the failure between node 2 and node 1.

Figure 19D:
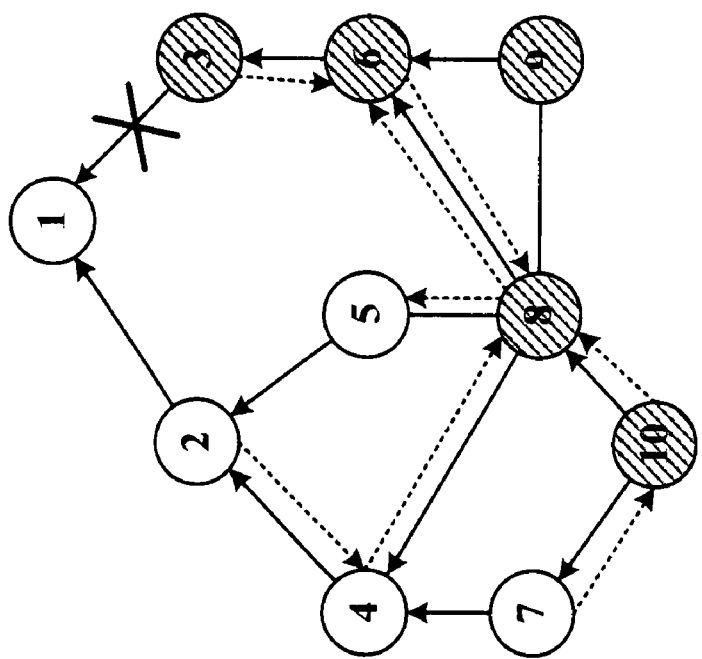
Figure 19C:
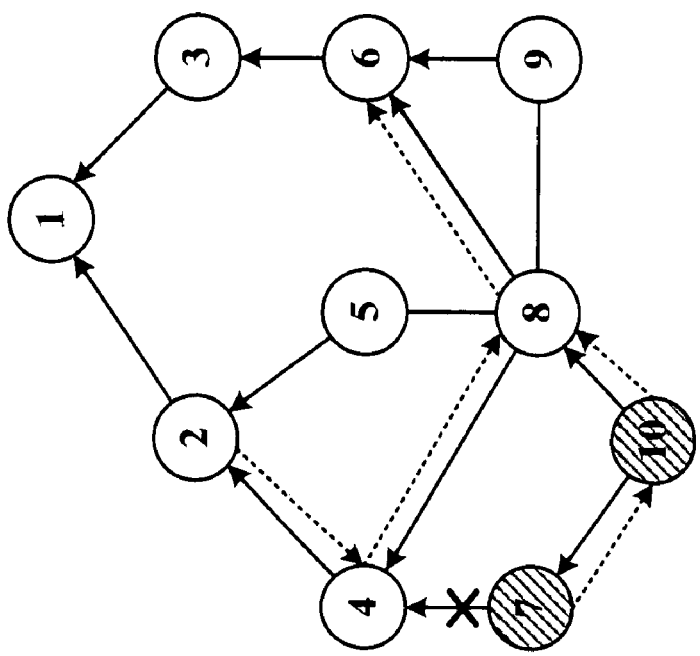

Continuing the depth-first processing, an assumed failure (removal) of the link between node 7 and node 4 illustrated by FIG. 19C, creates a sub-graph G(7) illustrated by the black (hatched) nodes. Following the same procedures as above yields a backup port for node 7, illustrated by a dashed arrow going from node 7 to node 10.

Continuing the depth-first processing, an assumed failure (removal) of the link between node 7 and node 10 creates sub-graph G(10) (not illustrated). However, determining the backup port of node 10 can be skipped since they have already been determined by the failure between node 7 and node 4.

Figure 19E:
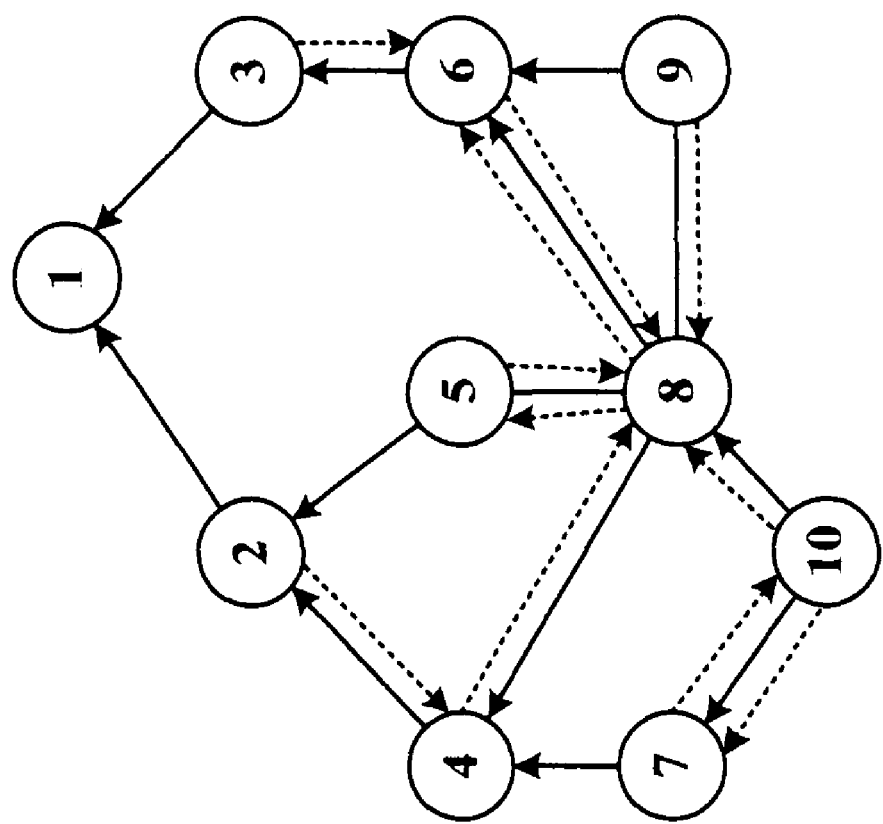
Figure 20A:
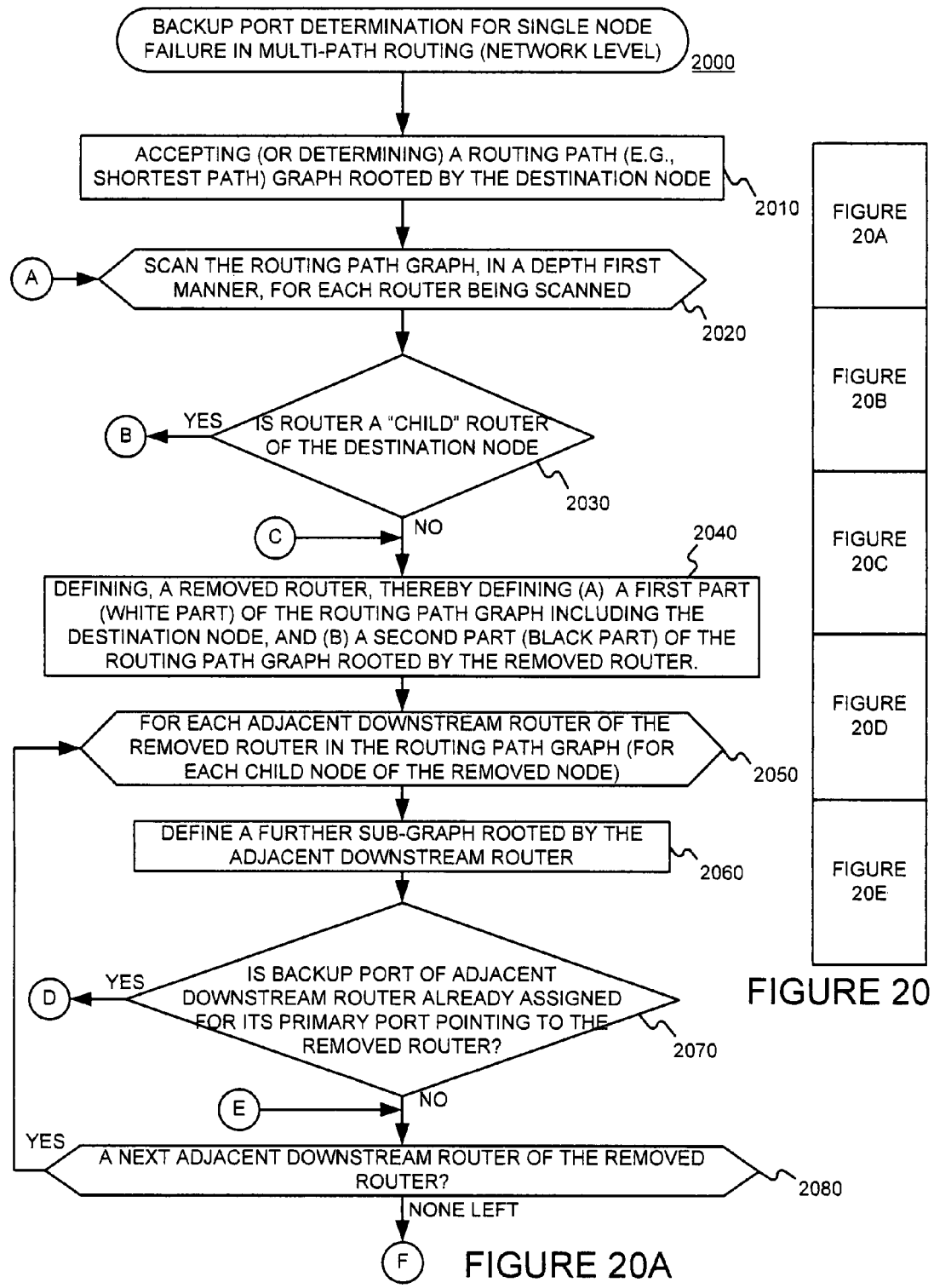
Figure 20B:
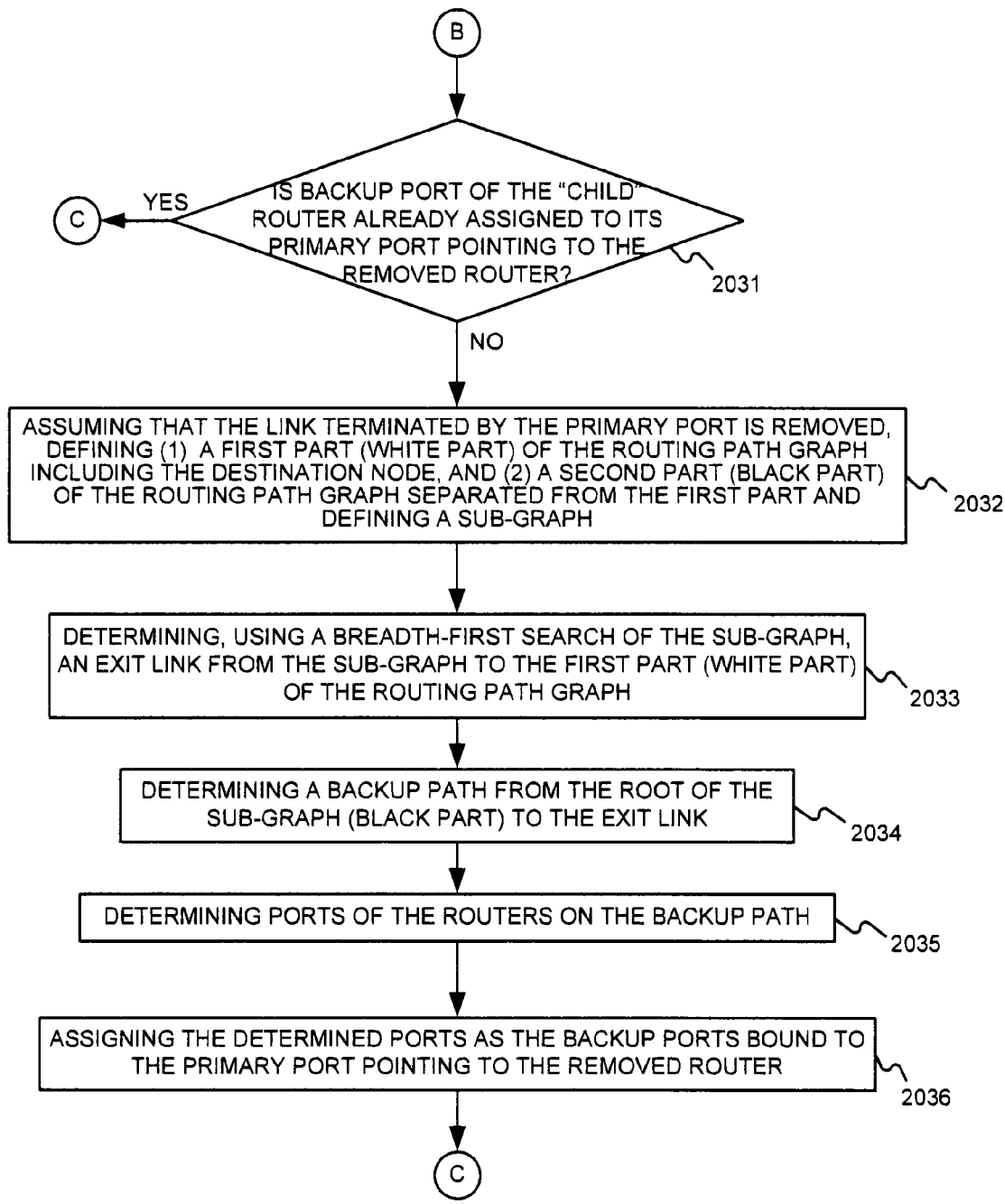
Figure 20C:
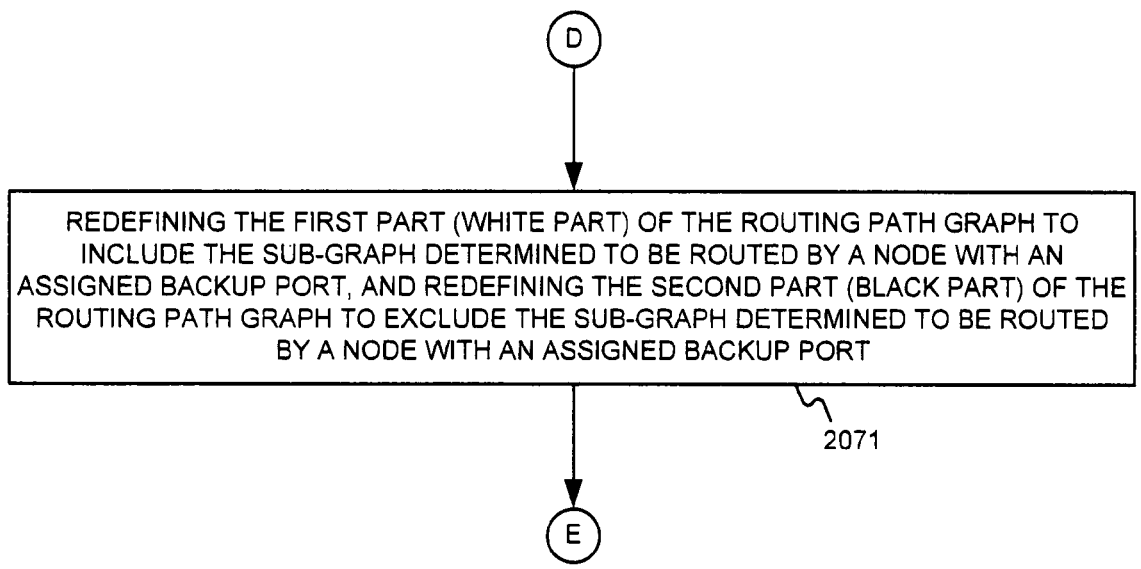
Figure 20D:
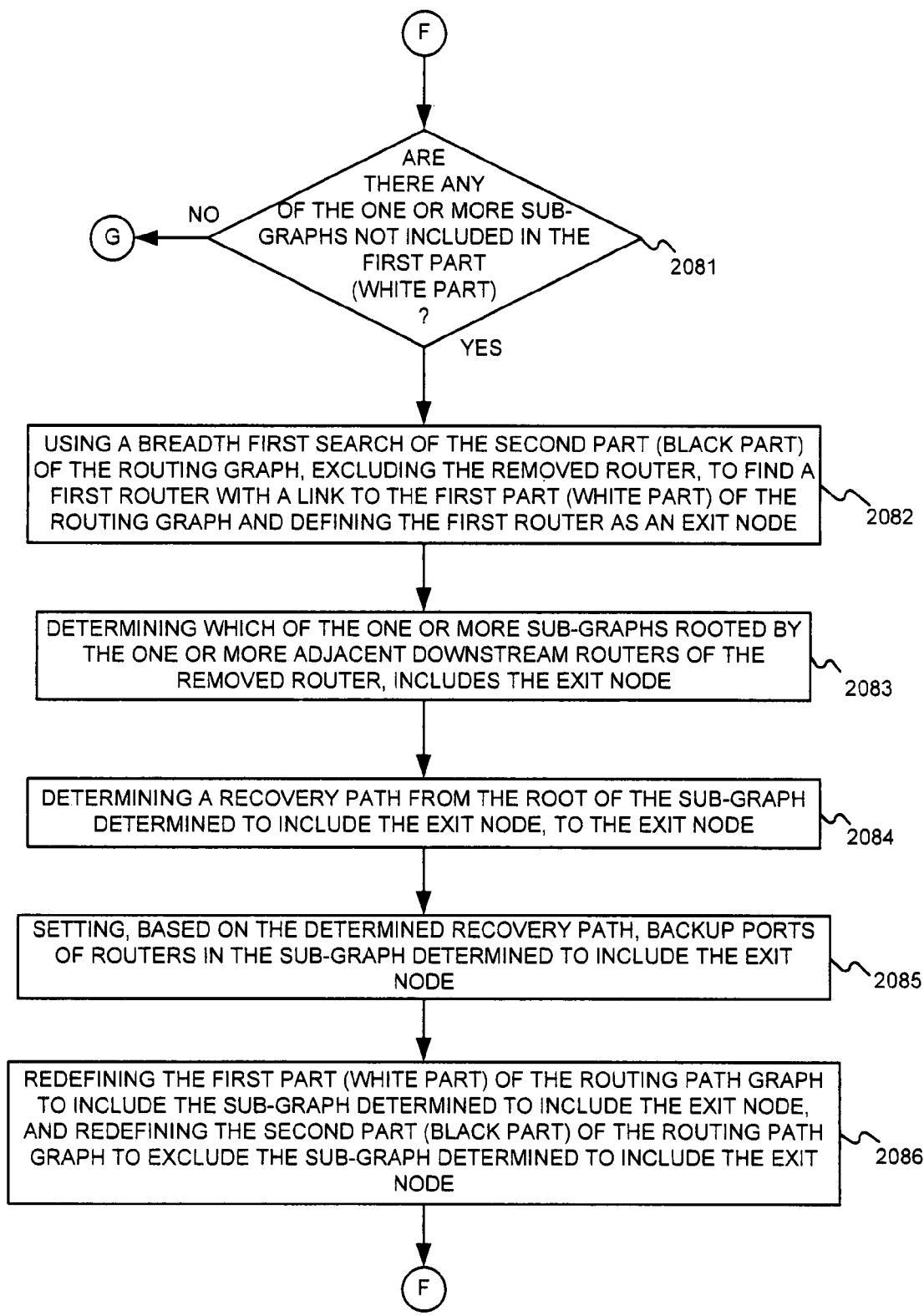
Figure 20E:
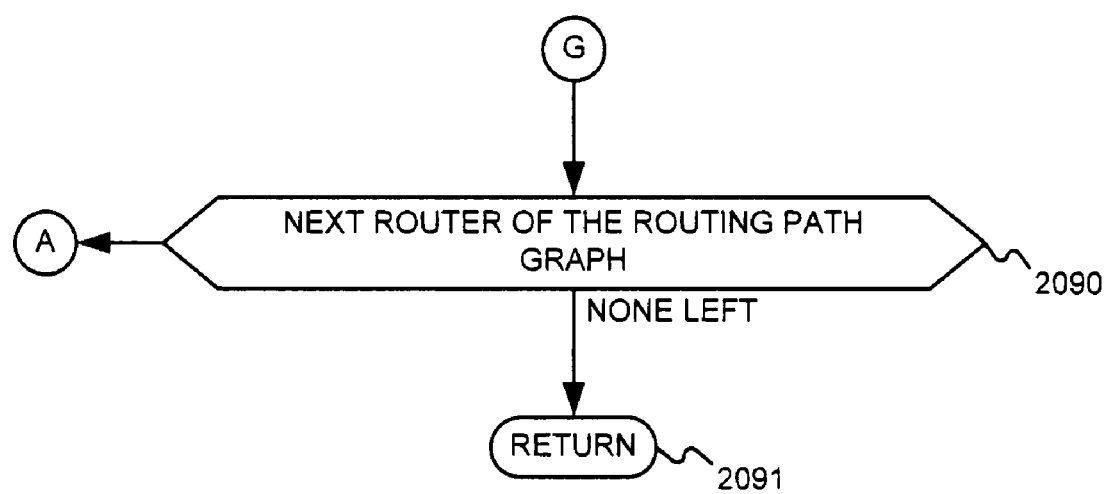

Continuing the depth-first processing, an assumed failure (removal) of the link between node 3 and node 1 illustrated by FIG. 19D, creates a sub-graph G(3) illustrated by the black (hatched) nodes. Following the same procedures as above yields a backup port for nodes 3, 6, and 8, illustrated by a dashed arrow going from node 3 to node 6, from node 6 to node 8, and from node 8 to node 5. As illustrated in FIG. 19D node 8 has two backup ports since it has two primary forwarding paths. Each backup path is bound to a primary path. At node 8, backup path 8→5 is bound to primary path 8→6 and backup path 8→6 is bound to primary path 8→4. Proceeding in a similar manner for each node in the network (except node 1 which is the destination node) all determined backup ports are illustrated in FIG. 19E.

When determining the backup ports of the network of FIG. 19A in a distributed manner, the ESCAP_LINK (multi-path) process does not need to search for backup ports for every node but only a subset.

§4.4 Single-Node Failure for Multi-Path Case

§4.4.1 Example of Single-Node Failure for Multi-Path Case

The operation of IPFRR in case of a node failure in a simple IP network with multi-path routing and nodes having primary ports and backup ports is described. Referring back to FIGS. 16A, and 16B, FIG. 16A illustrates the topology of a survivable IP network with multi-path routing, and with node 1 as the destination node. For simplicity node 1 is considered as the single destination within the network. FIG. 16B illustrates the topology of the IP network of FIG. 16A (with node 1 as the destination node) and depicts the primary ports, as well as the backup ports, for each node. The primary ports are illustrated using solid, arrowed lines and the backup ports are illustrated using dashed, arrowed lines. Each IP router (node) maintains one or more primary forwarding ports for a destination (prefix). These primary ports may be determined, and/or may have been determined, using various known or proprietary techniques. For instance, according to FIG. 16B, a packet going from node 8 to node 1 may follow the route {8→4→2→1} or may follow the route {8→6→3→1} since node 8 has two primary forwarding ports. In multi-path routing, when a packet arrives at a node with more than one forwarding primary port, one of the ports is selected as its output by certain algorithms, such as hashing certain fields of the packet header.

When a failure occurs, some of the primary ports could use or point to the damaged link or node and become unusable. At least some embodiments consistent with the present invention proactively calculate backup ports that can be used to replace primary ports temporarily, in the event of a node failure, until the subsequent route recalculation is completed. When configured, each IP router (node) has backup port(s) bound to primary forwarding port(s) such that (1) in a case of no failure, all the routers use primary ports for packet forwarding and (2) in a case of (node) failure, a subset of routers switch to the backup ports for failure recovery. FIG. 16B shows the primary and backup ports of the IP network with node 1 as the single destination node.

Referring to FIG. 16D, assume that a failure has occurred on node 2, and that node 10 is forwarding packets to be sent to destination node 1. In such a scenario, the "children" nodes of node 2 (i.e., node 4 and node 5) would be aware of the failure of the node 2 and would not be able to forward packets through their primary ports to node 2. For instance, node 4 would not be able to send packets received by node 7 to node 1 since node 2 has failed. Therefore, node 4 switches to its backup port for failure recovery and subsequent nodes switch to their backup ports in order to forward the packets sent by node 10 to node 1. FIG. 16D illustrates the network topology if node 2 fails. As shown, nodes 4 and 8 switch to their backup ports. As a result the packets sent by node 10 to be forwarded to node 1 will follow the route {10→7→(failure discovered) 4→8→6→3→1}.

§4.4.2 Use of Backup Ports for Failure Recovery

As mentioned in the discussion of single-link failures in §4.1 above, one of the properties of IPFRR is how it performs failure recovery. From the aforementioned example, when a failure occurs, only a subset of routers needs to switch to their backup ports. Therefore, a router should determine (or be informed of) when to forward packets to a destination node using its backup port(s) and when to use the primary port(s). An exemplary packet forwarding policy consistent with the present invention might determine which port to use based on two factors—destination address and incoming port. The exemplary packet forwarding policy in case of a single-node failure in a multi-path routing (graph) IP network is the same as in a case of a single link/node failure in a tree topology IP network as discussed in the previous paragraphs. (Recall, e.g., method 400 of FIG. 4.) For instance a packet sent to node 1 by node 10 in FIG. 16D would follow the following route according to the packet forwarding policy illustrated in FIG. 4: {10→7→4 (failure discovered) 4→8→6→3→1}.

§4.4.3 Determination of Backup Ports for Single-Node Failure in Multi-Path Case The following describes how to determine backup ports for single-node failures in a survivable multi-path routing (graph) IP network. The assumptions in §4.1.3 are also assumed here.). A detailed description of how to determine backup ports for single-node failures in a multi-path routing IP network are omitted since it can be shown that with minor modifications the ESCAP_NODE algorithm alternate paths can be found in a multi-path routing IP network that may easily handle multi-path routing including ECMP. In general, a new definition of the terms needs to be applied for the ESCAP_NODE algorithm, and for routers having multiple primary ports, a backup port is to be found for each of them. The new set of definitions and modifications are the same as described in §4.3.3. Applying these new definitions and minor modification to the ESCAP_NODE algorithm described in §4.2.3 results in a detailed description of how to determine backup ports for single-node failures in a survivable multi-path routing (graph) IP network.

§4.4.3.1 General Method

FIG. 20, which consists of FIGS. 20A, 20B, 20C, 20D, and 20E, is a flow diagram of an exemplary method 2000, for determining backup ports of routers in a survivable multi-path routing IP network for use in recovering from single-node failures, in a manner consistent with the present invention. The method 2000 might be performed at a single location, with resulting backup ports being distributed to appropriate routers. In particular, the method 2000 may accept (or determine) a routing path (e.g., shortest path) graph rooted by the destination node. (Block 2010) As indicated by loop 2020-2090, a number of acts may be performed, after the routing path graph has been scanned, in depth first manner for each router (node), except for the destination node of the routing path graph. Specifically, the method 2000 may first determine if the router is a "child" router of the destination node. (Block 2030) If it is determined that the router is not a "child" router of the destination node, the method 2000 may simply proceed to determine backup ports of routers. (Blocks 2040-2086) On the contrary, if it is determined that the router is a "child" router of the destination node, the method 2000 may further examine whether the backup port of the "child" router is already assigned to its primary port pointing to the removed router. (Block 2031) If a backup port of the "child" router has already been assigned, the method 2000 may simply proceed to the acts for determining backup ports of routers. (Blocks 2040-2086). On the contrary, if a backup port of the "child" router hasn't been assigned, the method 2000 may proceed to acts for determining a backup port for the "child" router along with other routers if possible. (Blocks 2032-2036) Specifically, assuming that the link terminated by the primary port is removed, the method may define (1) a first part (WHITE PART) of the routing path graph including the destination node, and (2) a second part (BLACK PART) of the routing path graph separated from the first part and defining a sub-graph. (Block 2032) Subsequently, using a breadth-first search of the sub-graph, the method 2000 may determine an exit link from the sub-graph (the black part) to the first part of the routing path graph (the white part). (Block 2033) After finding an exit link from the sub-graph (the black part) to the first part of the routing path graph (the white part), the method 2000 may determine (e.g., using Dijkstra's algorithm) a backup path from the root of the sub-graph (the black part) to the exit link. (Block 2034) Next, the method 2000 may determine ports of the routers on the backup path (Block 2035) and assign the determined ports as the backup ports bound to the primary port pointing to the removed router. (Block 2036) before retuning back to the steps in the process to determine backup ports of routers. (Blocks 2040-2086) Specifically, the method 2000 may define a removed router, thereby defining (A) a first part of the routing path graph including the destination node (referred to as "the white part"), and (B) a second part of the routing path graph rooted by the removed router (referred to as "the black part"). (Block 2040) Subsequently, as indicated by loop 2050-2080, for each adjacent downstream router of the removed router in the routing path graph (i.e., for each child node of the removed node), the method 2000 may define a further sub-graph rooted by the adjacent downstream router. (Block 2060) Next, the method 2000 may determine whether a backup port of the adjacent downstream router has been already assigned for its primary port pointing to the removed router. (Block 2070) If the backup port of the adjacent downstream router has not been assigned, then the method 2000 may simply search for the next adjacent downstream router of the removed router. (Block 2080) On the contrary, if the backup port of the adjacent downstream router has already been assigned, the method 2000 may proceed to redefine the first part (white part) of the routing path graph to include the sub-graph determined to be routed by a node with an assigned backup port, and redefine the second part (black part) of the routing path graph to exclude the sub-graph determined to be routed by a node with an assigned backup port (Block 2071). Thereafter, the method 2000 checks for the next adjacent downstream router of the removed router. (Block 2080) If no other adjacent downstream routers of the removed router are left unexamined by loop 2050-2080, the method 2000 may go on to check if there are any of the one or more sub-graphs (defined by the previous steps above) not included in the first part (white part) of the routing path graph. (Blocks 2080 and 2081) If there are no one or more sub-graphs not included in the first part (white part), the method 2000 may advance to the act of checking for a next router of the routing path graph. (Block 2090) On the contrary, if no sub-graphs excluded from the first part (white part) exist, then the method 2000 may advance to the acts in the process defined by blocks 2081-2086. Specifically, using a breadth first search of the second part (black part) of the routing graph, excluding the removed router, the method 2000 may find a first router with a link to the first part (white part) of the routing graph and define the first router as an exit node. (Block 2082) The method 2000 may then determine which of the one or more sub-graphs rooted by the one or more adjacent downstream routers of the removed router, includes the exit node. (Block 2083) A recovery path from the root of the sub-graph determined to include the exit node, to the exit node, is determined. (Block 2084) The method 2000 may then set, based on the determined recovery path, backup ports of routers in the sub-graph determined to include the exit node. (Block 2085) Subsequently, the method 2000 may "redefine" the first part (white part) of the routing path graph to include the sub-graph determined to include the exit node, and "redefine" the second part (black part) of the routing path graph to exclude the sub-graph determined to include the exit node. (Block 2086) Next, the method 2000 may branch back, via node F, to 2081 wherein if there are any of the one or more sub-graphs not included in the first graph, the method 2000 may continue the acts of the loop 2081-2086. (Blocks 2081-2086) Otherwise the method 2000 may continue on to the next router of the routing path graph if any. (Blocks 2081 and 2090) Once all routers of the routing graph have been processed, the method 2000 may be left. (2090 and Node 2091)

The method 2000 may be repeated for each destination prefix or node.

§4.4.3.2 Distributed Method

The aforementioned process can be run distributively, on each router of the routing path tree if each router has knowledge of the overall topology, such as routers using link-state routing protocols, such as OSPF. The flow diagram of FIG. 20 is the same as the flow diagram of FIG. 12 given the appropriate definitions and modification applied to it as discussed in §4.2.3. Therefore, a detailed flow diagram of the distributed method is omitted since it would be the same as the flow diagram of FIG. 13 given the appropriate definitions and modification applied to it as discussed in §4.2.3.

§4.4.4 Illustrative Example of Operations of Exemplary Process

Figure 21B:
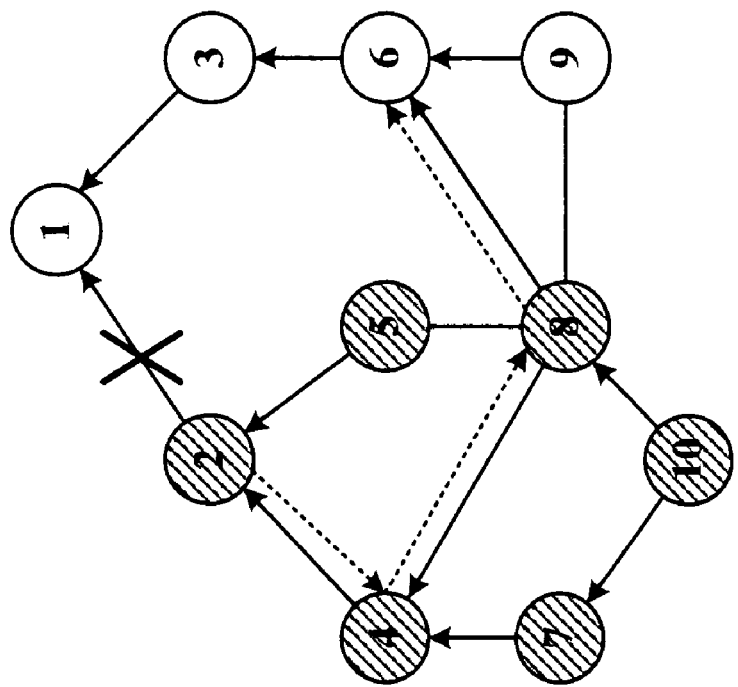
Figure 21A:
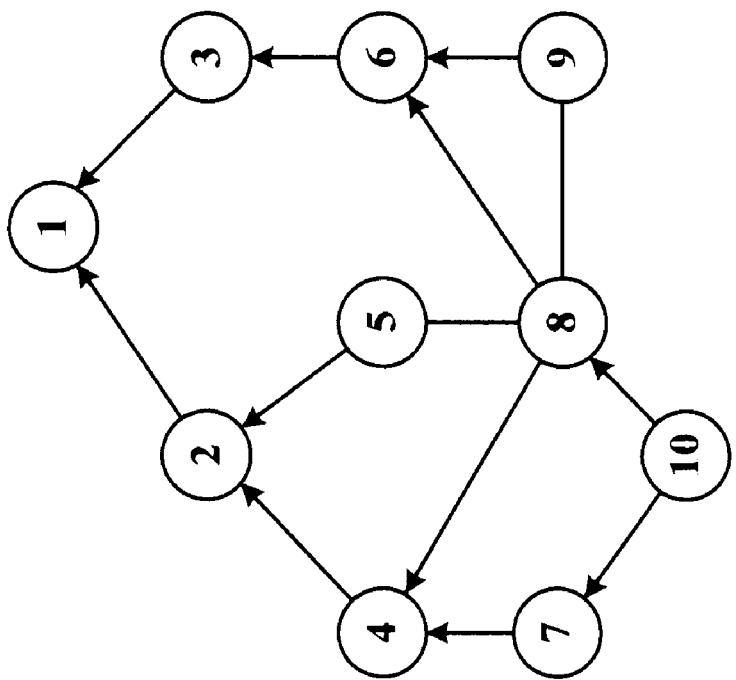

FIGS. 21A-21D illustrate an IP network topology with a plurality of nodes having primary ports, and the determination of their backup ports in a manner consistent with the present invention, where node 1 is the destination node. FIG. 21A illustrates the IP network topology with a plurality of nodes having primary ports, in which node 1 is the single destination. In order to determine the backup ports for each router (node) the ESCAP_NODE (multi-path) process may be employed which will sequentially determine backup ports for each router (except node 1) in the network. The acts involved in determining the backup ports may be summarized by the method 2000 of FIG. 20 or the detailed ESCAP_NODE (multi-path) process acts described in §4.4.3.1 above. For instance, using ESCAP_NODE (multi-path) process, FIG. 21B illustrates the link failure between node 2 and node 1 since the ESCAP_NODE algorithm first searches for link failures between the destination node's child nodes. The ESCAP_NODE (multi-path) determines backup ports of such a link failure as described in FIG. 19B.

Figure 21D:
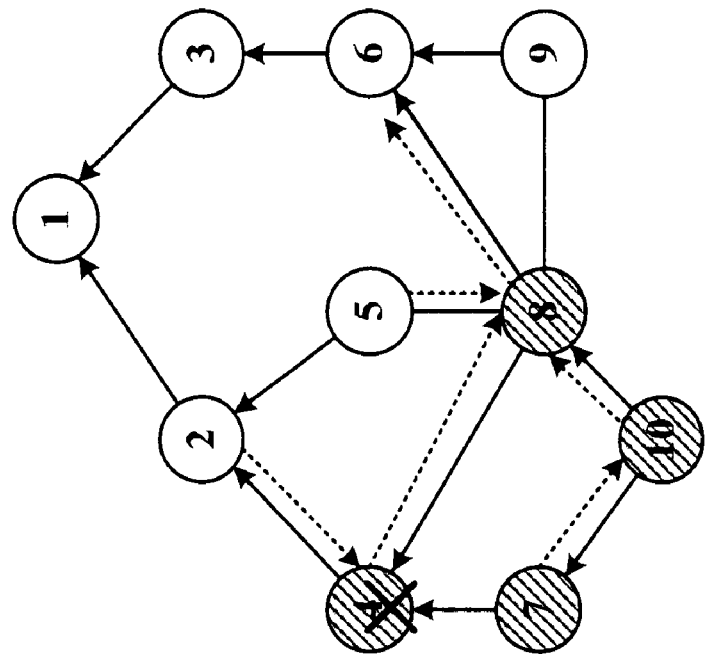
Figure 21C:
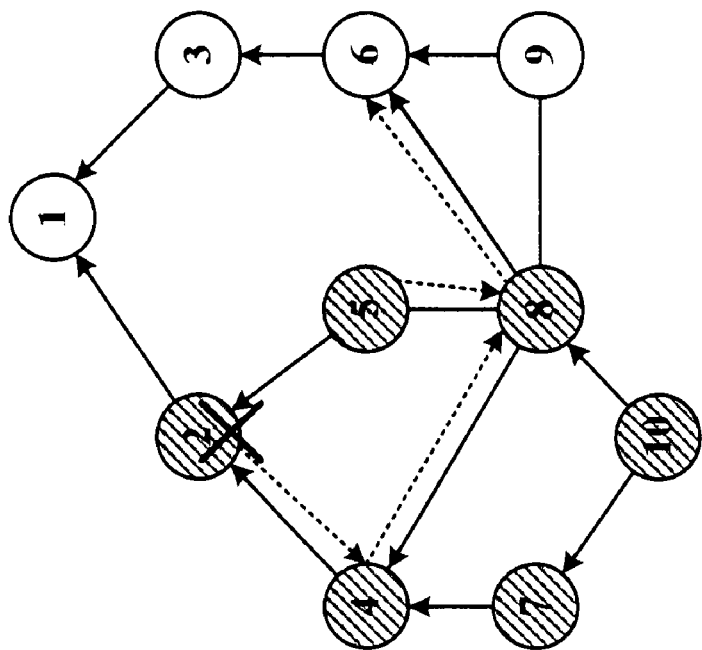

Proceeding in a depth first manner, FIG. 21C illustrates the failure (removal) of node 2 which creates a sub-graph G(2) illustrated by the "black" (hatched) nodes. Using a breadth-first search of the sub-graph G(2), an exit to a white colored node is determined; namely the link between "black" node 8 to "white" node 6. Therefore, in the first cycle, a backup path 5→8→6 is determined and a backup port for node 5 is determined. Thereafter node 5, is dyed "white" (not illustrated). That is, prior to the second cycle, the "black" sub-graph G(2) is updated by excluding G(5) from G(2). Further in a second cycle, node 4 already had its backup ports determined hence it is also dyed white along with nodes 7, 8, and 10 (not illustrated). At this point, there are no more "black" nodes, the backup ports of nodes 2, 4, 5 and 8 have been found, and the failure of node 2 can be recovered from Proceeding in a depth first manner, FIG. 21D illustrates the failure (removal) of node 4 which creates a sub-graph G(4) illustrated by the "black" (hatched) nodes. Using a breadth-first search of the sub-graph G(4), an exit to a white colored node is determined; namely the link between "black" node 8 to "white" node 6. Therefore, in the first cycle, a backup path 4→7→10→8→6 is determined and backup ports for nodes 7 and 10 are determined. Thereafter nodes 7 and 10, are dyed "white" (not illustrated).

Figure 21E:
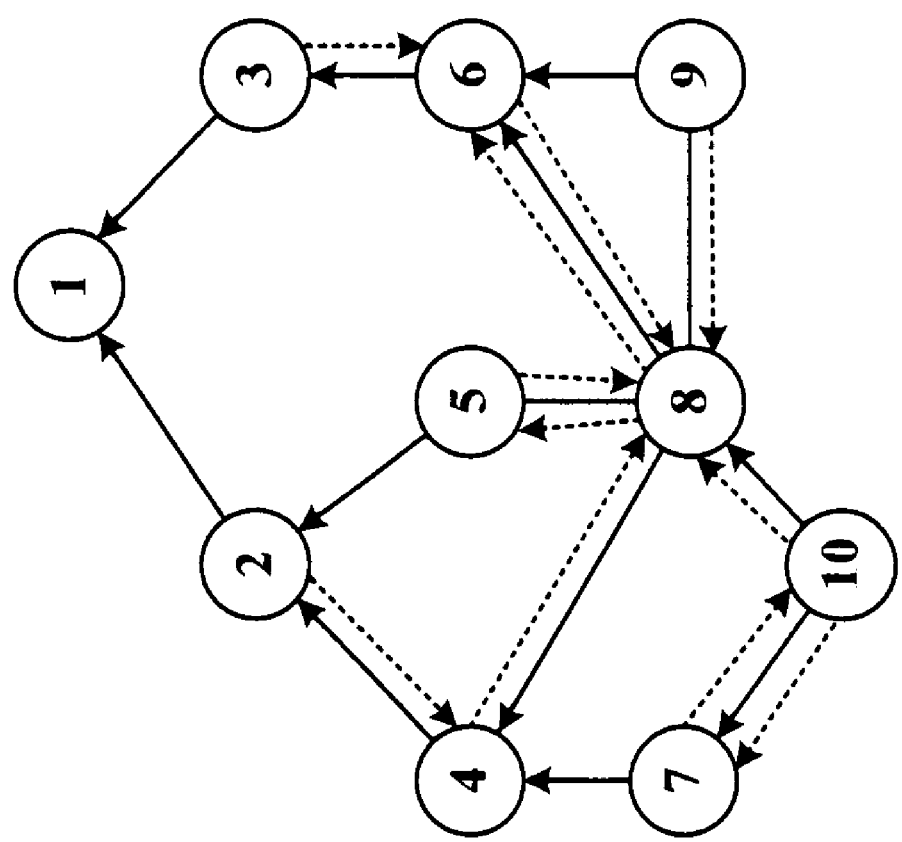

Proceeding in the same manner as above, all backup ports bound to each primary port of each router can be determined as illustrated in FIG. 21E.

§4.5 Alternatives and Refinements

Various refinements of particular embodiments consistent with the present invention, as well as alternative embodiments, are provided below.

Combining IPFRR with load balancing could further improve the quality of service during failure recovery.

Shared risk link group ("SRLG"), where multiple links sharing the same fiber are vulnerable to a single physical link failure, could be considered.

Although the exemplary embodiments were described in terms of networks using link-state routing protocols, the processes could be extended for path-vector routing so as to enhance the survivability of inter-domain routing.

§4.6 Exemplary Apparatus

FIG. 14 is high-level block diagram of a machine 1400 that may perform one or more of the processes described above, and/or store information used and/or generated by such processes. The machine 1400 basically includes one or more processors 1410, one or more input/output interface units 1430, one or more storage devices 1420, and one or more system buses and/or networks 1440 for facilitating the communication of information among the coupled elements. One or more input devices 1432 and one or more output devices 1434 may be coupled with the one or more input/output interfaces 1430. The one or more processors 1410 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1420 and/or may be received from an external source via one or more input interface units 1430.

In one embodiment, the machine 1400 may be one or more conventional personal computers, servers, or routers. In this case, the processing units 1410 may be one or more microprocessors. The bus 1440 may include a system bus. The storage devices 1420 may include system memory, such as read only memory (ROM) and/or random access memory (RAM). The storage devices 1420 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1432, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1410 through an appropriate interface 1430 coupled to the system bus 1440. The output devices 1434 may include a monitor or other type of display device, which may also be connected to the system bus 1440 via an appropriate interface. In addition to (or instead of) the monitor, the personal computer may include other (peripheral) output devices (not shown), such as speakers and printers for example.

§4.6.1 Routing Table Extension

Each IP router maintains a routing table where an entry has the structure of 1500 of FIG. 15A. To enable efficient distributed processing, the routing information may be downloaded to each line card to construct a forwarding table. (See, e.g., G. Suwala and G. Swallow, "SONET/SDH-like resilience for IP networks: a survey of traffic protection mechanisms," *IEEE Network*, Vol. 18, No. 2, pp. 20-25 (March 2004).) Upon the arrival of an IP packet, the link card performs longest prefix 1510 matching and table look-up to retrieve the appropriate next_hop 1520 and port 1530, which identify the output port to send the packet to. To support IPFRR, each entry may be extended by adding the backup port information: bk_n-ext_hop 1540 and bk_port 1550, as illustrated in entry 1590 of FIG. 15B. Thus, the port 1530 serves as the primary port, while bk_port 1550 serves as the backup port. The forwarding table may be stored in storage devices(s) 1420.

In an exemplary implementation, the backup ports might be stored in different memory banks and the addresses may be aligned with the primary ports. Therefore, in such an embodiment, each read/write operation accesses the primary and backup ports in parallel, thus achieving high speed table look-up.

The above implementation of the forwarding table has several advantages. First, the switch-over of each router is fast, adaptive and does not require explicit failure notification. Second, the additional memory requirement for the routing table extension is bounded. Only two fields are added to each entry, which can be achieved with minor cost increase. Finally, the speed of the routing table look-up is not affected because a primary port and its backup port are accessed in a single read operation.

§4.7 CONCLUSIONS

The exemplary IPFRR processes guarantee 100% recovery from single-link and single-node failures, respectively. The processes have low complexity and can be easily applied to practical networks to substantially shorten service disruption caused by failures. The two IPFRR processes in a variety of practical and random topologies have been verified and the price paid for the survivability enhancement has been found to be acceptable. The path lengths, link load and network overall traffic volume using the IPFRR processes are comparable to those using shortest path route recalculation.

In addition, the complexity of the backup port determination for each destination node is bounded by the number of nodes in the network. Consequently, the processes consume little computation resources.

What is claimed is:

1. For use with a survivable portion of a network, a computer-implemented method for determining a backup port for a first router of the survivable network, to reach a destination node in the event of a single node failure, the method comprising:

a) accepting a routing path graph having the destination node, wherein the routing path graph includes one or more links terminated by one or more primary ports of the first router; and b) for each router of at least a part of the routing path graph,
1) assuming that the current router is removed, defining
A) a first part of the routing path graph including the destination node, and
B) a second part of the routing path graph separated from the first part wherein the second part defines one or more sub-graphs, and
2) determining the backup port for the first router by examining at least one of the one or more sub-graphs to find a link to the first part of the routing path graph, wherein the act of determining the backup port includes, using a breadth-first search of the second part but excluding the current router,
A) determining an exit node with a link to the first part of the routing path graph,
B) determining which of the one or more sub-graphs includes the exit node,
C) determining a backup path from a root of the determined sub-graph to the exit node,
D) if the first router is on the determined backup path, then
i) determining a port of the first router on the backup path, and
ii) assigning the determined port as the backup port of the first router,
E) redefining the first part of the routing path graph to include the determined sub-graph and redefining the second part of the routing path graph to exclude the determined sub-graph, and
F) while there are any sub-graphs remaining in the second part, continuing acts (A) through (E), otherwise terminating the breadth-first search.

2. The computer-implemented method of claim 1 further comprising determining the accepted routing path graph using a shortest path first algorithm.

3. The computer-implemented method of claim 1 further comprising determining the accepted routing path graph using Dijkstra's algorithm.

4. The computer-implemented method of claim 1 wherein the act of determining a backup path from the root of the determined sub-graph to the exit node uses the accepted routing path graph.

5. The computer-implemented method of claim 1 wherein the act of assigning the determined port as the backup port of the first router includes adding the backup port as a routing table entry.

6. The computer-implemented method of claim 5 wherein the routing table includes an Internet Protocol address prefix, the primary port and the backup port.

7. The computer-implemented method of claim 5 wherein the routing table includes an Internet Protocol address prefix, a next hop, the primary port, a backup next hop, and the backup port.

8. The computer-implemented method of claim 1 wherein the routing path graph including the destination node is a routing path tree rooted by the destination node, and wherein each of the one or more sub-graphs is a sub-tree.

9. The computer-implemented method of claim 1 wherein the routing path graph including the destination node is a multi-path routing graph in which at least one of the routers includes more than one primary port for reaching the destination node.

10. The computer-implemented method of claim 1 wherein the at least a part of the routing path graph consists of a primary routing path graph between the first router and the destination node.

11. The computer-implemented method of claim 1 wherein the at least a part of the routing path graph excludes at least some of the routing path graph.

12. The computer-implemented method of claim 1 wherein the at least a part of the routing path graph includes the entire routing path graph except for the destination node.

13. For use with a survivable portion of a network, a computer-implemented method for determining a backup port for a first router of the survivable network, to reach a destination node in the event of a single node failure, the method comprising:

a) accepting a routing path graph having the destination node, wherein the routing path graph includes one or more links terminated by one or more primary ports of the first router; and b) for each router of at least a part of the routing path graph,
1) assuming that the current router is removed, defining
A) a first part of the routing path graph including the destination node, and
B) a second part of the routing path graph separated from the first part wherein the second part defines one or more sub-graphs, and
2) determining the backup port for the first router by examining at least one of the one or more sub-graphs to find a link to the first part of the routing path graph, wherein the act of determining the backup port includes, using a breadth-first search of the second part but excluding the current router,
A) determining an exit node with a link to the first part of the routing path graph,
B) determining which of the one or more sub-graphs includes the exit node,
C) determining a backup path from a root of the determined sub-graph to the exit node,
D) for each router on the determined backup path,
i) determining a port of the router on the backup path, and
ii) assigning the determined port as the backup port of the router,
E) redefining the first part of the routing path graph to include the determined sub-graph and redefining the second part of the routing path graph to exclude the determined sub-graph, and
F) while there are any sub-graphs remaining in the second part, continuing acts (A) through (E), otherwise terminating the breadth-first search.

14. The computer-implemented method of claim 13 wherein the act of determining a backup path from the root of the determined sub-graph to the exit node uses the accepted routing path graph.

15. The computer-implemented method of claim 13 wherein the act of assigning the determined port as the backup port of the first router includes adding the backup port as a routing table entry.

16. The computer-implemented method of claim 15 wherein the routing table includes an Internet Protocol address prefix, the primary port and the backup port.

17. The computer-implemented method of claim 15 wherein the routing table includes an Internet Protocol address prefix, a next hop, the primary port, a backup next hop, and the backup port.

18. The computer-implemented method of claim 13 wherein the routing path graph including the destination node is a routing path tree rooted by the destination node, and wherein each of the one or more sub-graphs is a sub-tree.

19. The computer-implemented method of claim 13 wherein the routing path graph including the destination node is a multi-path routing graph in which at least one of the routers includes more than one primary port for reaching the destination node.

20. The computer-implemented method of claim 13 wherein the at least a part of the routing path graph consists of a primary routing path graph between the first router and the destination node.

21. The computer-implemented method of claim 13 wherein the at least a part of the routing path graph excludes at least some of the routing path graph.

22. The computer-implemented method of claim 13 wherein the at least a part of the routing path graph includes the entire routing path graph except for the destination node.

23. For use with a survivable portion of a network, apparatus adapted to determine a backup port for a first router of the survivable network, to reach a destination node in the event of a single node failure, the apparatus comprising:
  a) means for accepting a rout the destination node, wherein the routing path graph includes one or more links terminated by one or more primary ports of the first router; and
  b) means, for each router of at least a part of the routing path graph,
    1) for assuming that the current router is removed, defining
      A) a first part of the routing path graph including the destination node, and
      B) a second part of the routing path graph separated from the first part wherein the second part defines one or more sub-graphs; and
    2) for determining the backup port for the first router by examining at least one of the one or more sub-graphs to find a link to the first part of the routing path graph, wherein the means for determining the backup port include, means, using a breadth-first search of the second part but excluding the current router,
      A) for determining an exit node with a link to the first part of the routing path graph,
      B) for determining which of the one or more sub-graphs includes the exit node,
      C) for determining a backup path from a root of the determined sub-graph to the exit node,
      D) for, if the first router is on the determined backup path, then
        i) determining a port of the first router on the backup path, and
        ii) assigning the determined port as the backup port of the first router,
      E) for redefining the first part of the routing path graph to include the determined sub-graph and redefining the second part of the routing path graph to exclude the determined sub-graph, and
      F) for while there are any sub-graphs remaining in the second part, continuing acts (A) through (E), otherwise terminating the breadth-first search.

24. For use with a survivable portion of a network, apparatus adapted to determine a backup port for a first router of the survivable network, to reach a destination node in the event of a single node failure, the apparatus comprising:
  a) means for accepting a routing path graph having the destination node, wherein the routing path graph includes one or more links terminated by one or more primary ports of the first router; and
  b) means, for each router of at least a part of the routing path graph,
    1) for assuming that the current router is removed, defining
      A) a first part of the routing path graph including the destination node, and
      B) a second part of the routing path graph separated from the first part wherein the second part defines one or more sub-graphs, and
    2) for determining the backup port for the first router by examining at least one of the one or more sub-graphs to find a link to the first part of the routing path graph, wherein the means for determining the backup port include, means, using a breadth-first search of the second part but excluding the current router,
      A) for determining an exit node with a link to the first part of the routing path graph,
      B) for determining which of the one or more sub-graphs includes the exit node,
      C) for determining a backup path from a root of the determined sub-graph to the exit node,
      D) for, for each router on the determined backup path,
        i) determining a port of the router on the backup path, and
        ii) assigning the determined port as the backup port of the router,
      E) for redefining the first part of the routing path graph to include the determined sub-graph and redefining the second part of the routing path graph to exclude the determined sub-graph, and
      F) for, while there are any sub-graphs remaining in the second part, continuing acts (A) through (E), otherwise terminating the breadth-first search.

* * * * *